US012681273B2

(12) United States Patent
Li et al.

(10) Patent No.: US 12,681,273 B2
(45) Date of Patent: Jul. 14, 2026

(54) IMAGING LENS SYSTEM, IMAGE CAPTURING UNIT AND ELECTRONIC DEVICE

(71) Applicant: LARGAN INDUSTRIAL OPTICS CO., LTD., Taichung City (TW)

(72) Inventors: Shiu Sheng Li, Taichung City (TW); Cheng-Yu Tsai, Taichung City (TW)

(73) Assignee: LARGAN INDUSTRIAL OPTICS CO., LTD., Taichung City (TW)

( * ) Notice: Subject to any disclaimer, the term of this patent is extended or adjusted under 35 U.S.C. 154(b) by 350 days.

(21) Appl. No.: 18/376,761

(22) Filed: Oct. 4, 2023

(65) Prior Publication Data

US 2025/0052982 A1    Feb. 13, 2025

(30) Foreign Application Priority Data

Aug. 11, 2023    (TW) ................................. 112130341

(51) Int. Cl.
    *G02B 13/00*        (2006.01)
    *G02B 9/64*         (2006.01)

(52) U.S. Cl.
    CPC ........... *G02B 13/0045* (2013.01); *G02B 9/64* (2013.01)

(58) Field of Classification Search
    CPC .............................. G02B 13/0045; G02B 9/64
    See application file for complete search history.

(56) References Cited

U.S. PATENT DOCUMENTS 4,560,253 A    12/1985   Ogino
4,772,108 A    9/1988   Sugiyama 5,283,693 A    2/1994   Kohno et al.
5,625,495 A    4/1997   Moskovich
5,859,729 A    1/1999   Misaka
5,999,337 A    12/1999   Ozaki
           (Continued)

FOREIGN PATENT DOCUMENTS

CN        101403820 A    4/2009
CN        101408664 A    4/2009
           (Continued)

OTHER PUBLICATIONS

Gross et al. "Handbook of Optical Systems vol. 3: Aberration Theory and Correction of Optical Systems" Weinheim Germany, Wiley-VCH Verlag GmbH & Co. KGaA, pp. 377-379 (Year: 2007).*

*Primary Examiner* — Bumsuk Won
*Assistant Examiner* — Alex Park Rickel
(74) *Attorney, Agent, or Firm* — Maschoff Brennan

(57) ABSTRACT

An imaging lens system includes seven lens elements which are, in order from an object side to an image side along an optical path, a first lens element, a second lens element, a third lens element, a fourth lens element, a fifth lens element, a sixth lens element and a seventh lens element. Each of the seven lens elements has an object-side surface facing toward the object side and an image-side surface facing toward the image side. The first lens element has negative refractive power. The image-side surface of the fifth lens element is convex in a paraxial region thereof. The sixth lens element has negative refractive power. The object-side surface of the sixth lens element is concave in a paraxial region thereof. At least one of the object-side surface and the image-side surface of at least one of the seven lens elements has at least one inflection point.

29 Claims, 31 Drawing Sheets

(56)                    References Cited

U.S. PATENT DOCUMENTS

| | | | |
|---|---|---|---|
| 6,191,896 | B1 | 2/2001 | Itoh |
| 6,233,099 | B1 | 5/2001 | Itoh |
| 7,630,146 | B2 | 12/2009 | Katakura |
| 11,125,971 | B2 | 9/2021 | Chen et al. |
| 11,125,974 | B2 | 9/2021 | Wei et al. |
| 2012/0133802 | A1 | 5/2012 | Katakura et al. |
| 2016/0282591 | A1 | 9/2016 | Mizusawa |
| 2017/0139186 | A1 | 5/2017 | Tang et al. |
| 2020/0278524 | A1 | 9/2020 | Zhang et al. |
| 2021/0011258 | A1 | 1/2021 | Gao et al. |
| 2022/0146792 | A1 | 5/2022 | Shih et al. |
| 2024/0345365 | A1* | 10/2024 | Teranishi ................. G02B 9/64 |

FOREIGN PATENT DOCUMENTS

| | | | | | |
|---|---|---|---|---|---|
| CN | 102713718 | A | | 10/2012 | |
| CN | 109445068 | A | | 3/2019 | |
| CN | 110133828 | A | | 8/2019 | |
| CN | 110618520 | A | * | 12/2019 | ............ G02B 13/06 |
| CN | 110858028 | A | | 3/2020 | |
| CN | 110941078 | A | | 3/2020 | |
| CN | 110955026 | A | | 4/2020 | |
| CN | 111025567 | A | | 4/2020 | |
| CN | 111025568 | A | | 4/2020 | |
| CN | 111025575 | A | | 4/2020 | |
| CN | 211528811 | U | | 9/2020 | |
| CN | 112147764 | A | | 12/2020 | |
| CN | 112526728 | A | | 3/2021 | |
| CN | 112596215 | A | | 4/2021 | |
| CN | 212905678 | U | | 4/2021 | |
| CN | 112987242 | A | * | 6/2021 | ............ G02B 13/18 |
| CN | 113759507 | A | | 12/2021 | |
| CN | 114460723 | A | | 5/2022 | |
| CN | 114740599 | A | | 7/2022 | |
| CN | 114859534 | A | | 8/2022 | |
| CN | 114942514 | A | | 8/2022 | |
| CN | 115951482 | A | | 4/2023 | |
| CN | 116047718 | A | | 5/2023 | |
| CN | 116088136 | A | | 5/2023 | |
| JP | H11-125767 | A | | 5/1999 | |
| JP | 2003-098430 | A | | 4/2003 | |
| JP | WO2016/013302 | A1 | | 4/2017 | |
| WO | 96/18124 | A1 | | 6/1996 | |
| WO | 2019/242324 | A1 | | 12/2019 | |
| WO | 2020/098384 | A1 | | 5/2020 | |
| WO | 2020/221138 | A1 | | 11/2020 | |
| WO | 2021/128137 | A1 | | 7/2021 | |
| WO | 2021/128142 | A1 | | 7/2021 | |
| WO | 2021/128144 | A1 | | 7/2021 | |
| WO | 2021/128183 | A1 | | 7/2021 | |
| WO | 2023/125551 | A1 | | 7/2023 | |

* cited by examiner

510

IMAGING LENS SYSTEM, IMAGE CAPTURING UNIT AND ELECTRONIC DEVICE

RELATED APPLICATIONS

This application claims priority to Taiwan Application No. 112130341, filed on Aug. 11, 2023, which is incorporated by reference herein in its entirety.

BACKGROUND

Technical Field

The present disclosure relates to an imaging lens system, an image capturing unit and an electronic device, more particularly to an imaging lens system and an image capturing unit applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, an imaging lens system includes seven lens elements. The seven lens elements are, in order from an object side to an image side along an optical path, a first lens element, a second lens element, a third lens element, a fourth lens element, a fifth lens element, a sixth lens element and a seventh lens element. Each of the seven lens elements has an object-side surface facing toward the object side and an image-side surface facing toward the image side.

Preferably, the first lens element has negative refractive power. Preferably, the image-side surface of the fifth lens element is convex in a paraxial region thereof. Preferably, the sixth lens element has negative refractive power. Preferably, the object-side surface of the sixth lens element is concave in a paraxial region thereof. Preferably, at least one of the object-side surface and the image-side surface of at least one of the seven lens elements has at least one inflection point.

When a focal length of the imaging lens system is f, an axial distance between the object-side surface of the first lens element and an image surface is TL, an axial distance between the object-side surface of the first lens element and the image-side surface of the third lens element is Dr1r6, an axial distance between the object-side surface of the fourth lens element and the image-side surface of the seventh lens element is Dr7r14, an Abbe number of the second lens element is V2, a refractive index of the second lens element is N2, a curvature radius of the object-side surface of the fourth lens element is R7, a curvature radius of the image-side surface of the fourth lens element is R8, a curvature radius of the image-side surface of the fifth lens element is R10, and a curvature radius of the object-side surface of the sixth lens element is R11, the following conditions are preferably satisfied:

$$0.05 < f/TL < 0.35;$$

$$1.40 < Dr7r14/Dr1r6 < 3.00;$$

$$5.00 < V2/N2 < 16.00;$$

$$0.10 < (R7 - R8)/(R7 + R8) < 3.50; \text{ and}$$

$$0.03 < R11/R10 < 5.00.$$

According to another aspect of the present disclosure, an imaging lens system includes seven lens elements. The seven lens elements are, in order from an object side to an image side along an optical path, a first lens element, a second lens element, a third lens element, a fourth lens element, a fifth lens element, a sixth lens element and a seventh lens element. Each of the seven lens elements has an object-side surface facing toward the object side and an image-side surface facing toward the image side.

Preferably, the first lens element has negative refractive power. Preferably, the fourth lens element has positive refractive power. Preferably, the sixth lens element has negative refractive power. Preferably, the object-side surface of the sixth lens element is concave in a paraxial region thereof. Preferably, at least one of the object-side surface and the image-side surface of at least one of the seven lens elements has at least one inflection point.

When a focal length of the imaging lens system is f, an axial distance between the object-side surface of the first lens element and an image surface is TL, an axial distance between the object-side surface of the first lens element and the image-side surface of the third lens element is Dr1r6, an axial distance between the object-side surface of the fourth lens element and the image-side surface of the seventh lens element is Dr7r14, an Abbe number of the second lens element is V2, a refractive index of the second lens element is N2, a curvature radius of the image-side surface of the first lens element is R2, a curvature radius of the image-side surface of the second lens element is R4, a curvature radius of the object-side surface of the fourth lens element is R7, and a curvature radius of the image-side surface of the fifth lens element is R10, the following conditions are preferably satisfied:

$$0.05 < f/TL < 0.30;$$

$$1.40 < Dr7r14/Dr1r6 < 3.00;$$

$$5.00 < V2/N2 < 16.00;$$

$$0.10 < (R7 - R10)/(R7 + R10) < 3.00; \text{ and}$$

$$0 < |R2/R4| < 0.80.$$

According to another aspect of the present disclosure, an imaging lens system includes seven lens elements. The seven lens elements are, in order from an object side to an image side along an optical path, a first lens element, a second lens element, a third lens element, a fourth lens element, a fifth lens element, a sixth lens element and a seventh lens element. Each of the seven lens elements has an object-side surface facing toward the object side and an image-side surface facing toward the image side.

Preferably, the first lens element has negative refractive power. Preferably, the image-side surface of the fourth lens element is convex in a paraxial region thereof. Preferably, the fifth lens element has positive refractive power. Preferably, the object-side surface of the fifth lens element is convex in a paraxial region thereof. Preferably, the sixth lens element has negative refractive power. Preferably, at least one of the object-side surface and the image-side surface of at least one of the seven lens elements has at least one inflection point.

When a focal length of the imaging lens system is f, a focal length of the first lens element is f1, a focal length of the seventh lens element is f7, an axial distance between the object-side surface of the first lens element and an image surface is TL, an axial distance between the object-side surface of the first lens element and the image-side surface of the third lens element is Dr1r6, an axial distance between the object-side surface of the fourth lens element and the image-side surface of the seventh lens element is Dr7r14, an Abbe number of the second lens element is V2, a refractive index of the second lens element is N2, a sum of central thicknesses of all lens elements of the imaging lens system is $\Sigma CT$, and a sum of all axial distances between adjacent lens elements of the imaging lens system is $\Sigma AT$, the following conditions are preferably satisfied:

$$0.05 < f/TL < 0.28;$$

$$1.40 < Dr7r14/Dr1r6 < 3.00;$$

$$5.00 < V2/N2 < 16.00;$$

$$0.10 < \sum CT / \sum AT < 3.00; \text{ and}$$

$$0 < |f1/f7| < 1.00.$$

According to another aspect of the present disclosure, an image capturing unit includes one of the aforementioned imaging lens systems and an image sensor, wherein the image sensor is disposed on the image surface of the imaging lens system.

According to another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
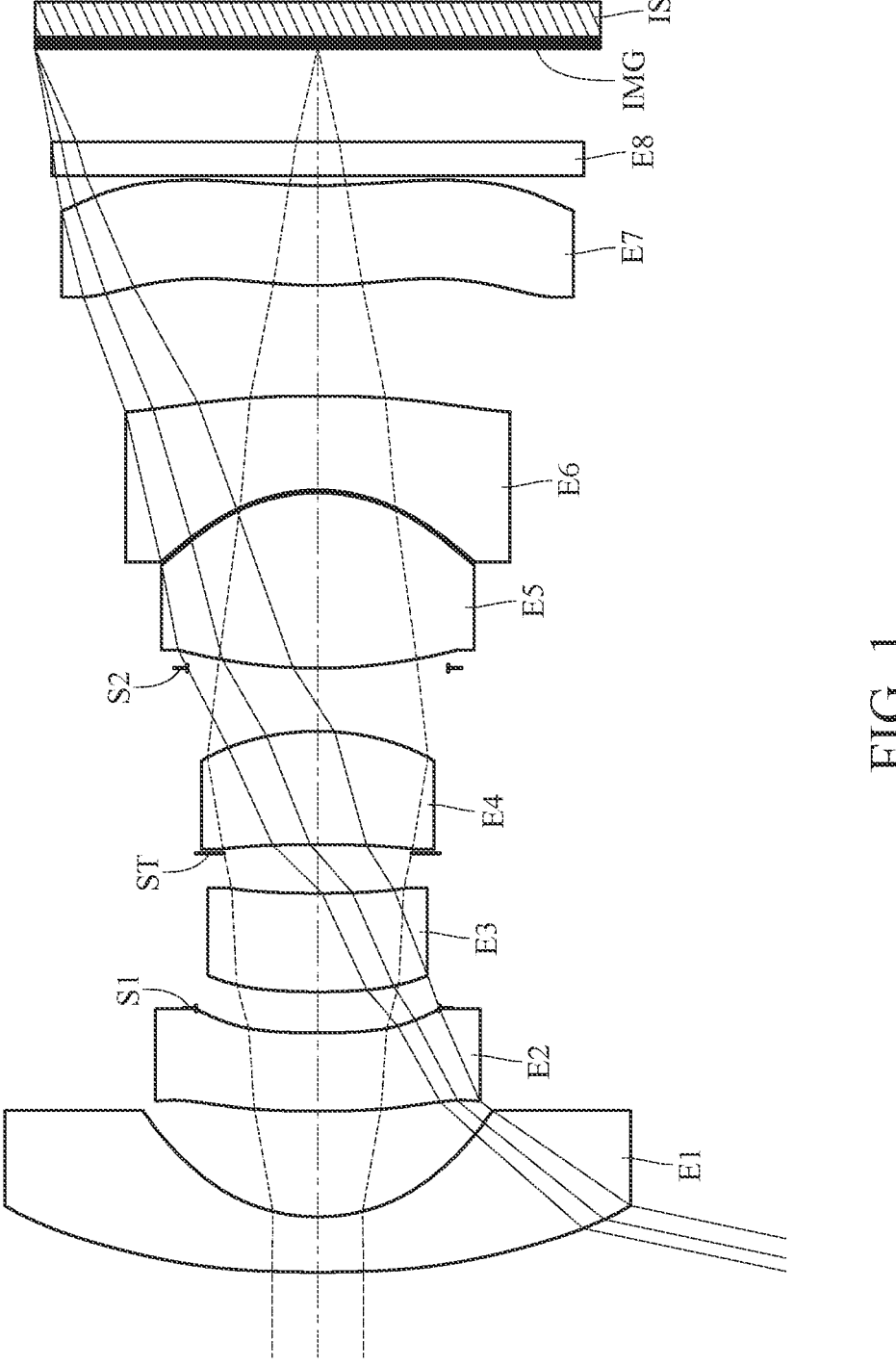
FIG. 1 is a schematic view of an image capturing unit according to the 1st embodiment of the present disclosure.

An imaging lens system includes seven lens elements. The seven lens elements are, in order from an object side to an image side along an optical path, a first lens element, a second lens element, a third lens element, a fourth lens element, a fifth lens element, a sixth lens element and a seventh lens element. Each of the seven lens elements of the imaging lens system has an object-side surface facing toward the object side and an image-side surface facing toward the image side.

The first lens element has negative refractive power. Therefore, it is favorable for enlarging the field of view with a relatively large range of image information. The object-side surface of the first lens element can be convex in a paraxial region thereof. Therefore, it is favorable for enlarging the field of view and increasing image size. The first lens element can be made of glass material. Therefore, it is favorable for effectively reducing the sensitivity of the imaging lens system to the external environment, and it is also favorable for improving the stability of the imaging lens system in various environments. When a lens element at the object side of the imaging lens system is made of glass material, it is favorable for a resistance to humid environment and surface scratches so as to effectively prolong the life span of electronic products.

The fourth lens element can have positive refractive power. Therefore, it is favorable for converging light so as to reduce the size of the imaging lens system. The object-side surface of the fourth lens element can be concave in a paraxial region thereof. Therefore, it is favorable for balancing an incident angle of light with large view angle on the lens surface of the fourth lens element so as to prevent light divergence. The image-side surface of the fourth lens element can be convex in a paraxial region thereof. Therefore, it is favorable for adjusting the refraction direction of light from the fourth lens element so as to enlarge the image surface.

The fifth lens element can have positive refractive power. Therefore, it is favorable for converging light so as to effectively control the traveling direction of light, obtaining a balance between field of view as well as size distribution. The object-side surface of the fifth lens element can be convex in a paraxial region thereof. Therefore, it is favorable for adjusting the lens shape and the refractive power of the fifth lens element so as to reduce the size of the imaging lens system and correct aberrations. The image-side surface of the fifth lens element can be convex in a paraxial region thereof. Therefore, it is favorable for a proper light convergence ability of the fifth lens element so as to prevent stray light due to overly large incident angle of light at periphery thereof.

The sixth lens element has negative refractive power. Therefore, it is favorable for balancing the refractive power of the fifth lens element and reducing a back focal length. The object-side surface of the sixth lens element can be concave in a paraxial region thereof. Therefore, it is favorable for adjusting the shape of the object-side surface of the sixth lens element, such that the sixth lens element can work with the fifth lens element to correct chromatic aberration.

The image-side surface of the fifth lens element and the object-side surface of the sixth lens element can be both aspheric, and the fifth lens element can be cemented to the sixth lens element. Therefore, it is favorable for adjacent lens elements cemented together via their aspheric surfaces so as to reduce the difference of refractive index in the space between the adjacent lens elements, thereby effectively reducing reflection due to light refraction to prevent ghost images.

Figure 27:
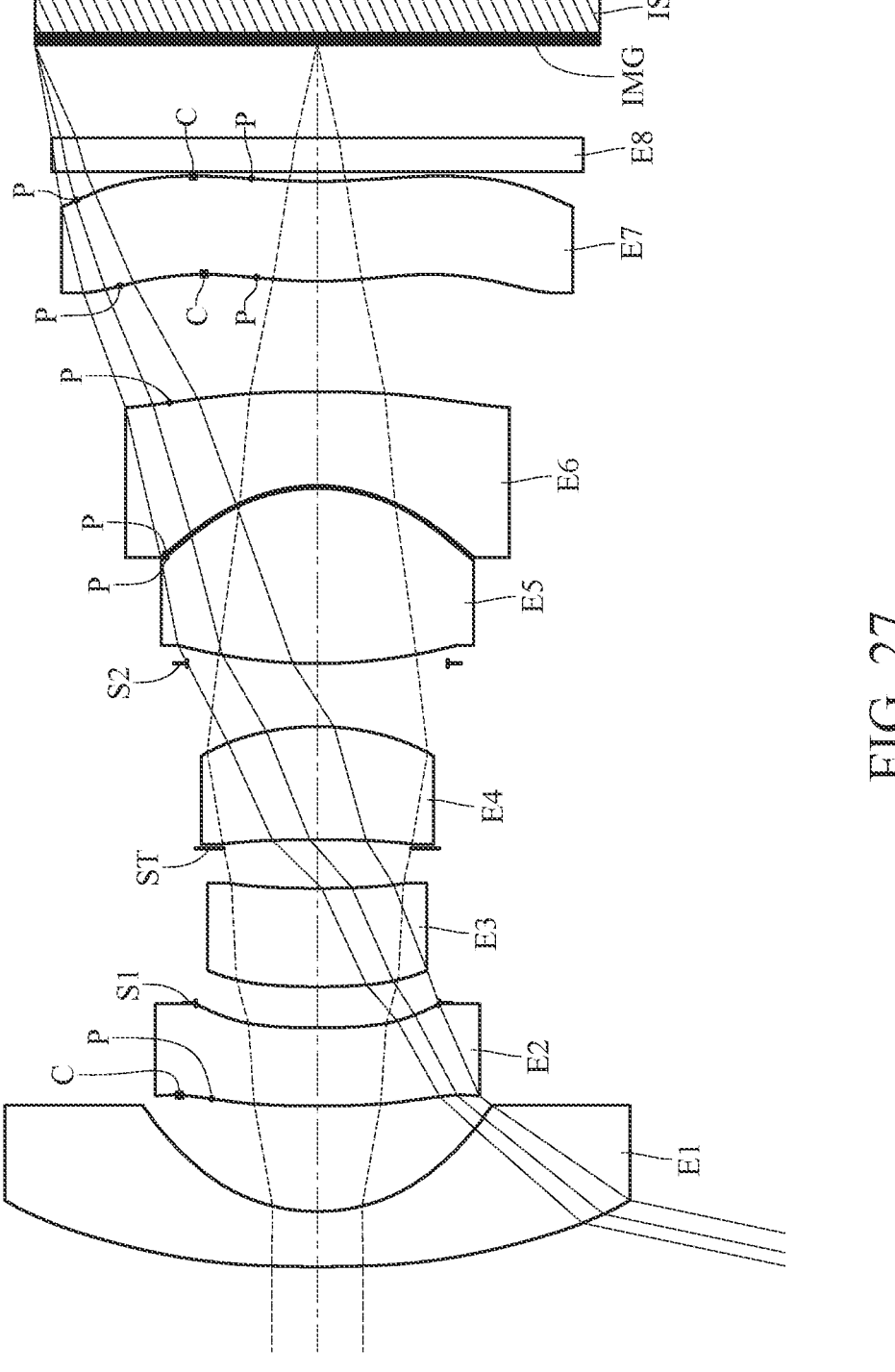
FIG. 27 shows a schematic view of inflection points on several lens surfaces and critical points on several lens surfaces according to the 1st embodiment of the present disclosure.

At least one of the object-side surface and the image-side surface of at least one of the seven lens elements has at least one inflection point. Therefore, it is favorable for correcting and compensating field curvature at image periphery. The object-side surface of the second lens element can have at least one inflection point. Therefore, it is favorable for controlling the incident angle of light on the object-side surface of the second lens element so as to prevent low relative illumination at image periphery due to overly large incident angle. The object-side surface of the third lens element can have at least one inflection point. Therefore, it is favorable for enhancing the design flexibility of the shape of the third lens element so as to correct astigmatism. At least one of the object-side surface and the image-side surface of the seventh lens element can have at least one inflection point. Therefore, it is favorable for enhancing aberration correction ability at the periphery of the seventh lens element. Please refer to FIG. 27, which shows a schematic view of all inflection points P on lens elements according to the 1st embodiment of the present disclosure. The one or more inflection points on any lens surface in FIG. 27 are only exemplary. Each of lens surfaces in various embodiments of the present disclosure may also have one or more inflection points.

The object-side surface of the third lens element can have at least one convex critical point in an off-axis region thereof. Therefore, it is favorable for adjusting the peripheral shape of the object-side surface of the third lens element so as to balance the convergence quality of light with large view angle. The image-side surface of the seventh lens element can have at least one convex critical point in an off-axis region thereof. Therefore, it is favorable for adjusting the incident angle of light on the image surface so as to control the incident angle in the off-axis region, thereby reducing vignetting at image periphery and correcting distortion. Please refer to FIG. 27, which shows a schematic view of all critical points C on lens elements according to the 1st embodiment of the present disclosure. Each of the second lens element and the seventh lens element according to the 1st embodiment of the present disclosure has one or more critical points. FIG. 27 exemplarily depicts a concave critical point C on the object-side surface of the second lens element, a concave critical point C on the object-side surface of the seventh lens element, and a convex critical point C on the image-side surface of the seventh lens element. The one or more critical points on any lens surface in FIG. 27 are only exemplary. Each of lens surfaces in various embodiments of the present disclosure may also have one or more critical points in an off-axis region thereof.

According to the present disclosure, the imaging lens system can further include an aperture stop. The aperture stop can be disposed between the second lens element and the fourth lens element. Therefore, it is favorable for adjusting the position of the aperture stop so as to enhance the relative illumination at image periphery and enlarge the field of view. Moreover, the aperture stop can be disposed between the third lens element and the fourth lens element.

When a focal length of the imaging lens system is f, and an axial distance between the object-side surface of the first lens element and an image surface is TL, the following condition is satisfied: $0.05 < f/TL < 0.35$. Therefore, it is favorable for obtaining a balancing between short total track length as well as large field of view. Moreover, the following condition can also be satisfied: $0.05 < f/TL < 0.30$. Moreover, the following condition can also be satisfied: $0.05 < f/TL < 0.28$. Moreover, the following condition can also be satisfied: $0.10 < f/TL < 0.25$. Moreover, the following condition can also be satisfied: $0.12 < f/TL < 0.22$. Moreover, the following condition can also be satisfied: $0.14 \leq f/TL \leq 0.19$.

When an axial distance between the object-side surface of the first lens element and the image-side surface of the third lens element is Dr1r6, and an axial distance between the object-side surface of the fourth lens element and the image-side surface of the seventh lens element is Dr7r14, the following condition is satisfied: 1.40<Dr7r14/ Dr1r6<3.00. Therefore, it is favorable for adjusting central thicknesses of the imaging lens system at both the object side and the image side so as to balance space arrangement of the lens elements to thereby reduce the sensitivity thereof. Moreover, the following condition can also be satisfied: 1.45<Dr7r14/Dr1r6<2.50. Moreover, the following condition can also be satisfied: 1.50≤ Dr7r14/Dr1r6≤2.01.

When an Abbe number of the second lens element is V2, and a refractive index of the second lens element is N2, the following condition is satisfied: 5.00<V2/N2<16.00. Therefore, it is favorable for adjusting the refractive index as well as the Abbe number of the second lens element so as to balance light convergence ability at different wavelengths to thereby correct chromatic aberration. Moreover, the following condition can also be satisfied: 8.00<V2/N2<14.50. Moreover, the following condition can also be satisfied: 9.61≤V2/N2≤15.92.

When a curvature radius of the object-side surface of the fourth lens element is R7, and a curvature radius of the image-side surface of the fourth lens element is R8, the following condition can be satisfied: 0.10<(R7−R8)/(R7+ R8)<3.50. Therefore, it is favorable for effectively balancing the curvature radius of the object-side surface of the fourth lens element with the curvature radius of the image-side surface of the fourth lens element so as to adjust the refraction direction of light from the fourth lens element to thereby enlarge the image surface. Moreover, the following condition can also be satisfied: 0.40<(R7-R8)/(R7+R8) <2.50. Moreover, the following condition can also be satisfied: 0.59≤(R7-R8)/(R7+R8)≤1.53.

When a curvature radius of the image-side surface of the fifth lens element is R10, and a curvature radius of the object-side surface of the sixth lens element is R11, the following condition can be satisfied: 0.03<R11/R10<5.00. Therefore, it is favorable for adjusting the curvature radius of the image-side surface of the fifth lens element as well as the curvature radius of the object-side surface of the sixth lens element so as to improve the convergence quality of imaging light, thereby correcting field curvature as well as spherical aberration. Moreover, the following condition can also be satisfied: 0.20<R11/R10<3.00. Moreover, the following condition can also be satisfied: 0.50<R11/R10<2.00. Moreover, the following condition can also be satisfied: 0.89≤R11/R10≤1.75.

When the curvature radius of the object-side surface of the fourth lens element is R7, and the curvature radius of the image-side surface of the fifth lens element is R10, the following condition can be satisfied: 0.10<(R7−R10)/(R7+ R10)<3.00. Therefore, it is favorable for effectively balancing the curvature radius of the object-side surface of the fourth lens element with the curvature radius of the image-side surface of the fifth lens element so as to adjust the traveling direction of peripheral light, thereby reducing the incident angle of light on the image surface. Moreover, the following condition can also be satisfied: 0.30<(R7−R10)/ (R7+R10)<2.00. Moreover, the following condition can also be satisfied: 0.45<(R7−R10)/(R7+R10)<1.80. Moreover, the following condition can also be satisfied: 0.50<(R7−R10)/ (R7+R10)<1.50. Moreover, the following condition can also be satisfied: 0.74≤(R7−R10)/(R7+R10)≤1.16.

When a curvature radius of the image-side surface of the first lens element is R2, and a curvature radius of the image-side surface of the second lens element is R4, the following condition can be satisfied: 0<|R2/R4|<0.80.

Therefore, it is favorable for adjusting a ratio of the curvature radius of the image-side surface of the first lens element to the curvature radius of the image-side surface of the second lens element so as to correct spherical aberration and astigmatism at center of the field of view. Moreover, the following condition can also be satisfied: 0.01<|R2/R4| <0.50. Moreover, the following condition can also be satisfied: 0.03≤|R2/R4|≤0.27.

When a sum of central thicknesses of all lens elements of the imaging lens system is ΣCT, and a sum of all axial distances between adjacent lens elements of the imaging lens system is ΣAT, the following condition can be satisfied: 0.10<ΣCT/ΣAT<3.00. Therefore, it is favorable for adjusting a ratio of the sum of central thicknesses to the sum of axial distances so as to improve space utilization. Moreover, the following condition can also be satisfied: 0.80<ΣCT/ ΣAT<2.80. Moreover, the following condition can also be satisfied: 0.13<ΣCT/ΣAT<2.40. Moreover, the following condition can also be satisfied: 1.62≤ΣCT/ΣAT≤2.75.

When a focal length of the first lens element is f1, and a focal length of the seventh lens element is f7, the following condition can be satisfied: 0<|f1/f7|<1.00. Therefore, it is favorable for effectively adjusting a ratio of the focal length of the first lens element to the focal length of the seventh lens element so as to increase the symmetry of the imaging lens system and reduce light spots at center of the field of view. Moreover, the following condition can also be satisfied: 0.01<|f1/f7|<0.70. Moreover, the following condition can also be satisfied: 0.04≤|f1/f7|≤0.49.

When the axial distance between the object-side surface of the first lens element and the image surface is TL, and a maximum image height of the imaging lens system (which can be half of a diagonal length of an effective photosensitive area of an image sensor) is ImgH, the following condition can be satisfied: 2.00<TL/ImgH<8.00. Therefore, it is favorable for obtaining a balance between short total track length and large image surface. Moreover, the following condition can also be satisfied: 3.00<TL/ImgH<6.00. Moreover, the following condition can also be satisfied: 3.50<TL/ImgH<5.50.

When a maximum field of view of the imaging lens system is FOV, the following condition can be satisfied: 130.0 degrees<FOV<180.0 degrees. Therefore, it is favorable for obtaining sufficient imaging range so as to meet the requirement of field of view for various applications. Moreover, the following condition can also be satisfied: 140.0 degrees<FOV<170.0 degrees.

When the focal length of the first lens element is f1, and a focal length of the third lens element is f3, the following condition can be satisfied: −0.65<f1/f3<0.70. Therefore, it is favorable for adjusting a ratio of the focal length of the first lens element to the focal length of the third lens element so as to converge light with large view angle by the first lens element and balance the light with large view angle by the third lens element. Moreover, the following condition can also be satisfied: −0.60<f1/f3<0.40.

When the focal length of the imaging lens system is f, a focal length of the second lens element is f2, the focal length of the third lens element is f3, and the focal length of the seventh lens element is f7, the following condition can be satisfied: 0<|f/f2|+|f/f3|+|f/f7|<1.00. Therefore, it is favorable for adjusting the refractive power of the second lens element, the third lens element as well as the seventh lens element so as to balance convergence or divergence of incident light with large view angle to thereby enhance the convergence quality of light in full field. Moreover, the following condition can also be satisfied: $0.10 < |f/f2| + |f/f3| + |f/f7| < 0.90$.

When a central thickness of the fourth lens element is CT4, a central thickness of the fifth lens element is CT5, a central thickness of the sixth lens element is CT6, and an axial distance between the fifth lens element and the sixth lens element is T56, the following condition can be satisfied: $0.25 < CT4/(CT5+T56+CT6) < 0.70$. Therefore, it is favorable for balancing a ratio of the central thickness of the fourth lens element to the axial distance between the fifth lens element and the sixth lens element so as to obtain a better space arrangement. Moreover, the following condition can also be satisfied: $0.30 < CT4/(CT5+T56+CT6) < 0.60$.

When the curvature radius of the image-side surface of the second lens element is R4, and the curvature radius of the image-side surface of the fifth lens element is R10, the following condition can be satisfied: $0.10 < (R4+R10)/(R4-R10) < 15.00$. Therefore, it is favorable for effectively balancing the curvature radius of the image-side surface of the second lens element with the curvature radius of the image-side surface of the fifth lens element so as to balance spherical aberration at center of the field of view, thereby improving image quality. Moreover, the following condition can also be satisfied: $0.20 < (R4+R10)/(R4-R10) < 10.00$. Moreover, the following condition can also be satisfied: $0.30 < (R4+R10)/(R4-R10) < 5.00$.

When an Abbe number of the third lens element is V3, the following condition can be satisfied: $5.0 < V3 < 35.0$. Therefore, it is favorable for correcting chromatic aberration generated from the imaging lens system and improving image quality. Moreover, the following condition can also be satisfied: $10.0 < V3 < 30.0$.

Figure 28:
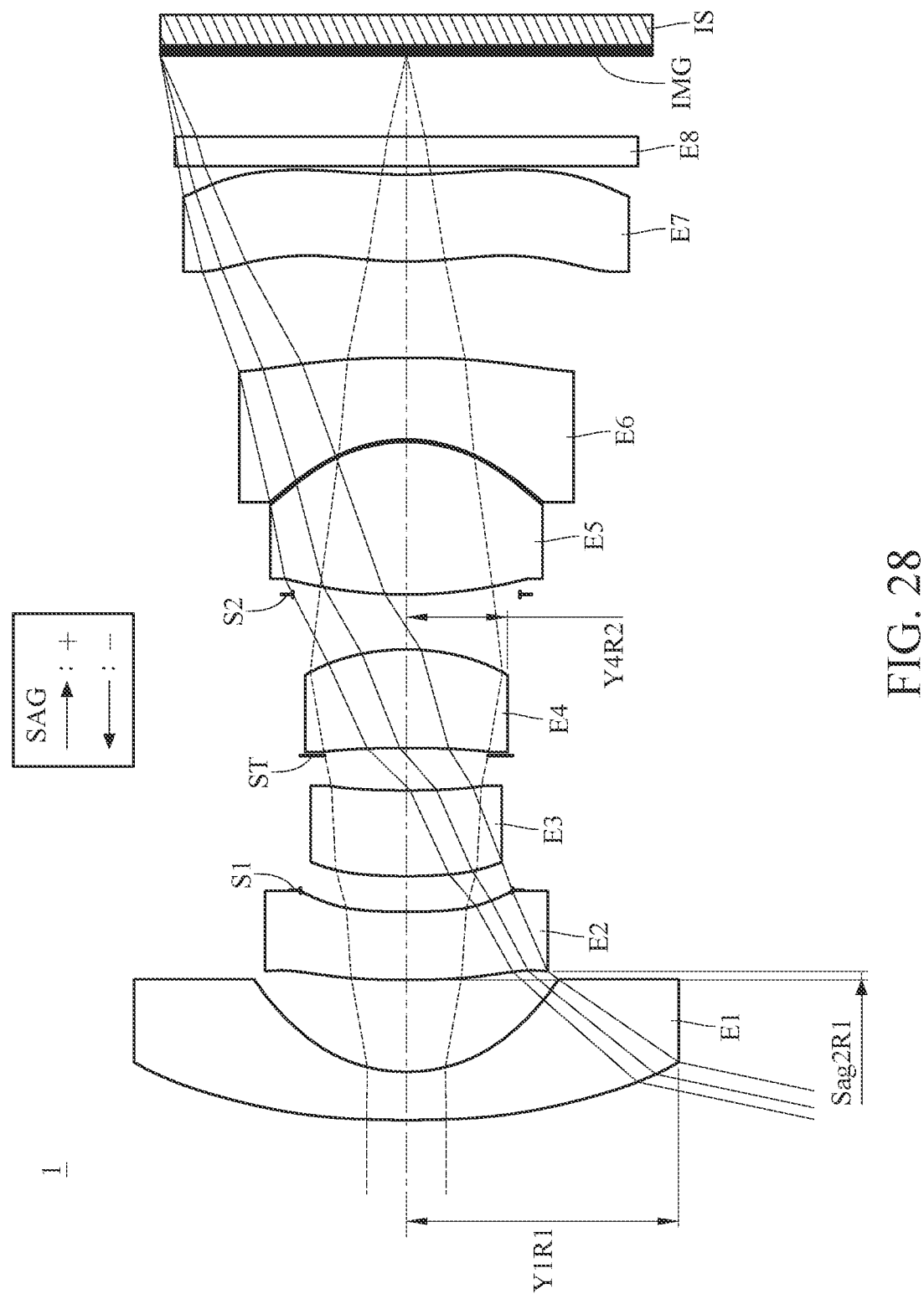
FIG. 28 shows a schematic view of Y1R1, Y4R2 and Sag2R1 according to the 1st embodiment of the present disclosure.

When a maximum effective radius of the object-side surface of the first lens element is Y1R1, and a maximum effective radius of the image-side surface of the fourth lens element is Y4R2, the following condition can be satisfied: $1.50 < Y1R1/Y4R2 < 3.00$. Therefore, it is favorable for adjusting the optically effective radii of the first lens element and the fourth lens element so as to balance the traveling direction light at the image side of the imaging lens system and reduce the incident angle on the image surface, thereby enlarging field of view and enhancing illumination. Moreover, the following condition can also be satisfied: $1.80 < Y1R1/Y4R2 < 2.80$. Please refer to FIG. 28, which shows a schematic view of Y1R1 and Y4R2 according to the 1st embodiment of the present disclosure.

When a displacement in parallel with an optical axis from an axial vertex on the object-side surface of the second lens element to a maximum effective radius position on the object-side surface of the second lens element is Sag2R1, and a central thickness of the second lens element is CT2, the following condition can be satisfied: $0.01 < |Sag2R1|/CT2 < 0.60$. Therefore, it is favorable for balancing the curvature at periphery of the object-side surface of the second lens element so as to enlarge the field of view and correct aberrations such as distortion. Moreover, the following condition can also be satisfied: $0.10 < |Sag2R1|/CT2 < 0.50$. Please refer to FIG. 28, which shows a schematic view of Sag2R1 according to the 1st embodiment of the present disclosure. When the direction from the axial vertex of one surface to the maximum effective radius position of the same surface is facing towards the image side of the imaging lens system, the value of displacement is positive; when the direction from the axial vertex of the surface to the maximum effective radius position of the same surface is facing towards the object side of the imaging lens system, the value of displacement is negative.

When the focal length of the imaging lens system is f, the focal length of the first lens element is f1, the focal length of the second lens element is f2, and the focal length of the seventh lens element is f7, the following condition can be satisfied: $0 < (|f/f2| + |f/f7|)/|f/f1| < 1.30$. Therefore, it is favorable for strengthening light divergence ability of the first lens element and balancing the seventh lens element with the second lens element so as to provide wide photographic field. Moreover, the following condition can also be satisfied: $0.01 < (|f/f2| + |f/f7|)/|f/f1| < 1.10$.

When an axial distance between the fourth lens element and the fifth lens element is T45, and the central thickness of the fifth lens element is CT5, the following condition can be satisfied: $0.07 < T45/CT5 < 0.90$. Therefore, it is favorable for controlling a ratio of the axial distance between the fourth lens element and the fifth lens element to the central thickness of the fifth lens element so as to reduce manufacturing variation. Moreover, the following condition can also be satisfied: $0.15 < T45/CT5 < 0.60$.

When an axial distance between the object-side surface of the first lens element and the image-side surface of the seventh lens element is TD, and an axial distance between the image-side surface of the seventh lens element and the image surface is BL, the following condition can be satisfied: $5.00 < TD/BL < 9.00$. Therefore, it is favorable for reducing the back focal length so as to reduce the size of the imaging lens system. Moreover, the following condition can also be satisfied: $5.50 < TD/BL < 8.50$.

When a maximum value among refractive indices of the second lens element, the third lens element and the seventh lens element is MAX_N237, the following condition can be satisfied: $1.500 < MAX\_N237 < 1.720$. Therefore, it is favorable for adjusting the optical path of the imaging lens system so as to balance the convergence ability at different wavelengths and correct chromatic aberration. Moreover, the following condition can also be satisfied: $1.600 < MAX\_N237 < 1.705$.

When the axial distance between the fifth lens element and the sixth lens element is T56, the following condition can be satisfied: $0.010 \text{ mm} < T56 < 0.050 \text{ mm}$. Therefore, it is favorable for a proper distance between aspheric surfaces of adjacent cemented lens elements so as to prevent uneven distribution of the cemented glue to the periphery of the lens element due to overly close lens surfaces. Moreover, the following condition can also be satisfied: $0.020 \text{ mm} < T56 < 0.040 \text{ mm}$.

When the curvature radius of the image-side surface of the fifth lens element is R10, the curvature radius of the object-side surface of the sixth lens element is R11, and the focal length of the imaging lens system is f, the following condition can be satisfied: $0.04 < |R10-R11| \times 10/f < 8.00$. Therefore, it is favorable for the aspheric surfaces of cemented lens elements having different curvature radii so as to enhance design flexibility. Moreover, the following condition can also be satisfied: $0.06 < |R10-R11| \times 10/f < 7.00$.

When the central thickness of the fourth lens element is CT4, and the central thickness of the fifth lens element is CT5, the following condition can be satisfied: $0.30 < CT4/CT5 < 0.85$. Therefore, it is favorable for balancing a ratio of the central thicknesses of the fourth lens element and the fifth lens element so as to reduce manufacturing variation and increase manufacturing yield rate. Moreover, the following condition can also be satisfied: $0.45 < CT4/CT5 < 0.75$.

When the curvature radius of the object-side surface of the fourth lens element is R7, and the curvature radius of the object-side surface of the sixth lens element is R11, the following condition can be satisfied: $0.35 < (R7-R11)/(R7+R11) < 3.00$. Therefore, it is favorable for effectively balancing the curvature radius of the object-side surface of the fourth lens element with the curvature radius of the object-side surface of the sixth lens element so as to correct astigmatism and improve image quality. Moreover, the following condition can also be satisfied: $0.50 < (R7-R11)/(R7+R11) < 2.00$.

When an axial distance between the first lens element and the second lens element is T12, an axial distance between the third lens element and the fourth lens element is T34, and the axial distance between the fourth lens element and the fifth lens element is T45, the following condition can be satisfied: $0.65 < (T34+T45)/T12 < 2.50$. Therefore, it is favorable for balancing the axial distances between the first and second lens elements, the third and fourth lens elements as well as the fourth and fifth lens elements so as to control the size of the imaging lens system. Moreover, the following condition can also be satisfied: $0.72 < (T34+T45)/T12 < 2.00$.

According to the present disclosure, the aforementioned features and conditions can be utilized in numerous combinations so as to achieve corresponding effects.

According to the present disclosure, the lens elements of the imaging lens system can be made of either glass or plastic material. When the lens elements are made of glass material, the refractive power distribution of the imaging lens system may be more flexible, and the influence on imaging caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric. Spherical lens elements are simple in manufacture. Aspheric lens element design allows more control variables for eliminating aberrations thereof and reducing the required number of lens elements, and the total track length of the imaging lens system can therefore be effectively shortened. Additionally, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally add an additive which generates light absorption and light interference effects, so as to alter the lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding. Moreover, the additive may be coated on the lens surfaces to provide the aforementioned effects.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, the image surface of the imaging lens system, based on the corresponding image sensor, can be flat or curved, especially a curved surface being concave facing towards the object side of the imaging lens system.

According to the present disclosure, an image correction unit, such as a field flattener, can be optionally disposed between the lens element closest to the image side of the imaging lens system along the optical path and the image surface for correction of aberrations such as field curvature. The optical characteristics of the image correction unit, such as curvature, thickness, refractive index, position and surface shape (convex or concave surface with spherical, aspheric, diffractive or Fresnel types), can be adjusted according to the requirements of the image capturing unit. In general, a preferable image correction unit is, for example, a thin plano-concave element having a concave object-side surface and a planar image-side surface, and the thin plano-concave element is disposed near the image surface.

Figure 29:
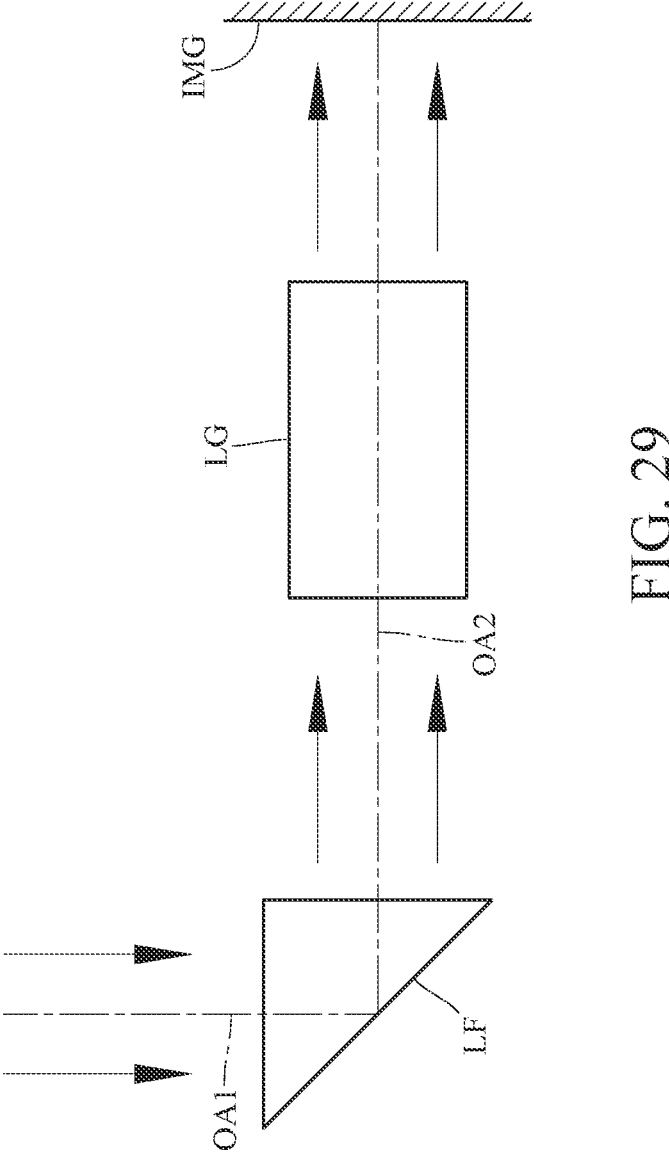
FIG. 29 shows a schematic view of a configuration of one light-folding element in an imaging lens system according to one embodiment of the present disclosure.
Figure 30:
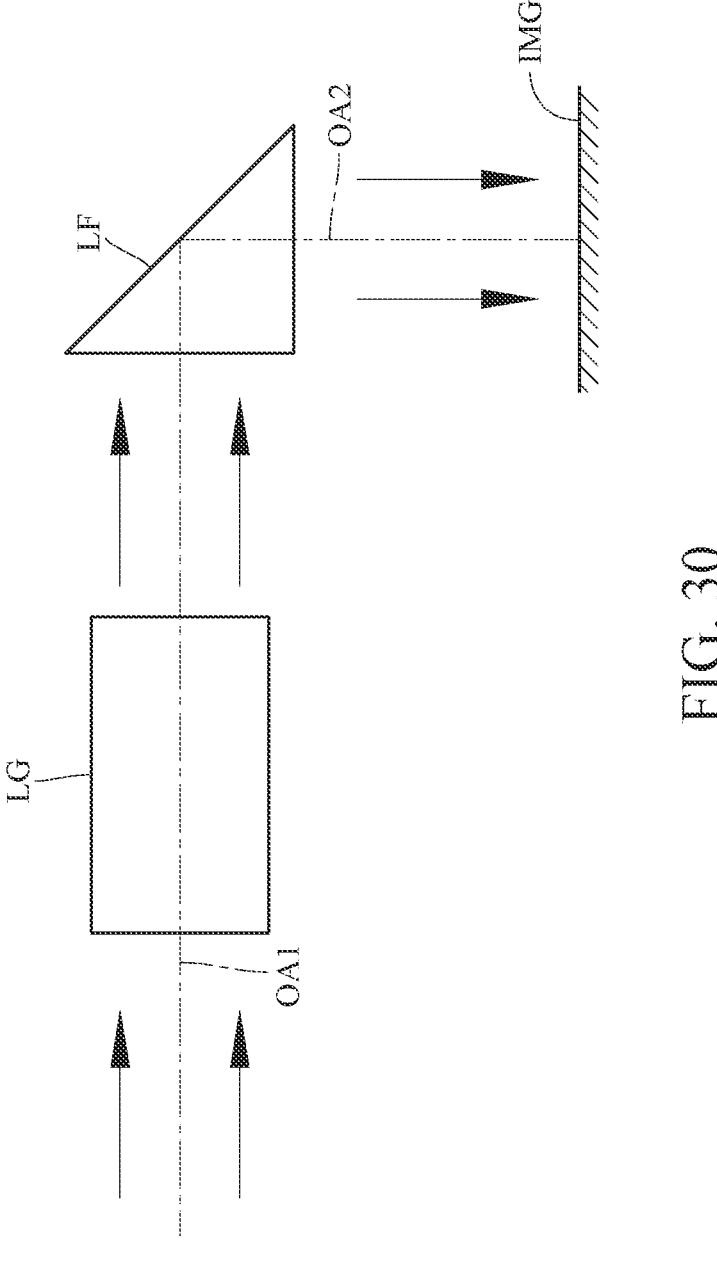
FIG. 30 shows a schematic view of another configuration of one light-folding element in an imaging lens system according to one embodiment of the present disclosure.
Figure 31:
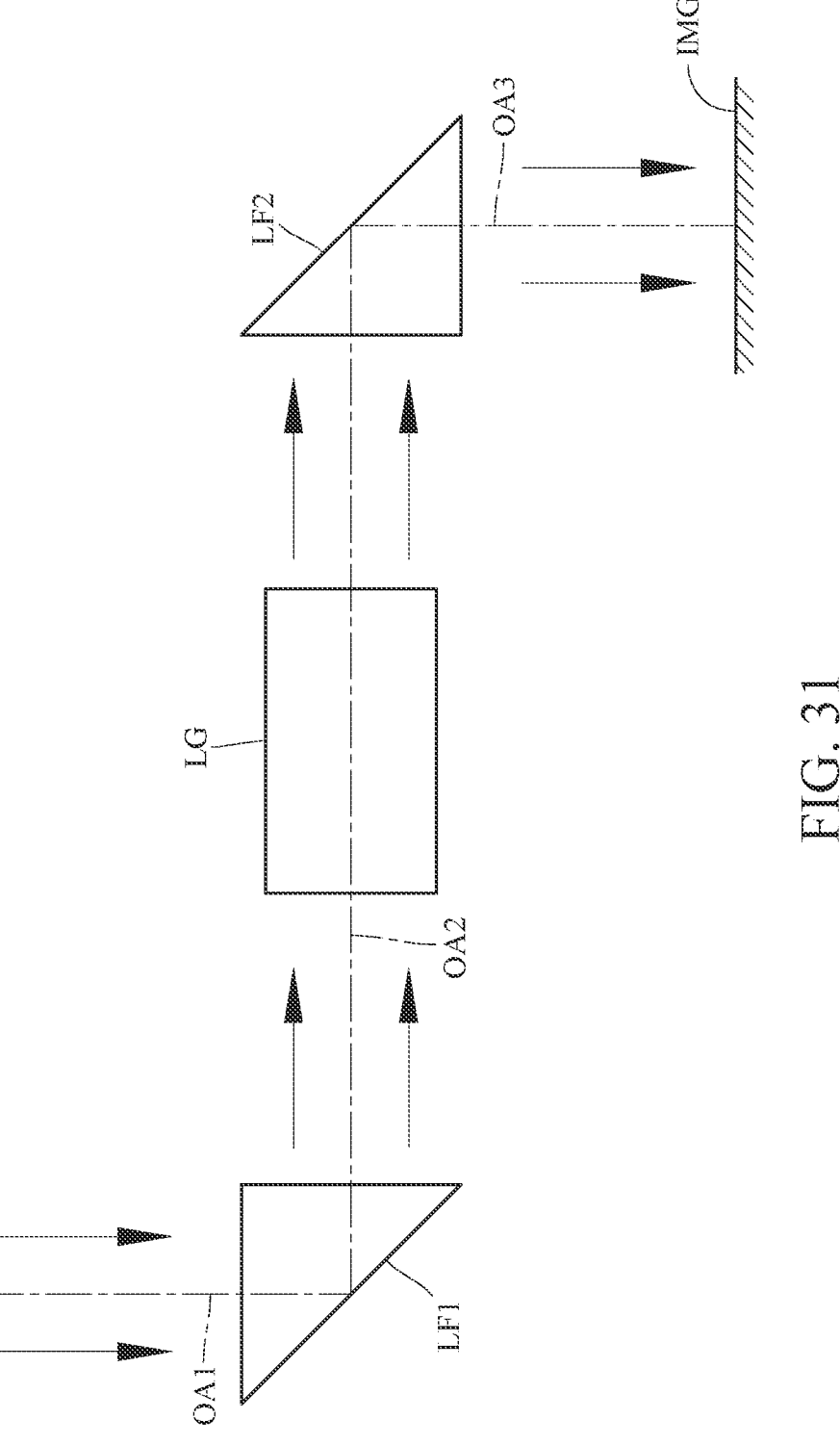
FIG. 31 shows a schematic view of a configuration of two light-folding elements in an imaging lens system according to one embodiment of the present disclosure.

According to the present disclosure, at least one light-folding element, such as a prism or a mirror, can be optionally disposed between an imaged object and the image surface on the imaging optical path, and the surface shape of the prism or mirror can be planar, spherical, aspheric or freeform surface, such that the imaging lens system can be more flexible in space arrangement, and therefore the dimensions of an electronic device is not restricted by the total track length of the imaging lens system. Specifically, please refer to FIG. 29 and FIG. 30. FIG. 29 shows a schematic view of a configuration of one light-folding element in an imaging lens system according to one embodiment of the present disclosure, and FIG. 30 shows a schematic view of another configuration of one light-folding element in an imaging lens system according to one embodiment of the present disclosure. In FIG. 29 and FIG. 30, the imaging lens system can have, in order from an imaged object (not shown in the figures) to an image surface IMG along an optical path, a first optical axis OA1, a light-folding element LF and a second optical axis OA2. The light-folding element LF can be disposed between the imaged object and a lens group LG of the imaging lens system as shown in FIG. 29, or disposed between a lens group LG of the imaging lens system and the image surface IMG as shown in FIG. 30. Furthermore, please refer to FIG. 31, which shows a schematic view of a configuration of two light-folding elements in an imaging lens system according to one embodiment of the present disclosure. In FIG. 31, the imaging lens system can have, in order from an imaged object (not shown in the figure) to an image surface IMG along an optical path, a first optical axis OA1, a first light-folding element LF1, a second optical axis OA2, a second light-folding element LF2 and a third optical axis OA3. The first light-folding element LF1 is disposed between the imaged object and a lens group LG of the imaging lens system, the second light-folding element LF2 is disposed between the lens group LG of the imaging lens system and the image surface IMG. The imaging lens system can be optionally provided with three or more light-folding elements, and the present disclosure is not limited to the type, amount and position of the light-folding elements of the embodiments disclosed in the aforementioned figures.

According to the present disclosure, the imaging lens system can include at least one stop, such as an aperture stop, a glare stop or a field stop. Said stop can be disposed between an imaged object and the first lens element, between adjacent lens elements, or between the last lens element and the image surface, and is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the imaging lens system and the image surface to produce a telecentric effect, and thereby improves the image-sensing efficiency of an image sensor (for example, CCD or CMOS). A middle stop disposed between the first lens element and the image surface is favorable for enlarging the viewing angle of the imaging lens system and thereby provides a wider field of view for the same.

According to the present disclosure, the imaging lens system can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or exposure speed.

According to the present disclosure, the imaging lens system can include one or more optical elements for limiting the form of light passing through the imaging lens system. Each optical element can be, but not limited to, a filter, a polarizer, etc., and each optical element can be, but not limited to, a single-piece element, a composite component, a thin film, etc. The optical element can be located at the object side or the image side of the imaging lens system or between any two adjacent lens elements so as to allow light in a specific form to pass through, thereby meeting application requirements.

According to the present disclosure, the imaging lens system can include at least one optical lens element, an optical element, or a carrier, which has at least one surface with a low reflection layer. The low reflection layer can effectively reduce stray light generated due to light reflection at the interface. The low reflection layer can be disposed in an optical non-effective area of an object-side surface or an image-side surface of the said optical lens element, or a connection surface between the object-side surface and the image-side surface. The said optical element can be a light-blocking element, an annular spacer, a barrel element, a cover glass, a blue glass, a filter, a color filter, an optical path folding element, a prism, a mirror, etc. The said carrier can be a base for supporting a lens assembly, a micro lens disposed on an image sensor, a substrate surrounding the image sensor, a glass plate for protecting the image sensor, etc.

According to the present disclosure, the object side and image side are defined in accordance with the direction of the optical axis, and the axial optical data are calculated along the optical axis. Furthermore, if the optical axis is folded by a light-folding element, the axial optical data are also calculated along the folded optical axis.

According to the above description of the present disclosure, the following specific embodiments are provided for further explanation.

1st Embodiment

Figure 2:
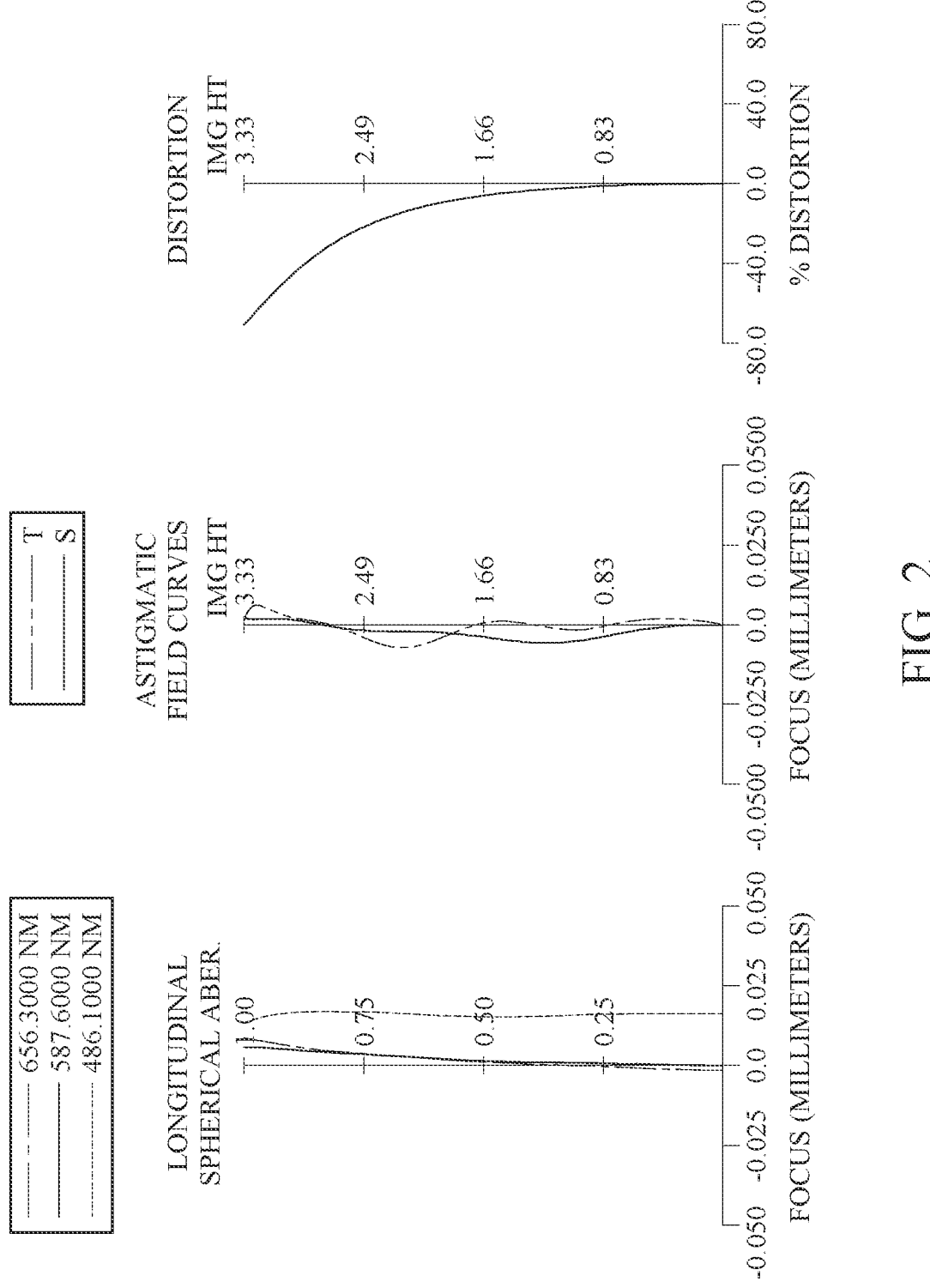
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit 1 includes an imaging lens system (its reference numeral is omitted) of the present disclosure and an image sensor IS. The imaging lens system includes, in order from an object side to an image side along an optical path, a first lens element E1, a second lens element E2, a stop S1, a third lens element E3, an aperture stop ST, a fourth lens element E4, a stop S2, a fifth lens element E5, a sixth lens element E6, a seventh lens element E7, a filter E8 and an image surface IMG. The imaging lens system includes seven lens elements (E1, E2, E3, E4, E5, E6 and E7) with no additional lens element disposed between each of the adjacent seven lens elements.

The first lens element E1 with negative refractive power has an object-side surface being convex in a paraxial region thereof and an image-side surface being concave in a paraxial region thereof. The first lens element E1 is made of glass material and has the object-side surface and the image-side surface being both aspheric.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has one inflection point. The object-side surface of the second lens element E2 has one concave critical point in an off-axis region thereof.

The third lens element E3 with positive refractive power has an object-side surface being convex in a paraxial region thereof and an image-side surface being concave in a paraxial region thereof. The third lens element E3 is made of plastic material and has the object-side surface and the image-side surface being both aspheric.

The fourth lens element E4 with positive refractive power has an object-side surface being concave in a paraxial region thereof and an image-side surface being convex in a paraxial region thereof. The fourth lens element E4 is made of glass material and has the object-side surface and the image-side surface being both aspheric.

The fifth lens element E5 with positive refractive power has an object-side surface being convex in a paraxial region thereof and an image-side surface being convex in a paraxial region thereof. The fifth lens element E5 is made of plastic material and has the object-side surface and the image-side surface being both aspheric. The image-side surface of the fifth lens element E5 has one inflection point.

The sixth lens element E6 with negative refractive power has an object-side surface being concave in a paraxial region thereof and an image-side surface being convex in a paraxial region thereof. The sixth lens element E6 is made of plastic material and has the object-side surface and the image-side surface being both aspheric. The object-side surface of the sixth lens element E6 has one inflection point. The image-side surface of the sixth lens element E6 has one inflection point. The image-side surface of the fifth lens element E5 is cemented to the object-side surface of the sixth lens element E6.

The seventh lens element E7 with positive refractive power has an object-side surface being convex in a paraxial region thereof and an image-side surface being concave in a paraxial region thereof. The seventh lens element E7 is made of plastic material and has the object-side surface and the image-side surface being both aspheric. The object-side surface of the seventh lens element E7 has two inflection points. The image-side surface of the seventh lens element E7 has two inflection points. The object-side surface of the seventh lens element E7 has one concave critical point in an off-axis region thereof. The image-side surface of the seventh lens element E7 has one convex critical point in an off-axis region thereof.

The filter E8 is made of glass material and located between the seventh lens element E7 and the image surface IMG, and will not affect the focal length of the imaging lens system. The image sensor IS is disposed on or near the image surface IMG of the imaging lens system.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the displacement in parallel with the optical axis from an axial vertex on the aspheric surface to a point at a distance of Y from the optical axis on the aspheric surface;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, and 16.

In the imaging lens system of the image capturing unit 1 according to the 1st embodiment, when a focal length of the imaging lens system is f, an f-number of the imaging lens system is Fno, and half of a maximum field of view of the imaging lens system is HFOV, these parameters have the following values: f=2.41 millimeters (mm), Fno=2.25, and HFOV=78.0 degrees (deg.).

When the maximum field of view of the imaging lens system is FOV, the following condition is satisfied: FOV=156.0 deg..

When the focal length of the imaging lens system is f, and an axial distance between the object-side surface of the first lens element E1 and the image surface IMG is TL, the following condition is satisfied: f/TL=0.17.

When the axial distance between the object-side surface of the first lens element E1 and the image surface IMG is TL, and a maximum image height of the imaging lens system is ImgH, the following condition is satisfied: TL/ImgH=4.33.

When an axial distance between the object-side surface of the first lens element E1 and the image-side surface of the seventh lens element E7 is TD, and an axial distance between the image-side surface of the seventh lens element E7 and the image surface IMG is BL, the following condition is satisfied: TD/BL=7.94.

When a focal length of the first lens element E1 is f1, and a focal length of the third lens element E3 is f3, the following condition is satisfied: f1/f3=−0.10.

When the focal length of the first lens element E1 is f1, and a focal length of the seventh lens element E7 is f7, the following condition is satisfied: |f1/f7|=0.13.

When the focal length of the imaging lens system is f, a focal length of the second lens element E2 is f2, the focal length of the third lens element E3 is f3, and the focal length of the seventh lens element E7 is f7, the following condition is satisfied: |f/f2|+|f/f3|+|f/f7|=0.19.

When the focal length of the imaging lens system is f, the focal length of the first lens element E1 is f1, the focal length of the second lens element E2 is f2, and the focal length of the seventh lens element E7 is f7, the following condition is satisfied: (|f/f2|+|f/f7|)/|f/f1|=0.14.

When a curvature radius of the image-side surface of the second lens element E2 is R4, and a curvature radius of the image-side surface of the fifth lens element E5 is R10, the following condition is satisfied: (R4+R10)/(R4−R10)=0.73.

When a curvature radius of the object-side surface of the fourth lens element E4 is R7, and a curvature radius of the image-side surface of the fourth lens element E4 is R8, the following condition is satisfied: (R7−R8)/(R7+R8)=0.64.

When the curvature radius of the object-side surface of the fourth lens element E4 is R7, and the curvature radius of the image-side surface of the fifth lens element E5 is R10, the following condition is satisfied: (R7−R10)/(R7+R10)=0.76.

When the curvature radius of the object-side surface of the fourth lens element E4 is R7, and a curvature radius of the object-side surface of the sixth lens element E6 is R11, the following condition is satisfied: (R7−R11)/(R7+R11)=0.75.

When a curvature radius of the image-side surface of the first lens element E1 is R2, and the curvature radius of the image-side surface of the second lens element E2 is R4, the following condition is satisfied: |R2/R4|=0.18.

When the curvature radius of the image-side surface of the fifth lens element E5 is R10, and the curvature radius of the object-side surface of the sixth lens element E6 is R11, the following condition is satisfied: R11/R10=1.06.

When the curvature radius of the image-side surface of the fifth lens element E5 is R10, the curvature radius of the object-side surface of the sixth lens element E6 is R11, and the focal length of the imaging lens system is f, the following condition is satisfied: |R10−R11|×10/f=0.49.

When a sum of central thicknesses of all lens elements of the imaging lens system is ΣCT, and a sum of all axial distances between adjacent lens elements of the imaging lens system is ΣAT, the following condition is satisfied: ΣCT/ΣAT=1.92. In this embodiment, ΣCT is equal to a sum of central thicknesses of the first lens element E1, the second lens element E2, the third lens element E3, the fourth lens element E4, the fifth lens element E5, the sixth lens element E6 and the seventh lens element E7. In this embodiment, ΣAT is equal to a sum of axial distances between adjacent two of the first lens element E1, the second lens element E2, the third lens element E3, the fourth lens element E4, the fifth lens element E5, the sixth lens element E6 and the seventh lens element E7. In this embodiment, an axial distance between two adjacent lens elements is a distance in a paraxial region between two adjacent lens surfaces of the two adjacent lens elements.

When an axial distance between the object-side surface of the first lens element E1 and the image-side surface of the third lens element E3 is Dr1r6, and an axial distance between the object-side surface of the fourth lens element E4 and the image-side surface of the seventh lens element E7 is Dr7r14, the following condition is satisfied: Dr7r14/Dr1r6=1.74.

When a central thickness of the fourth lens element E4 is CT4, a central thickness of the fifth lens element E5 is CT5, a central thickness of the sixth lens element E6 is CT6, and an axial distance between the fifth lens element E5 and the sixth lens element E6 is T56, the following condition is satisfied: CT4/(CT5+T56+CT6)=0.42.

When the central thickness of the fourth lens element E4 is CT4, and the central thickness of the fifth lens element E5 is CT5, the following condition is satisfied: CT4/CT5=0.64.

When an axial distance between the first lens element E1 and the second lens element E2 is T12, an axial distance between the third lens element E3 and the fourth lens element E4 is T34, and an axial distance between the fourth lens element E4 and the fifth lens element E5 is T45, the following condition is satisfied: (T34+T45)/T12=1.06.

When the axial distance between the fourth lens element E4 and the fifth lens element E5 is T45, and the central thickness of the fifth lens element E5 is CT5, the following condition is satisfied: T45/CT5=0.36.

When the axial distance between the fifth lens element E5 and the sixth lens element E6 is T56, the following condition is satisfied: T56=0.031 mm.

When an Abbe number of the second lens element E2 is V2, and a refractive index of the second lens element E2 is N2, the following condition is satisfied: V2/N2=9.61.

When an Abbe number of the third lens element E3 is V3, the following condition is satisfied: V3=16.3.

When a maximum value among refractive indices of the second lens element E2, the third lens element E3 and the seventh lens element E7 is MAX_N237, the following condition is satisfied: MAX_N237=1.697. In this embodiment, each of the second lens element E2 and the third lens element E3 has a larger refractive index than the first lens element E1, the fourth lens element E4, the fifth lens element E5, the sixth lens element E6 and the seventh lens element E7, such that MAX_N237 is equal to the refractive index of the second lens element E2 or a refractive index of the third lens element E3.

When a maximum effective radius of the object-side surface of the first lens element E1 is Y1R1, and a maximum effective radius of the image-side surface of the fourth lens element E4 is Y4R2, the following condition is satisfied: Y1R1/Y4R2=2.56.

When a displacement in parallel with the optical axis from an axial vertex on the object-side surface of the second lens element E2 to a maximum effective radius position on the object-side surface of the second lens element E2 is Sag2R1, and a central thickness of the second lens element E2 is CT2, the following condition is satisfied: |Sag2R1|/CT2=0.13.

The detailed optical data of the 1st embodiment are shown in Table 1A and the aspheric surface data are shown in Table 1B below.

TABLE 1A

| 1st Embodiment f = 2.41 mm, Fno = 2.25, HFOV = 78.0 deg. | | | | | | | |
|---|---|---|---|---|---|---|---|
| Surface # | | Curvature Radius | Thickness | Material | Index | Abbe # | Focal Length |
| 0 | Object | Plano | Infinity | | | | |
| 1 | Lens 1 | 19.0369 (ASP) | 0.650 | Glass | 1.804 | 46.6 | −3.13 |
| 2 | | 2.1909 (ASP) | 1.242 | | | | |
| 3 | Lens 2 | 12.9771 (ASP) | 0.921 | Plastic | 1.697 | 16.3 | −296.56 |
| 4 | | 11.8547 (ASP) | 0.290 | | | | |
| 5 | Stop | Plano | 0.195 | | | | |
| 6 | Lens 3 | 10.2839 (ASP) | 1.159 | Plastic | 1.697 | 16.3 | 32.13 |
| 7 | | 18.1338 (ASP) | 0.470 | | | | |
| 8 | Ape. Stop | Plano | 0.103 | | | | |
| 9 | Lens 4 | −13.7402 (ASP) | 1.331 | Glass | 1.800 | 42.3 | 4.61 |
| 10 | | −3.0299 (ASP) | 0.741 | | | | |
| 11 | Stop | Plano | 0.000 | | | | |
| 12 | Lens 5 | 6.0500 (ASP) | 2.065 | Plastic | 1.545 | 56.0 | 2.90 |
| 13 | | −1.8769 (ASP) | 0.031 | Cement | 1.485 | 53.2 | — |
| 14 | Lens 6 | −1.9949 (ASP) | 1.107 | Plastic | 1.671 | 19.5 | −3.52 |
| 15 | | −15.6216 (ASP) | 1.299 | | | | |
| 16 | Lens 7 | 5.0167 (ASP) | 1.175 | Plastic | 1.545 | 56.0 | 23.67 |
| 17 | | 7.5330 (ASP) | 0.113 | | | | |
| 18 | Filter | Plano | 0.400 | Glass | 1.517 | 64.2 | — |
| 19 | | Plano | 1.097 | | | | |
| 20 | Image | Plano | — | | | | |

Note:

Reference wavelength is 587.6 nm (d-line).

An effective radius of the stop S1 (Surface 5) is 1.428 mm.

An effective radius of the stop S2 (Surface 11) is 1.531 mm.

TABLE 1B

| | | Aspheric Coefficients | | |
|---|---|---|---|---|
| Surface # | 1 | 2 | 3 | 4 |
| k = | 1.720630E+01 | −2.393840E−01 | −9.000000E+01 | 4.394330E+01 |
| A4 = | 9.518214E−03 | 7.870326E−03 | 1.855057E−02 | 5.707350E−02 |
| A6 = | −1.685389E−03 | 3.487993E−04 | −4.772298E−04 | −9.424480E−06 |
| A8 = | 1.490280E−04 | 3.217619E−05 | −5.524841E−04 | 9.852934E−04 |
| A10 = | −6.529954E−06 | −3.186748E−04 | −1.457332E−03 | −7.734002E−03 |
| A12 = | 1.191177E−07 | 4.939074E−05 | 6.381356E−04 | 4.209621E−03 |
| A14 = | — | — | −9.840051E−05 | −9.219160E−04 |
| A16 = | — | — | 5.436988E−06 | 8.471362E−05 |

| Surface # | 6 | 7 | 9 | 10 |
|---|---|---|---|---|
| k = | −1.059810E+01 | −3.771420E+00 | 8.463540E+01 | 3.527400E−01 |
| A4 = | 4.889434E−02 | 2.430059E−02 | 1.917889E−03 | −3.133831E−03 |
| A6 = | −4.526117E−03 | −2.205769E−03 | −3.992214E−04 | 8.482998E−05 |
| A8 = | 6.996330E−04 | 1.113688E−02 | 3.960487E−04 | −3.839696E−04 |
| A10 = | −1.388261E−03 | −1.653383E−02 | −1.639978E−05 | 1.446533E−04 |
| A12 = | 9.522269E−04 | 1.540276E−02 | −1.784331E−18 | −5.034497E−05 |
| A14 = | −3.132345E−04 | −7.500534E−03 | — | — |
| A16 = | 4.724602E−05 | 1.471097E−03 | — | — |

| Surface # | 12 | 13 | 14 | 15 |
|---|---|---|---|---|
| k = | −4.641730E+00 | −7.339550E−01 | −5.270360E−01 | −2.830500E+01 |
| A4 = | −8.280954E−05 | 1.241490E−01 | 3.142037E−02 | −1.526877E−02 |
| A6 = | 2.795368E−04 | −2.256069E−01 | −6.210857E−02 | 6.898878E−03 |
| A8 = | 8.401154E−05 | 2.100122E−01 | 6.654564E−02 | −1.702348E−03 |
| A10 = | −5.182059E−05 | −1.144294E−01 | −3.791621E−02 | 2.801656E−04 |
| A12 = | 3.095619E−05 | 3.665269E−02 | 1.217810E−02 | −3.342216E−05 |
| A14 = | −1.114069E−05 | −6.323851E−03 | −2.078747E−03 | 2.983805E−06 |
| A16 = | 1.251314E−06 | 4.514509E−04 | 1.473012E−04 | −1.270003E−07 |

| Surface # | 16 | 17 |
|---|---|---|
| k = | −2.438820E+01 | −1.146810E+01 |
| A4 = | −1.382237E−02 | −1.760240E−02 |
| A6 = | −5.473000E−03 | 9.218012E−04 |
| A8 = | 2.823813E−03 | 4.475012E−04 |
| A10 = | −5.867681E−04 | −1.451907E−04 |
| A12 = | 6.523298E−05 | 1.809851E−05 |
| A14 = | −3.622161E−06 | −1.071479E−06 |
| A16 = | 7.725145E−08 | 2.662427E−08 |

In Table 1A, the curvature radius, the thickness and the focal length are shown in millimeters (mm). Surface numbers 0-20 represent the surfaces sequentially arranged from the object side to the image side along the optical axis. In Table 1B, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as Table 1A and Table 1B of the 1st embodiment. Therefore, an explanation in this regard will not be provided again.

2nd Embodiment

Figure 3:
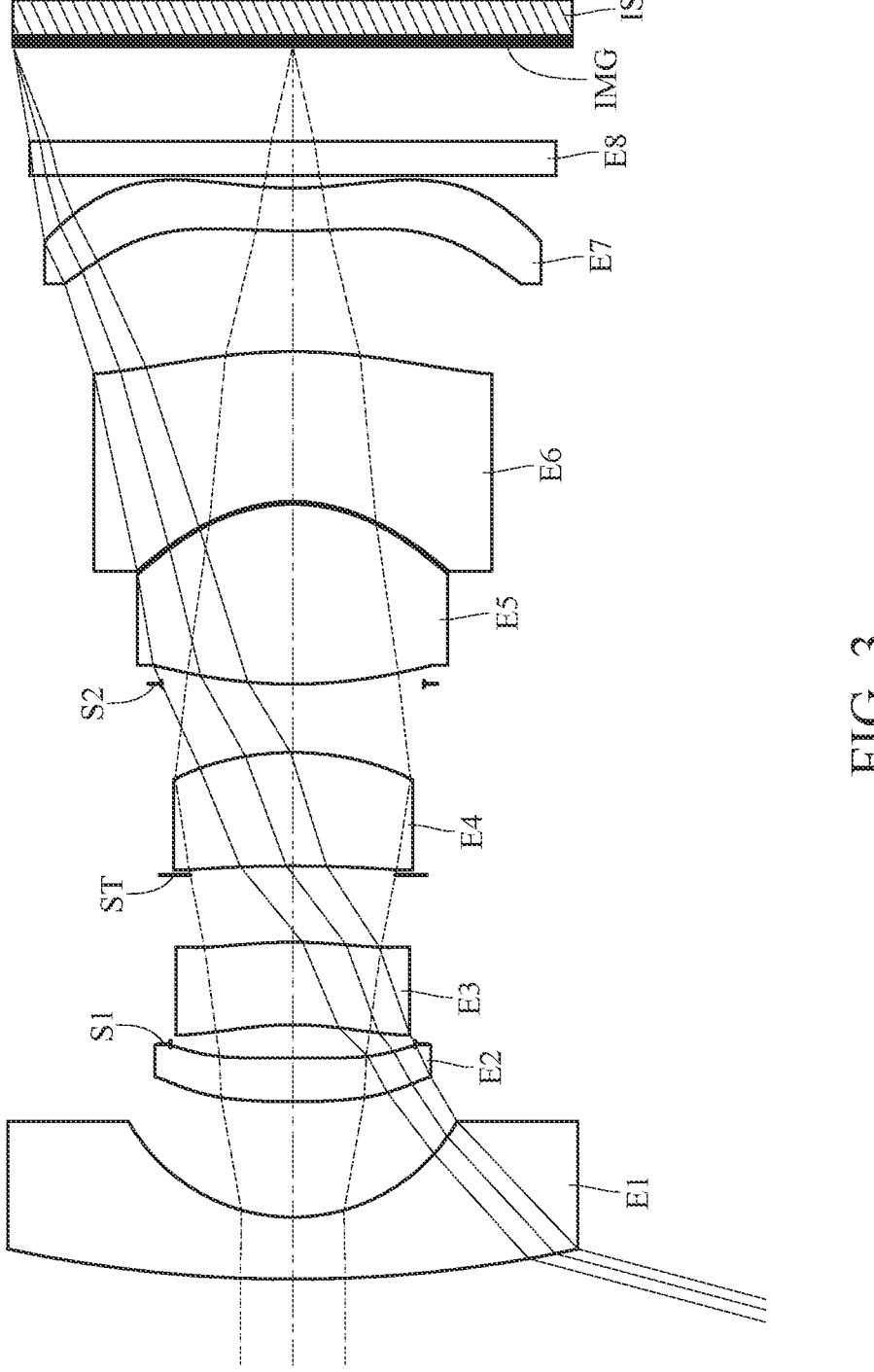
FIG. 3 is a schematic view of an image capturing unit according to the 2nd embodiment of the present disclosure.
Figure 4:
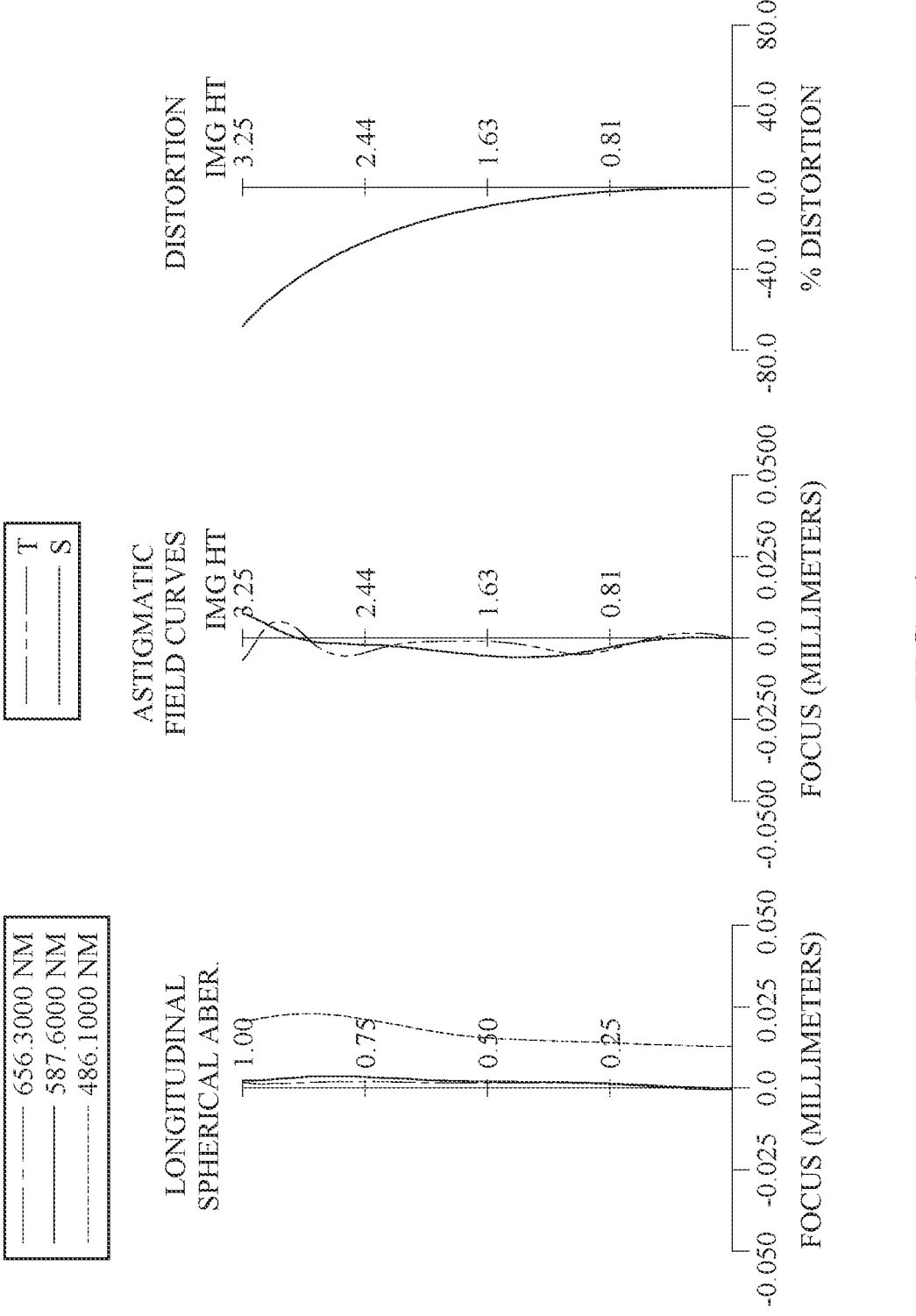
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit 2 includes an imaging lens system (its reference numeral is omitted) of the present disclosure and an image sensor IS. The imaging lens system includes, in order from an object side to an image side along an optical path, a first lens element E1, a second lens element E2, a stop S1, a third lens element E3, an aperture stop ST, a fourth lens element E4, a stop S2, a fifth lens element E5, a sixth lens element E6, a seventh lens element E7, a filter E8 and an image surface IMG. The imaging lens system includes seven lens elements (E1, E2, E3, E4, E5, E6 and E7) with no additional lens element disposed between each of the adjacent seven lens elements.

The first lens element E1 with negative refractive power has an object-side surface being convex in a paraxial region thereof and an image-side surface being concave in a paraxial region thereof. The first lens element E1 is made of glass material and has the object-side surface and the image-side surface being both spherical.

The second lens element E2 with positive refractive power has an object-side surface being convex in a paraxial region thereof and an image-side surface being convex in a paraxial region thereof. The second lens element E2 is made of plastic material and has the object-side surface and the image-side surface being both aspheric. The object-side surface of the second lens element E2 has one inflection point. The image-side surface of the second lens element E2 has one inflection point. The image-side surface of the second lens element E2 has one concave critical point in an off-axis region thereof.

The third lens element E3 with negative refractive power has an object-side surface being concave in a paraxial region thereof and an image-side surface being convex in a paraxial region thereof. The third lens element E3 is made of plastic material and has the object-side surface and the image-side surface being both aspheric. The object-side surface of the third lens element E3 has one inflection point. The image-side surface of the third lens element E3 has one inflection point. The object-side surface of the third lens element E3 has one convex critical point in an off-axis region thereof. The image-side surface of the third lens element E3 has one concave critical point in an off-axis region thereof.

The fourth lens element E4 with positive refractive power has an object-side surface being concave in a paraxial region thereof and an image-side surface being convex in a paraxial region thereof. The fourth lens element E4 is made of glass material and has the object-side surface and the image-side surface being both aspheric.

The fifth lens element E5 with positive refractive power has an object-side surface being convex in a paraxial region thereof and an image-side surface being convex in a paraxial region thereof. The fifth lens element E5 is made of plastic material and has the object-side surface and the image-side surface being both aspheric.

The sixth lens element E6 with negative refractive power has an object-side surface being concave in a paraxial region thereof and an image-side surface being convex in a paraxial region thereof. The sixth lens element E6 is made of plastic material and has the object-side surface and the image-side surface being both aspheric. The image-side surface of the sixth lens element E6 has one inflection point. The image-side surface of the fifth lens element E5 is cemented to the object-side surface of the sixth lens element E6.

The seventh lens element E7 with negative refractive power has an object-side surface being convex in a paraxial region thereof and an image-side surface being concave in a paraxial region thereof. The seventh lens element E7 is made of plastic material and has the object-side surface and the image-side surface being both aspheric. The object-side surface of the seventh lens element E7 has one inflection point. The image-side surface of the seventh lens element E7 has one inflection point. The object-side surface of the seventh lens element E7 has one concave critical point in an off-axis region thereof. The image-side surface of the seventh lens element E7 has one convex critical point in an off-axis region thereof.

The filter E8 is made of glass material and located between the seventh lens element E7 and the image surface IMG, and will not affect the focal length of the imaging lens system. The image sensor IS is disposed on or near the image surface IMG of the imaging lens system.

The detailed optical data of the 2nd embodiment are shown in Table 2A and the aspheric surface data are shown in Table 2B below.

TABLE 2A

| | | | | | | | |
|---|---|---|---|---|---|---|---|
| 2nd Embodiment f = 2.74 mm, Fno = 2.25, HFOV = 75.0 deg. | | | | | | | |
| Surface # | | Curvature Radius | Thickness | Material | Index | Abbe # | Focal Length |
| 0 | Object | Plano | Infinity | | | | |
| 1 | Lens 1 | 15.7931 (SPH) | 0.723 | Glass | 1.713 | 53.8 | −3.67 |
| 2 | | 2.2018 (SPH) | 1.346 | | | | |
| 3 | Lens 2 | 12.4591 (ASP) | 0.510 | Plastic | 1.671 | 19.5 | 11.79 |
| 4 | | −21.3134 (ASP) | 0.160 | | | | |
| 5 | Stop | Plano | 0.225 | | | | |
| 6 | Lens 3 | −3.6351 (ASP) | 0.961 | Plastic | 1.587 | 28.3 | −25.20 |
| 7 | | −5.2904 (ASP) | 0.787 | | | | |
| 8 | Ape. Stop | Plano | 0.100 | | | | |
| 9 | Lens 4 | −14.7100 (ASP) | 1.321 | Glass | 1.743 | 49.2 | 5.63 |
| 10 | | −3.3840 (ASP) | 0.797 | | | | |
| 11 | Stop | Plano | 0.000 | | | | |
| 12 | Lens 5 | 5.6926 (ASP) | 2.096 | Plastic | 1.545 | 56.0 | 2.77 |
| 13 | | −1.7851 (ASP) | 0.031 | Cement | 1.485 | 53.2 | — |
| 14 | Lens 6 | −1.8167 (ASP) | 1.744 | Plastic | 1.671 | 19.5 | −4.55 |
| 15 | | −6.2111 (ASP) | 1.405 | | | | |
| 16 | Lens 7 | 7.9389 (ASP) | 0.500 | Plastic | 1.566 | 37.4 | −18.83 |
| 17 | | 4.4466 (ASP) | 0.144 | | | | |
| 18 | Filter | Plano | 0.400 | Glass | 1.517 | 64.2 | — |
| 19 | | Plano | 1.097 | | | | |
| 20 | Image | Plano | — | | | | |

Note:
Reference wavelength is 587.6 nm (d-line).
An effective radius of the stop S1 (Surface 5) is 1.424 mm.
An effective radius of the stop S2 (Surface 11) is 1.525 mm.

TABLE 2B

| | | | | |
|---|---|---|---|---|
| Aspheric Coefficients | | | | |
| Surface # | 3 | 4 | 6 | 7 |
| k = | 4.348450E+01 | 9.000000E+01 | −1.217870E+00 | −3.864950E+00 |
| A4 = | 4.402179E−02 | 7.254236E−02 | 5.555651E−02 | 3.719164E−02 |
| A6 = | −7.982766E−03 | −1.653010E−02 | −2.756774E−02 | −9.476634E−03 |
| A8 = | 3.916888E−03 | 1.039855E−02 | 2.570082E−02 | 1.264976E−02 |
| A10 = | −3.786498E−03 | −9.490568E−03 | −1.922220E−02 | −1.092817E−02 |
| A12 = | 2.278699E−03 | 6.595741E−03 | 1.049711E−02 | 6.835430E−03 |

TABLE 2B-continued

| Aspheric Coefficients | | | |
|---|---|---|---|
| A14 = | −8.368653E−04 | −2.994799E−03 | −3.475686E−03 | −2.439148E−03 |
| A16 = | 1.126190E−04 | 5.405926E−04 | 5.202120E−04 | 4.053719E−04 |

| Surface # | 9 | 10 | 12 | 13 |
|---|---|---|---|---|
| k = | 8.501890E+01 | 1.987140E−01 | −4.539760E+00 | −8.141650E−01 |
| A4 = | 1.214166E−02 | −6.036195E−04 | 2.512325E−03 | 1.336288E−01 |
| A6 = | −4.641774E−03 | −2.190703E−03 | −1.275622E−03 | −2.411011E−01 |
| A8 = | 8.768388E−04 | 8.577967E−05 | 7.708265E−05 | 2.308995E−01 |
| A10 = | −1.704700E−04 | 1.569983E−05 | 1.620020E−04 | −1.252628E−01 |
| A12 = | 6.184723E−17 | −2.349006E−05 | −9.262891E−05 | 3.880401E−02 |
| A14 = | — | — | 2.523901E−05 | −6.381877E−03 |
| A16 = | — | — | −2.984518E−06 | 4.319909E−04 |

| Surface # | 14 | 15 | 16 | 17 |
|---|---|---|---|---|
| k = | −6.522830E−01 | −3.259510E+01 | −9.000000E+01 | −1.508860E+01 |
| A4 = | 6.112604E−02 | −1.059554E−02 | −2.076297E−02 | −2.205278E−02 |
| A6 = | −8.338957E−02 | 5.772006E−03 | −4.867577E−03 | 4.611002E−04 |
| A8 = | 7.979849E−02 | −1.716712E−03 | 3.062882E−03 | 3.268054E−04 |
| A10 = | −4.335554E−02 | 3.636550E−04 | −8.325997E−04 | −1.020184E−04 |
| A12 = | 1.342186E−02 | −5.065448E−05 | 1.250499E−04 | 1.174604E−05 |
| A14 = | −2.218527E−03 | 4.044475E−06 | −9.476551E−06 | −4.026856E−07 |
| A16 = | 1.524794E−04 | −1.308798E−07 | 2.777192E−07 | −7.084553E−09 |

In the 2nd embodiment, the equation of the aspheric surface profiles of the aforementioned lens elements is the same as the equation of the 1st embodiment. Also, the definitions of these parameters shown in Table 2C below are the same as those stated in the 1st embodiment with corresponding values for the 2nd embodiment, so an explanation in this regard will not be provided again.

Moreover, these parameters can be calculated from Table 2A and Table 2B as the following values and satisfy the following conditions:

TABLE 2C

| Values of Conditional Expressions | | | |
|---|---|---|---|
| f [mm] | 2.74 | |R2/R4| | 0.10 |
| Fno | 2.25 | R11/R10 | 1.02 |
| HFOV [deg.] | 75.0 | |R10 − R11| × 10/f | 0.12 |
| FOV [deg.] | 150.0 | ΣCT/ΣAT | 1.62 |
| f/TL | 0.19 | Dr7r14/Dr1r6 | 2.01 |
| TL/ImgH | 4.41 | CT4/(CT5 + T56 + CT6) | 0.34 |
| TD/BL | 7.74 | CT4/CT5 | 0.63 |
| f1/f3 | 0.15 | (T34 + T45)/T12 | 1.25 |
| |f1/f7| | 0.19 | T45/CT5 | 0.38 |
| |f/f2| + |f/f3| + |f/f7| | 0.49 | T56 [mm] | 0.031 |
| (|f/f2| + |f/f7|)/|f/f1| | 0.51 | V2/N2 | 11.67 |
| (R4 + R10)/(R4 − R10) | 1.18 | V3 | 28.3 |
| (R7 − R8)/(R7 + R8) | 0.63 | MAX_N237 | 1.671 |
| (R7 − R10)/(R7 + R10) | 0.78 | Y1R1/Y4R2 | 2.24 |
| (R7 − R11)/(R7 + R11) | 0.78 | |Sag2R1|/CT2 | 0.57 |

3rd Embodiment

Figure 5:
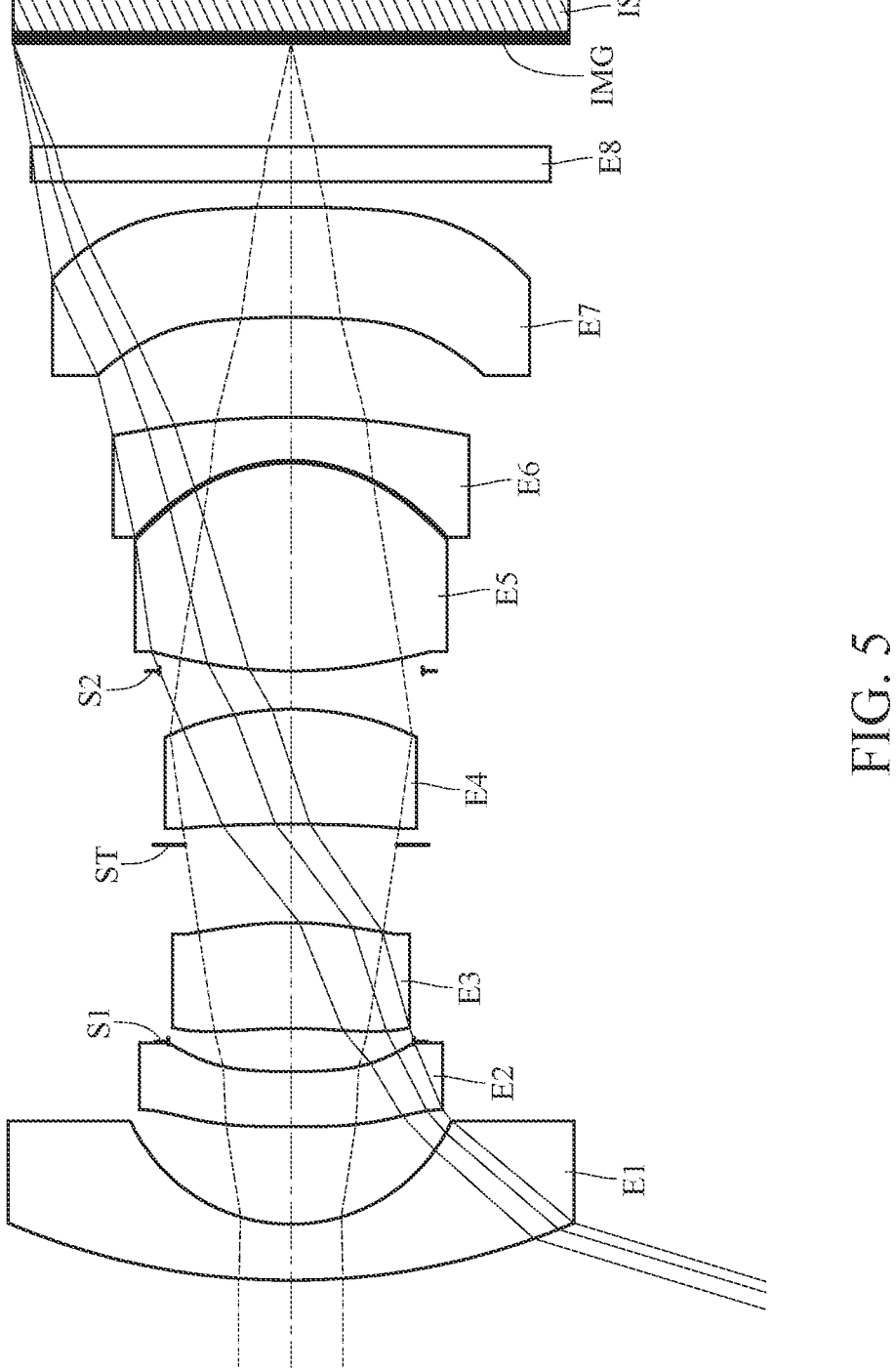
FIG. 5 is a schematic view of an image capturing unit according to the 3rd embodiment of the present disclosure.
Figure 6:
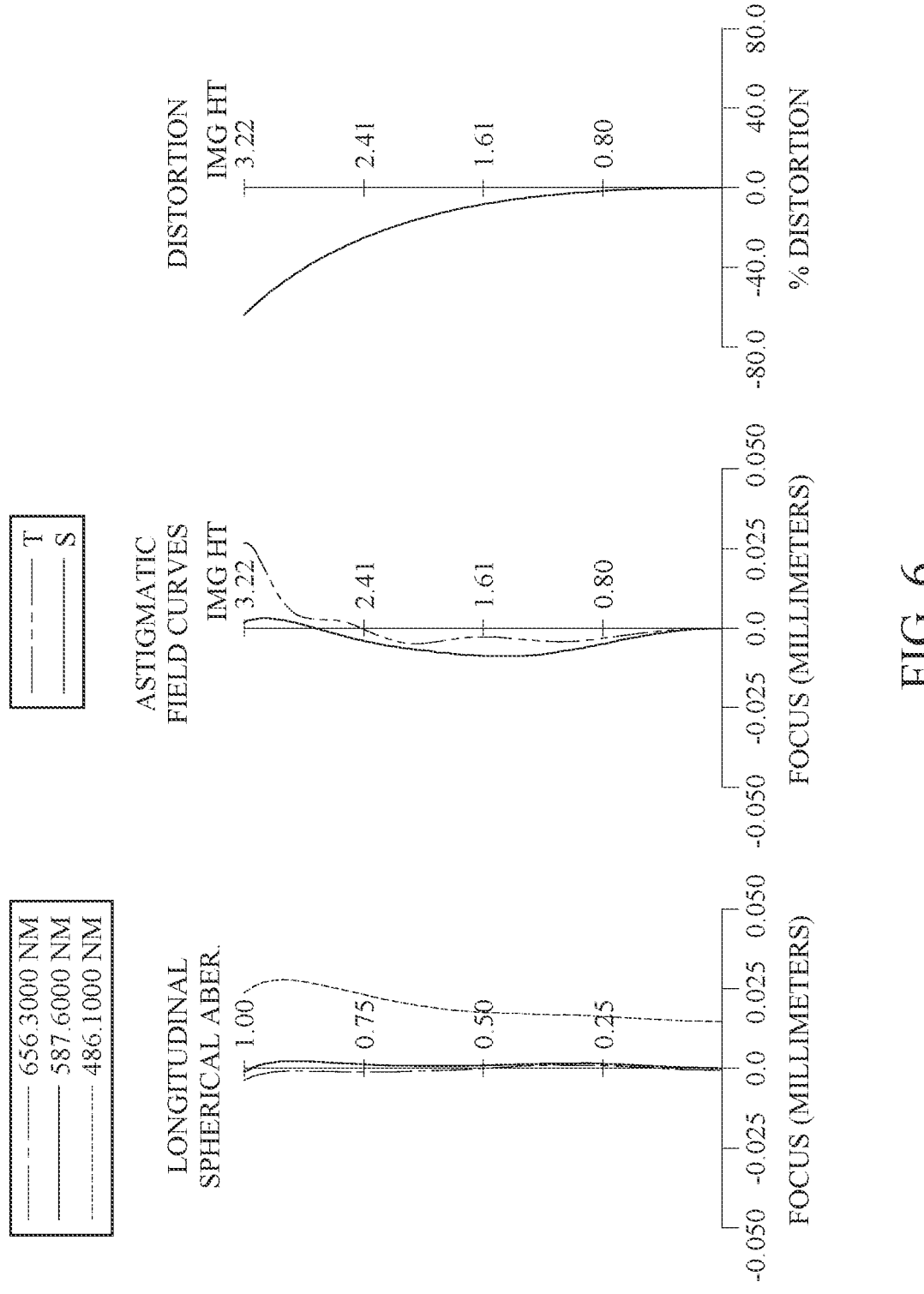
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit 3 includes an imaging lens system (its reference numeral is omitted) of the present disclosure and an image sensor IS. The imaging lens system includes, in order from an object side to an image side along an optical path, a first lens element E1, a second lens element E2, a stop S1, a third lens element E3, an aperture stop ST, a fourth lens element E4, a stop S2, a fifth lens element E5, a sixth lens element E6, a seventh lens element E7, a filter E8 and an image surface IMG. The imaging lens system includes seven lens elements (E1, E2, E3, E4, E5, E6 and E7) with no additional lens element disposed between each of the adjacent seven lens elements.

The first lens element E1 with negative refractive power has an object-side surface being convex in a paraxial region thereof and an image-side surface being concave in a paraxial region thereof. The first lens element E1 is made of glass material and has the object-side surface and the image-side surface being both spherical.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has one inflection point.

The third lens element E3 with positive refractive power has an object-side surface being concave in a paraxial region thereof and an image-side surface being convex in a paraxial region thereof. The third lens element E3 is made of plastic material and has the object-side surface and the image-side surface being both aspheric. The object-side surface of the third lens element E3 has one inflection point. The image-side surface of the third lens element E3 has one inflection point. The object-side surface of the third lens element E3 has one convex critical point in an off-axis region thereof.

The fourth lens element E4 with positive refractive power has an object-side surface being concave in a paraxial region thereof and an image-side surface being convex in a paraxial region thereof. The fourth lens element E4 is made of glass material and has the object-side surface and the image-side surface being both aspheric.

The fifth lens element E5 with positive refractive power has an object-side surface being convex in a paraxial region thereof and an image-side surface being convex in a paraxial region thereof. The fifth lens element E5 is made of plastic material and has the object-side surface and the image-side surface being both aspheric.

The sixth lens element E6 with negative refractive power has an object-side surface being concave in a paraxial region thereof and an image-side surface being convex in a paraxial region thereof. The sixth lens element E6 is made of plastic material and has the object-side surface and the image-side surface being both aspheric. The image-side surface of the sixth lens element E6 has one inflection point. The image-side surface of the fifth lens element E5 is cemented to the object-side surface of the sixth lens element E6.

The seventh lens element E7 with negative refractive power has an object-side surface being concave in a paraxial region thereof and an image-side surface being convex in a paraxial region thereof. The seventh lens element E7 is made of plastic material and has the object-side surface and the image-side surface being both aspheric.

The filter E8 is made of glass material and located between the seventh lens element E7 and the image surface IMG, and will not affect the focal length of the imaging lens system. The image sensor IS is disposed on or near the image surface IMG of the imaging lens system.

The detailed optical data of the 3rd embodiment are shown in Table 3A and the aspheric surface data are shown in Table 3B below.

TABLE 3A

| 3rd Embodiment f = 2.71 mm, Fno = 2.25, HFOV = 73.0 deg. | | | | | | | |
|---|---|---|---|---|---|---|---|
| Surface # | | Curvature Radius | Thickness | Material | Index | Abbe # | Focal Length |
| 0 | Object | Plano | Infinity | | | | |
| 1 | Lens 1 | 8.4177 (SPH) | 0.650 | Glass | 1.678 | 55.5 | −4.16 |
| 2 | | 2.0482 (SPH) | 1.133 | | | | |
| 3 | Lens 2 | 22.3261 (ASP) | 0.639 | Plastic | 1.671 | 19.5 | −37.71 |
| 4 | | 11.7268 (ASP) | 0.350 | | | | |
| 5 | Stop | Plano | 0.149 | | | | |
| 6 | Lens 3 | −6.1061 (ASP) | 1.229 | Plastic | 1.614 | 25.7 | 17.30 |
| 7 | | −4.1737 (ASP) | 0.901 | | | | |
| 8 | Ape. Stop | Plano | 0.241 | | | | |
| 9 | Lens 4 | −13.8460 (ASP) | 1.330 | Glass | 1.747 | 51.0 | 6.11 |
| 10 | | −3.5736 (ASP) | 0.446 | | | | |
| 11 | Stop | Plano | 0.000 | | | | |
| 12 | Lens 5 | 5.5490 (ASP) | 2.410 | Plastic | 1.545 | 56.0 | 3.01 |
| 13 | | −1.9709 (ASP) | 0.031 | Cement | 1.485 | 53.2 | — |
| 14 | Lens 6 | −1.8856 (ASP) | 0.500 | Plastic | 1.671 | 19.5 | −3.62 |
| 15 | | −9.3607 (ASP) | 1.156 | | | | |
| 16 | Lens 7 | −14.1444 (ASP) | 1.277 | Plastic | 1.566 | 37.4 | −75.78 |
| 17 | | −21.7915 (ASP) | 0.300 | | | | |
| 18 | Filter | Plano | 0.400 | Glass | 1.517 | 64.2 | — |
| 19 | | Plano | 1.197 | | | | |
| 20 | Image | Plano | — | | | | |

Note:
Reference wavelength is 587.6 nm (d-line).
An effective radius of the stop S1 (Surface 5) is 1.426 mm.
An effective radius of the stop S2 (Surface 11) is 1.525 mm.

TABLE 3B

| Aspheric Coefficients | | | | |
|---|---|---|---|---|
| Surface # | 3 | 4 | 6 | 7 |
| k = | −7.946930E+00 | 1.741690E+01 | −3.339030E+00 | 1.269810E+00 |
| A4 = | 5.178023E−02 | 9.022357E−02 | 5.172859E−02 | 2.725623E−02 |
| A6 = | −1.130248E−02 | −5.534203E−03 | −1.271156E−02 | −8.107107E−03 |
| A8 = | −3.346318E−03 | −1.921253E−02 | 1.157526E−02 | 1.088263E−02 |
| A10 = | 4.720693E−03 | 2.851319E−02 | −5.272797E−03 | −1.032957E−02 |
| A12 = | −2.878365E−03 | −2.145980E−02 | 1.672070E−03 | 6.336289E−03 |
| A14 = | 7.500971E−04 | 6.789637E−03 | −8.746723E−04 | −2.249888E−03 |
| A16 = | −6.860160E−05 | −7.128105E−04 | 2.372003E−04 | 3.577372E−04 |

| Surface # | 9 | 10 | 12 | 13 |
|---|---|---|---|---|
| k = | 7.053690E+01 | 5.582500E−02 | −4.997960E+00 | −5.211930E−01 |
| A4 = | 1.380560E−02 | 2.847246E−03 | 4.854426E−03 | 7.116010E−02 |
| A6 = | −4.719244E−03 | −3.694722E−03 | −3.300742E−03 | −1.503534E−01 |
| A8 = | 3.201167E−04 | 2.741577E−04 | 7.986820E−04 | 1.388729E−01 |
| A10 = | −2.647062E−05 | 6.379798E−05 | −3.124296E−05 | −6.458322E−02 |
| A12 = | 3.214859E−16 | −3.049029E−05 | −3.140752E−05 | 1.436665E−02 |
| A14 = | — | — | 9.981834E−06 | −1.038173E−03 |
| A16 = | — | — | −1.020445E−06 | −4.688958E−05 |

| Surface # | 14 | 15 | 16 | 17 |
|---|---|---|---|---|
| k = | −4.915550E−01 | −2.845300E+01 | 1.286400E+01 | 2.336190E+01 |
| A4 = | 5.771850E−02 | 2.344551E−03 | −1.619751E−02 | −3.437175E−03 |
| A6 = | −7.908348E−02 | −7.651736E−03 | −3.580553E−03 | −3.777753E−03 |

TABLE 3B-continued

| Aspheric Coefficients | | | |
|---|---|---|---|
| A8 = | 6.195337E−02 | 4.583763E−03 | −2.457714E−04 | 6.803662E−04 |
| A10 = | −2.492196E−02 | −1.379255E−03 | 7.477999E−04 | −2.631651E−05 |
| A12 = | 4.543130E−03 | 2.269029E−04 | −2.256889E−04 | −8.057293E−06 |
| A14 = | −1.419200E−04 | −1.894993E−05 | 3.027226E−05 | 1.240733E−06 |
| A16 = | −3.769159E−05 | 6.272196E−07 | −1.648456E−06 | −5.738070E−08 |

In the 3rd embodiment, the equation of the aspheric surface profiles of the aforementioned lens elements is the same as the equation of the 1st embodiment. Also, the definitions of these parameters shown in Table 3C below are the same as those stated in the 1st embodiment with corresponding values for the 3rd embodiment, so an explanation in this regard will not be provided again.

Moreover, these parameters can be calculated from Table 3A and Table 3B as the following values and satisfy the following conditions:

TABLE 3C

| Values of Conditional Expressions | | | |
|---|---|---|---|
| f [mm] | 2.71 | |R2/R4| | 0.17 |
| Fno | 2.25 | R11/R10 | 0.96 |
| HFOV [deg.] | 73.0 | |R10 − R11| × 10/f | 0.31 |
| FOV [deg.] | 146.0 | ΣCT/ΣAT | 1.82 |
| f/TL | 0.19 | Dr7r14/Dr1r6 | 1.72 |
| TL/ImgH | 4.46 | CT4/(CT5 + T56 + CT6) | 0.45 |
| TD/BL | 6.56 | CT4/CT5 | 0.55 |
| f1/f3 | −0.24 | (T34 + T45)/T12 | 1.40 |
| |f1/f7| | 0.05 | T45/CT5 | 0.19 |
| |f/f2| + |f/f3| + | f/f7| | 0.26 | T56 [mm] | 0.031 |
| (|f/f2| + |f/f7|)/|f/f1| | 0.17 | V2/N2 | 11.67 |
| (R4 + R10)/(R4 − R10) | 0.71 | V3 | 25.7 |
| (R7 − R8)/(R7 + R8) | 0.59 | MAX_N237 | 1.671 |
| (R7 − R10)/(R7 + R10) | 0.75 | Y1R1/Y4R2 | 2.16 |
| (R7 − R11)/(R7 + R11) | 0.76 | |Sag2R1|/CT2 | 0.31 |

4th Embodiment

Figure 7:
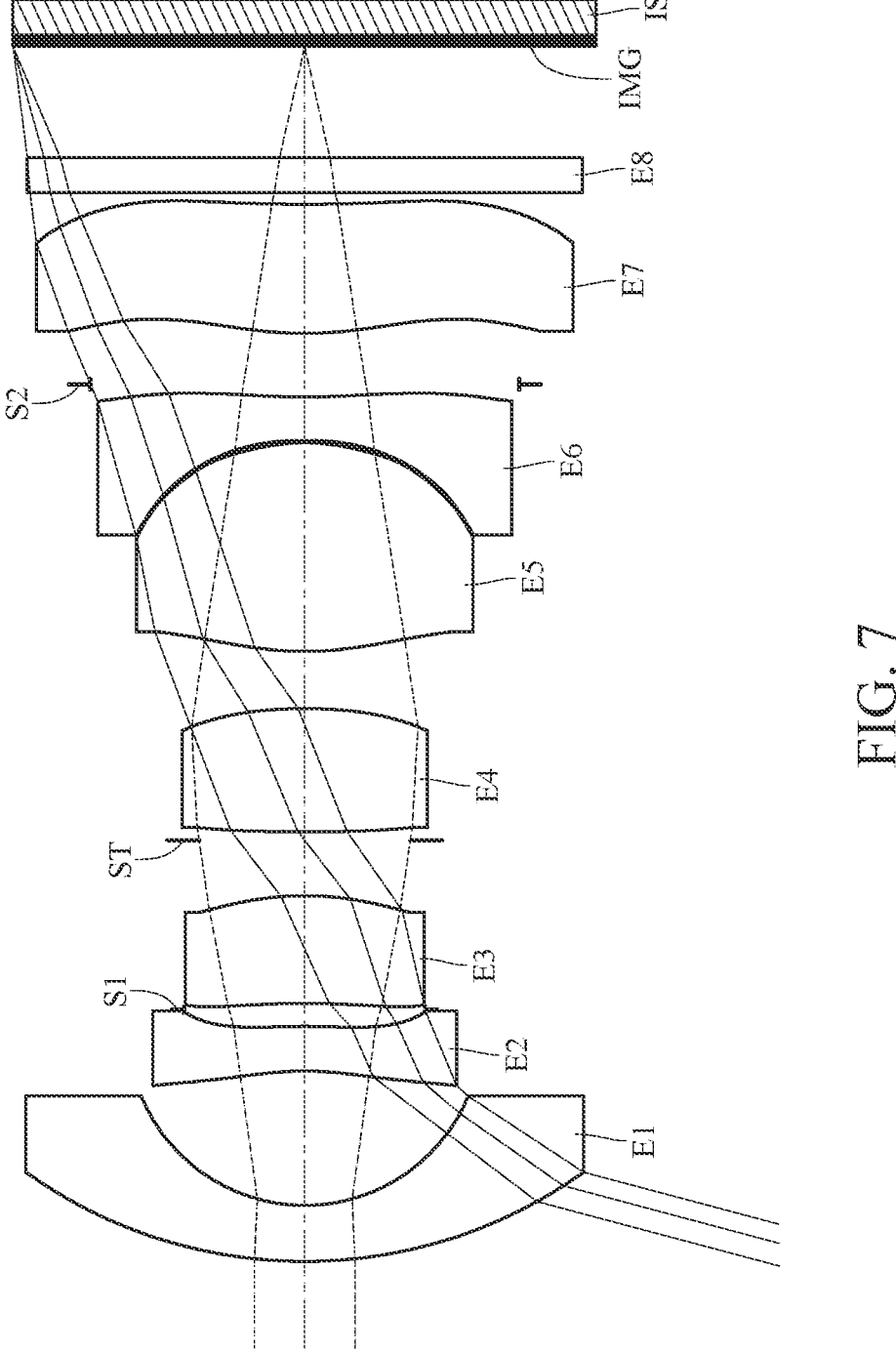
FIG. 7 is a schematic view of an image capturing unit according to the 4th embodiment of the present disclosure.
Figure 8:
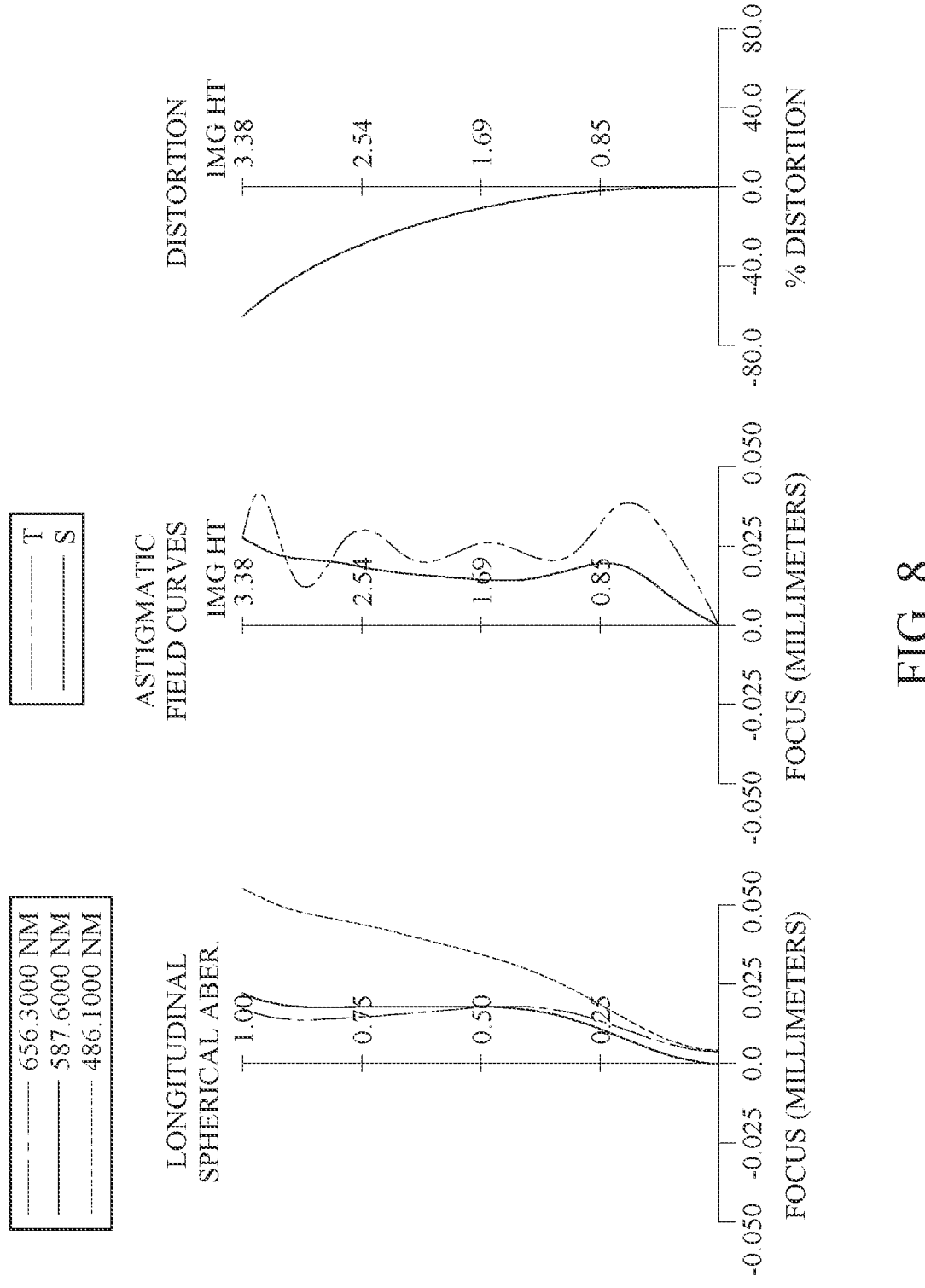
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit 4 includes an imaging lens system (its reference numeral is omitted) of the present disclosure and an image sensor IS. The imaging lens system includes, in order from an object side to an image side along an optical path, a first lens element E1, a second lens element E2, a stop S1, a third lens element E3, an aperture stop ST, a fourth lens element E4, a fifth lens element E5, a sixth lens element E6, a stop S2, a seventh lens element E7, a filter E8 and an image surface IMG. The imaging lens system includes seven lens elements (E1, E2, E3, E4, E5, E6 and E7) with no additional lens element disposed between each of the adjacent seven lens elements.

The first lens element E1 with negative refractive power has an object-side surface being convex in a paraxial region thereof and an image-side surface being concave in a paraxial region thereof. The first lens element E1 is made of glass material and has the object-side surface and the image-side surface being both spherical.

The second lens element E2 with negative refractive power has an object-side surface being concave in a paraxial region thereof and an image-side surface being convex in a paraxial region thereof. The second lens element E2 is made of plastic material and has the object-side surface and the image-side surface being both aspheric. The object-side surface of the second lens element E2 has two inflection points. The image-side surface of the second lens element E2 has one inflection point. The image-side surface of the second lens element E2 has one concave critical point in an off-axis region thereof.

The third lens element E3 with positive refractive power has an object-side surface being concave in a paraxial region thereof and an image-side surface being convex in a paraxial region thereof. The third lens element E3 is made of plastic material and has the object-side surface and the image-side surface being both aspheric. The object-side surface of the third lens element E3 has one inflection point. The object-side surface of the third lens element E3 has one convex critical point in an off-axis region thereof.

The fourth lens element E4 with positive refractive power has an object-side surface being convex in a paraxial region thereof and an image-side surface being convex in a paraxial region thereof. The fourth lens element E4 is made of glass material and has the object-side surface and the image-side surface being both aspheric.

The fifth lens element E5 with positive refractive power has an object-side surface being convex in a paraxial region thereof and an image-side surface being convex in a paraxial region thereof. The fifth lens element E5 is made of plastic material and has the object-side surface and the image-side surface being both aspheric. The object-side surface of the fifth lens element E5 has one inflection point. The image-side surface of the fifth lens element E5 has one inflection point.

The sixth lens element E6 with negative refractive power has an object-side surface being concave in a paraxial region thereof and an image-side surface being concave in a paraxial region thereof. The sixth lens element E6 is made of plastic material and has the object-side surface and the image-side surface being both aspheric. The object-side surface of the sixth lens element E6 has one inflection point. The image-side surface of the sixth lens element E6 has two inflection points. The image-side surface of the sixth lens element E6 has a convex critical point in an off-axis region thereof. The image-side surface of the fifth lens element E5 is cemented to the object-side surface of the sixth lens element E6.

The seventh lens element E7 with positive refractive power has an object-side surface being convex in a paraxial region thereof and an image-side surface being concave in a paraxial region thereof. The seventh lens element E7 is made of plastic material and has the object-side surface and the image-side surface being both aspheric. The object-side surface of the seventh lens element E7 has one inflection point. The image-side surface of the seventh lens element E7 has one inflection point. The object-side surface of the seventh lens element E7 has one concave critical point in an off-axis region thereof. The image-side surface of the seventh lens element E7 has one convex critical point in an off-axis region thereof.

The filter E8 is made of glass material and located between the seventh lens element E7 and the image surface IMG, and will not affect the focal length of the imaging lens system. The image sensor IS is disposed on or near the image surface IMG of the imaging lens system.

The detailed optical data of the 4th embodiment are shown in Table 4A and the aspheric surface data are shown in Table 4B below.

TABLE 4A

| | | | | | | | |
|---|---|---|---|---|---|---|---|
| 4th Embodiment | | | | | | | |
| f = 2.61 mm, Fno = 2.25, HFOV = 75.1 deg. | | | | | | | |
| Surface # | | Curvature Radius | Thickness | Material | Index | Abbe # | Focal Length |
| 0 | Object | Plano | Infinity | | | | |
| 1 | Lens 1 | 5.5637 (SPH) | 0.650 | Glass | 1.772 | 49.6 | −4.57 |
| 2 | | 2.0500 (SPH) | 1.560 | | | | |
| 3 | Lens 2 | −3.2953 (ASP) | 0.517 | Plastic | 1.669 | 19.5 | −9.15 |
| 4 | | −7.5907 (ASP) | 0.190 | | | | |
| 5 | Stop | Plano | 0.078 | | | | |
| 6 | Lens 3 | −8.0251 (ASP) | 1.247 | Plastic | 1.614 | 25.7 | 8.95 |
| 7 | | −3.4543 (ASP) | 0.643 | | | | |
| 8 | Ape. Stop | Plano | 0.100 | | | | |
| 9 | Lens 4 | 28.4677 (ASP) | 1.426 | Glass | 1.589 | 61.2 | 8.54 |
| 10 | | −5.9946 (ASP) | 0.664 | | | | |
| 11 | Lens 5 | 3.5453 (ASP) | 2.420 | Plastic | 1.544 | 55.9 | 2.85 |
| 12 | | −2.0892 (ASP) | 0.029 | Cement | 1.485 | 53.2 | — |
| 13 | Lens 6 | −3.6604 (ASP) | 0.500 | Plastic | 1.669 | 19.5 | −3.44 |
| 14 | | 6.5501 (ASP) | 0.150 | | | | |
| 15 | Stop | Plano | 0.589 | | | | |
| 16 | Lens 7 | 4.1259 (ASP) | 1.497 | Plastic | 1.544 | 55.9 | 9.29 |
| 17 | | 19.6448 (ASP) | 0.140 | | | | |
| 18 | Filter | Plano | 0.400 | Glass | 1.517 | 64.2 | — |
| 19 | | Plano | 1.289 | | | | |
| 20 | Image | Plano | — | | | | |

Note:
Reference wavelength is 587.6 nm (d-line).
An effective radius of the stop S1 (Surface 5) is 1.397 mm.
An effective radius of the stop S2 (Surface 15) is 2.482 mm.

TABLE 4B

| | | | | |
|---|---|---|---|---|
| Aspheric Coefficients | | | | |
| Surface # | 3 | 4 | 6 | 7 |
| k = | −6.289870E+00 | 1.918620E+01 | −2.641100E+00 | −6.739360E+00 |
| A4 = | 6.714703E−02 | 1.228193E−01 | 3.633391E−02 | −9.103786E−03 |
| A6 = | −3.644960E−02 | −4.632698E−02 | −3.635793E−02 | 2.654950E−03 |
| A8 = | 1.468172E−02 | 1.893240E−02 | 3.905730E−02 | 3.176694E−03 |
| A10 = | −4.341399E−03 | −3.816830E−03 | −2.555923E−02 | −4.391962E−03 |
| A12 = | 7.839487E−04 | 2.317449E−03 | 1.214427E−02 | 3.044306E−03 |
| A14 = | −6.865577E−05 | −1.635881E−03 | −3.610020E−03 | −1.113878E−03 |
| A16 = | 1.537213E−06 | 4.611544E−04 | 5.462353E−04 | 1.629974E−04 |
| Surface # | 9 | 10 | 11 | 12 |
| k = | −9.000000E+01 | 3.006100E+00 | −8.895450E+00 | −2.511900E+01 |
| A4 = | 1.059834E−02 | −3.094554E−02 | −1.132990E−02 | −1.619890E−01 |
| A6 = | −5.148688E−04 | 1.001270E−02 | 2.922743E−03 | 2.847211E−01 |
| A8 = | −2.195763E−04 | −2.892433E−03 | −3.376437E−03 | −2.986540E−01 |
| A10 = | −1.197162E−04 | 5.943790E−04 | 2.362186E−03 | 1.543239E−01 |
| A12 = | 1.004225E−07 | −7.958156E−05 | −8.806166E−04 | −4.115537E−02 |
| A14 = | — | — | 1.700750E−04 | 5.362147E−03 |
| A16 = | — | — | −1.397493E−05 | −2.646390E−04 |
| Surface # | 13 | 14 | 16 | 17 |
| k = | 1.110390E+00 | −6.790880E+01 | −2.006830E+01 | −1.040250E−01 |
| A4 = | −1.069014E−01 | −2.886517E−02 | 9.603281E−03 | 7.863471E−03 |
| A6 = | 1.199071E−01 | 1.183337E−02 | −1.684868E−02 | −9.220282E−03 |
| A8 = | −9.117666E−02 | −2.350184E−03 | 7.172120E−03 | 2.723077E−03 |
| A10 = | 4.004912E−02 | −1.247953E−03 | −1.754249E−03 | −4.732888E−04 |
| A12 = | −9.730354E−03 | 1.241910E−04 | 2.475825E−04 | 4.811440E−05 |
| A14 = | 1.141477E−03 | −1.762472E−05 | −1.830156E−05 | −2.601004E−06 |
| A16 = | −4.542753E−05 | 8.160036E−07 | 5.442487E−07 | 5.673849E−08 |

In the 4th embodiment, the equation of the aspheric surface profiles of the aforementioned lens elements is the same as the equation of the 1st embodiment. Also, the definitions of these parameters shown in Table 4C below are the same as those stated in the 1st embodiment with corresponding values for the 4th embodiment, so an explanation in this regard will not be provided again.

Moreover, these parameters can be calculated from Table 4A and Table 4B as the following values and satisfy the following conditions:

TABLE 4C

Values of Conditional Expressions

| | | | |
|---|---|---|---|
| f [mm] | 2.61 | |R2/R4| | 0.27 |
| Fno | 2.25 | R11/R10 | 1.75 |
| HFOV [deg.] | 75.1 | |R10 − R11| × 10/f | 6.01 |
| FOV [deg.] | 150.2 | ΣCT/ΣAT | 2.06 |
| f/TL | 0.19 | Dr7r14/Dr1r6 | 1.71 |
| TL/ImgH | 4.17 | CT4/(CT5 + T56 + CT6) | 0.48 |
| TD/BL | 6.70 | CT4/CT5 | 0.59 |
| f1/f3 | −0.51 | (T34 + T45)/T12 | 0.90 |
| |f1/f7| | 0.49 | T45/CT5 | 0.27 |
| |f/f2| + |f/f3| + |f/f7| | 0.86 | T56 [mm] | 0.029 |
| (|f/f2| + |f/f7|)/|f/f1| | 0.99 | V2/N2 | 11.68 |
| (R4 + R10)/(R4 − R10) | 1.76 | V3 | 25.7 |
| (R7 − R8)/(R7 + R8) | 1.53 | MAX_N237 | 1.669 |
| (R7 − R10)/(R7 + R10) | 1.16 | Y1R1/Y4R2 | 1.95 |
| (R7 − R11)/(R7 + R11) | 1.30 | |Sag2R1|/CT2 | 0.33 |

5th Embodiment

Figure 9:
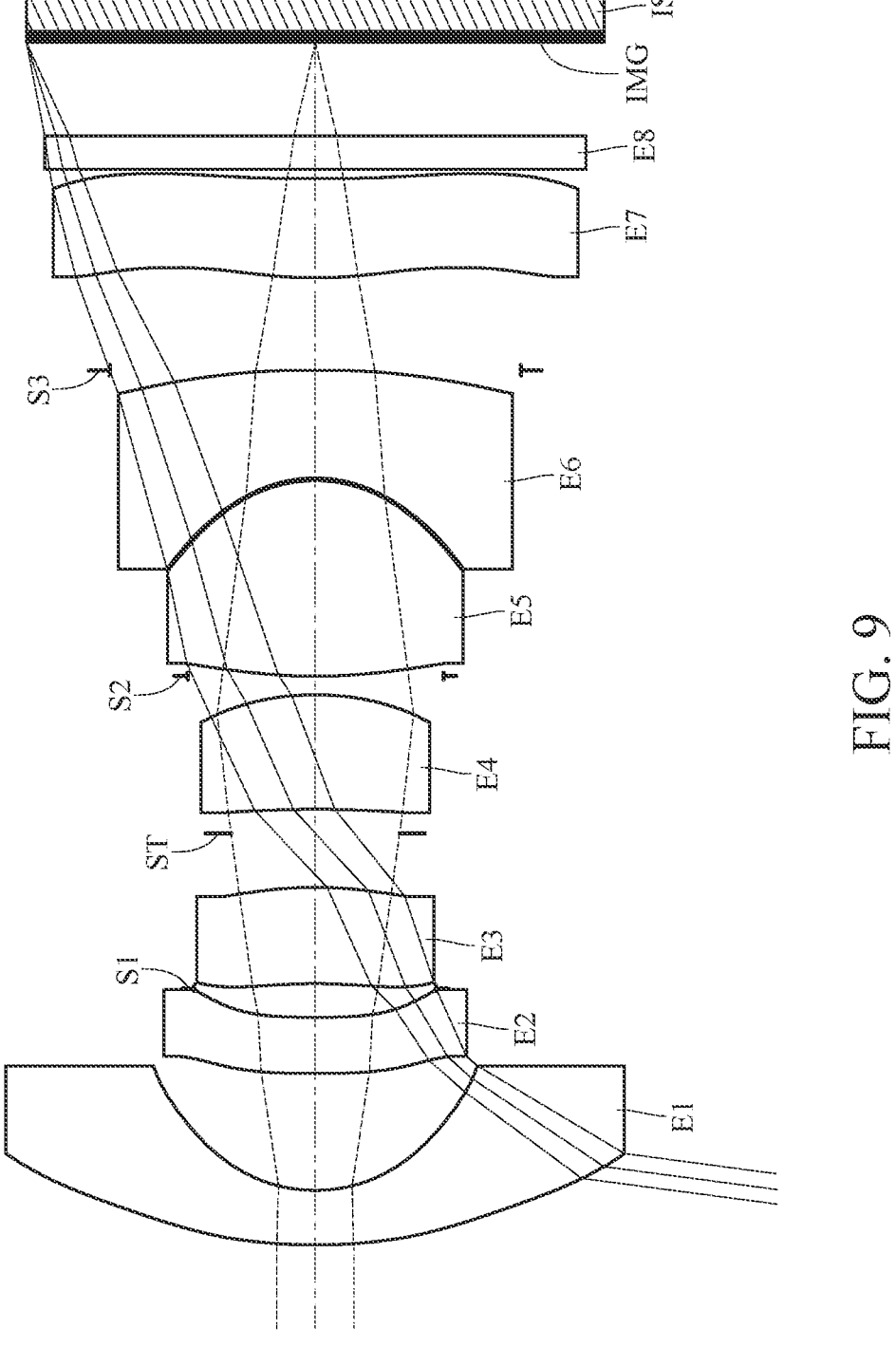
FIG. 9 is a schematic view of an image capturing unit according to the 5th embodiment of the present disclosure.
Figure 10:
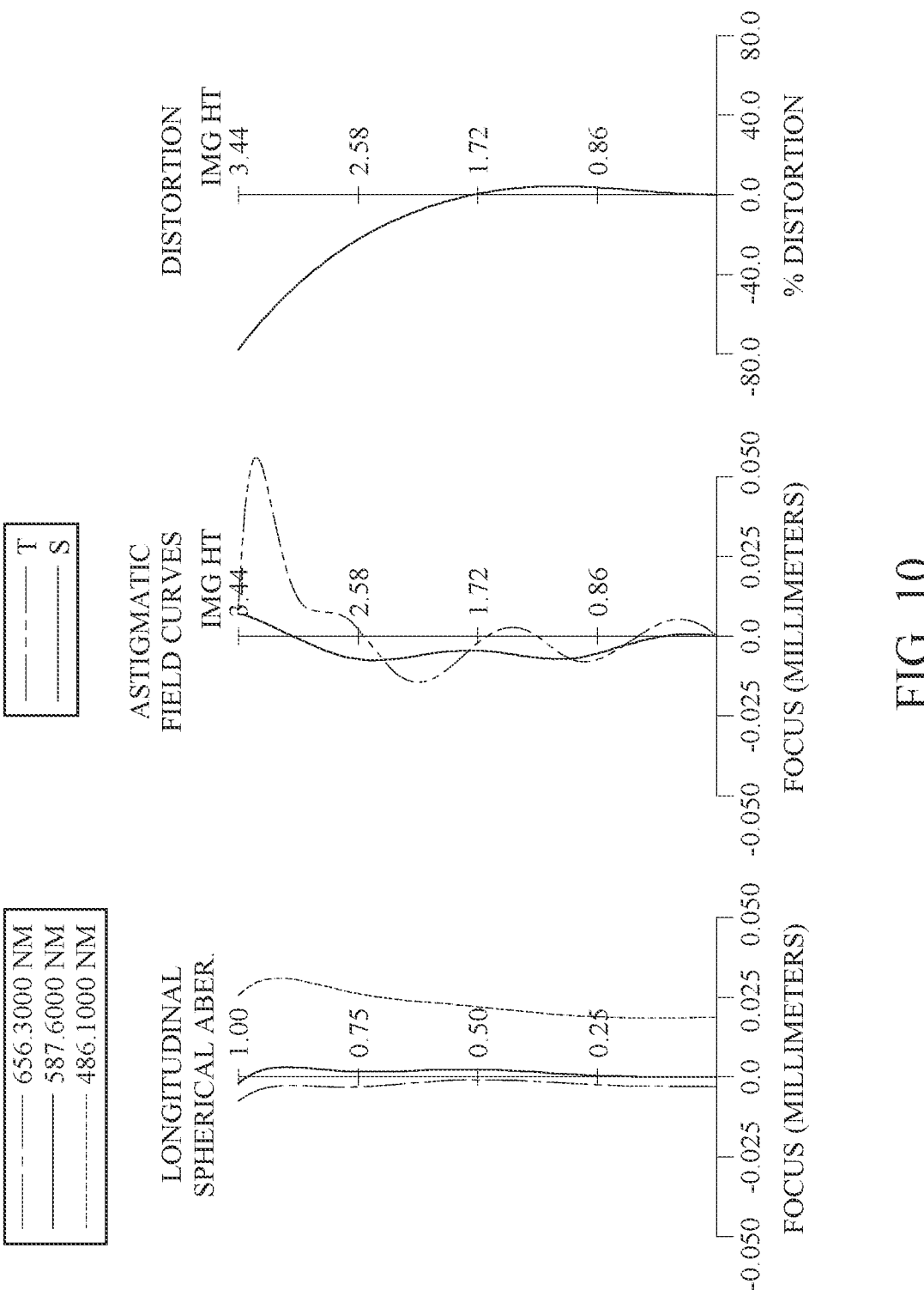
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit 5 includes an imaging lens system (its reference numeral is omitted) of the present disclosure and an image sensor IS. The imaging lens system includes, in order from an object side to an image side along an optical path, a first lens element E1, a second lens element E2, a stop S1, a third lens element E3, an aperture stop ST, a fourth lens element E4, a stop S2, a fifth lens element E5, a sixth lens element E6, a stop S3, a seventh lens element E7, a filter E8 and an image surface IMG. The imaging lens system includes seven lens elements (E1, E2, E3, E4, E5, E6 and E7) with no additional lens element disposed between each of the adjacent seven lens elements.

The first lens element E1 with negative refractive power has an object-side surface being convex in a paraxial region thereof and an image-side surface being concave in a paraxial region thereof. The first lens element E1 is made of glass material and has the object-side surface and the image-side surface being both aspheric.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has one inflection point. The object-side surface of the second lens element E2 has one concave critical point in an off-axis region thereof.

The third lens element E3 with positive refractive power has an object-side surface being concave in a paraxial region thereof and an image-side surface being convex in a paraxial region thereof. The third lens element E3 is made of plastic material and has the object-side surface and the image-side surface being both aspheric. The object-side surface of the third lens element E3 has one inflection point. The image-side surface of the third lens element E3 has one inflection point. The object-side surface of the third lens element E3 has one convex critical point in an off-axis region thereof.

The fourth lens element E4 with positive refractive power has an object-side surface being concave in a paraxial region thereof and an image-side surface being convex in a paraxial region thereof. The fourth lens element E4 is made of glass material and has the object-side surface and the image-side surface being both aspheric.

The fifth lens element E5 with positive refractive power has an object-side surface being convex in a paraxial region thereof and an image-side surface being convex in a paraxial region thereof. The fifth lens element E5 is made of plastic material and has the object-side surface and the image-side surface being both aspheric. The object-side surface of the fifth lens element E5 has one inflection point.

The sixth lens element E6 with negative refractive power has an object-side surface being concave in a paraxial region thereof and an image-side surface being convex in a paraxial region thereof. The sixth lens element E6 is made of plastic material and has the object-side surface and the image-side surface being both aspheric. The image-side surface of the sixth lens element E6 has one inflection point. The image-side surface of the fifth lens element E5 is cemented to the object-side surface of the sixth lens element E6.

The seventh lens element E7 with positive refractive power has an object-side surface being convex in a paraxial region thereof and an image-side surface being convex in a paraxial region thereof. The seventh lens element E7 is made of plastic material and has the object-side surface and the image-side surface being both aspheric. The object-side surface of the seventh lens element E7 has two inflection points. The image-side surface of the seventh lens element E7 has two inflection points. The object-side surface of the seventh lens element E7 has one concave critical point in an off-axis region thereof. The image-side surface of the seventh lens element E7 has one concave critical point and one convex critical point in an off-axis region thereof.

The filter E8 is made of glass material and located between the seventh lens element E7 and the image surface IMG, and will not affect the focal length of the imaging lens system. The image sensor IS is disposed on or near the image surface IMG of the imaging lens system.

The detailed optical data of the 5th embodiment are shown in Table 5A and the aspheric surface data are shown in Table 5B below.

TABLE 5A

5th Embodiment
f = 2.06 mm, Fno = 2.25, HFOV = 82.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 7.8099 | (ASP) | 0.650 | Glass | 1.804 | 46.6 | −3.18 |

TABLE 5A-continued

5th Embodiment
f = 2.06 mm, Fno = 2.25, HFOV = 82.5 deg.

| Surface # | | Curvature Radius | Thickness | Material | Index | Abbe # | Focal Length |
|---|---|---|---|---|---|---|---|
| 2 | | 1.8527 (ASP) | 1.392 | | | | |
| 3 | Lens 2 | 13.8381 (ASP) | 0.671 | Plastic | 1.671 | 19.5 | 1669.15 |
| 4 | | 13.7383 (ASP) | 0.350 | | | | |
| 5 | Stop | Plano | 0.052 | | | | |
| 6 | Lens 3 | −5.7824 (ASP) | 1.149 | Plastic | 1.614 | 25.7 | 21.18 |
| 7 | | −4.3049 (ASP) | 0.644 | | | | |
| 8 | Ape. Stop | Plano | 0.286 | | | | |
| 9 | Lens 4 | −12.6232 (ASP) | 1.366 | Glass | 1.723 | 38.0 | 5.34 |
| 10 | | −3.0934 (ASP) | 0.221 | | | | |
| 11 | Stop | Plano | 0.000 | | | | |
| 12 | Lens 5 | 6.6382 (ASP) | 2.333 | Plastic | 1.545 | 56.0 | 2.55 |
| 13 | | −1.5407 (ASP) | 0.031 | Cement | 1.485 | 53.2 | — |
| 14 | Lens 6 | −1.6190 (ASP) | 1.285 | Plastic | 1.671 | 19.5 | −2.81 |
| 15 | | −15.2137 (ASP) | 0.000 | | | | |
| 16 | Stop | Plano | 1.102 | | | | |
| 17 | Lens 7 | 5.0352 (ASP) | 1.185 | Plastic | 1.545 | 56.0 | 9.19 |
| 18 | | −760.0501 (ASP) | 0.107 | | | | |
| 19 | Filter | Plano | 0.400 | Glass | 1.517 | 64.2 | — |
| 20 | | Plano | 1.115 | | | | |
| 21 | Image | Plano | — | | | | |

Note:
Reference wavelength is 587.6 nm (d-line).
An effective radius of the stop S1 (Surface 5) is 1.438 mm.
An effective radius of the stop S2 (Surface 11) is 1.525 mm.
An effective radius of the stop S3 (Surface 16) is 2.451 mm.

TABLE 5B

Aspheric Coefficients

| Surface # | 1 | 2 | 3 | 4 |
|---|---|---|---|---|
| k = | 1.212120E+00 | −1.523700E−01 | −5.670820E+01 | 4.878340E+01 |
| A4 = | 1.500986E−02 | 1.552766E−02 | 3.893301E−02 | 7.643038E−02 |
| A6 = | −4.102331E−03 | 1.168250E−03 | 6.322213E−03 | −3.650322E−03 |
| A8 = | 4.737352E−04 | −2.871699E−03 | −1.011289E−02 | 1.734066E−02 |
| A10 = | −2.790737E−05 | 6.335214E−04 | 3.785569E−03 | −3.845637E−02 |
| A12 = | 8.189336E−07 | −1.972568E−04 | −1.617124E−03 | 3.198956E−02 |
| A14 = | −9.158727E−09 | 2.660905E−05 | 4.369854E−04 | −1.308751E−02 |
| A16 = | — | — | −4.273714E−05 | 2.078797E−03 |

| Surface # | 6 | 7 | 9 | 10 |
|---|---|---|---|---|
| k = | −4.470500E+00 | 1.127910E+00 | 6.922450E+01 | 1.940820E−01 |
| A4 = | 4.833771E−02 | 2.583125E−02 | 1.462188E−02 | 4.050357E−03 |
| A6 = | −2.167101E−02 | −2.593098E−03 | −4.332622E−03 | −9.132396E−03 |
| A8 = | 3.855104E−02 | −4.470207E−03 | 2.144187E−04 | 5.294756E−03 |
| A10 = | −4.259372E−02 | 1.504410E−02 | 7.379386E−05 | −1.813971E−03 |
| A12 = | 3.105876E−02 | −1.504411E−02 | −1.392082E−17 | 2.189660E−04 |
| A14 = | −1.231980E−02 | 6.666021E−03 | — | — |
| A16 = | 1.936465E−03 | −1.087167E−03 | — | — |

| Surface # | 12 | 13 | 14 | 15 |
|---|---|---|---|---|
| k = | −9.861340E+00 | −6.053290E−01 | −5.081990E−01 | 1.371760E+01 |
| A4 = | 6.457013E−03 | 1.894817E−01 | 4.005488E−02 | −1.854291E−02 |
| A6 = | −1.224961E−02 | −5.200340E−01 | −1.504638E−01 | 7.050948E−03 |
| A8 = | 8.991644E−03 | 6.563034E−01 | 2.194160E−01 | −1.103185E−04 |
| A10 = | −4.175381E−03 | −4.411619E−01 | −1.530073E−01 | −6.422899E−04 |
| A12 = | 1.293376E−03 | 1.626323E−01 | 5.634461E−02 | 1.833524E−04 |
| A14 = | −2.460369E−04 | −3.090988E−02 | −1.058509E−02 | −2.100204E−05 |
| A16 = | 2.083186E−05 | 2.364127E−03 | 8.019337E−04 | 9.144892E−07 |

| Surface # | 17 | 18 |
|---|---|---|
| k = | −3.809740E+01 | −9.000000E+01 |
| A4 = | 1.959850E−02 | 4.182943E−02 |
| A6 = | −2.642451E−02 | −2.628401E−02 |
| A8 = | 1.090829E−02 | 7.766598E−03 |
| A10 = | −2.355352E−03 | −1.289732E−03 |

TABLE 5B-continued

| Aspheric Coefficients | | |
| --- | --- | --- |
| A12 = | 2.804973E−04 | 1.210380E−04 |
| A14 = | −1.737326E−05 | −5.990905E−06 |
| A16 = | 4.377443E−07 | 1.214805E−07 |

In the 5th embodiment, the equation of the aspheric surface profiles of the aforementioned lens elements is the same as the equation of the 1st embodiment. Also, the definitions of these parameters shown in Table 5C below are the same as those stated in the 1st embodiment with corresponding values for the 5th embodiment, so an explanation in this regard will not be provided again.

Moreover, these parameters can be calculated from Table 5A and Table 5B as the following values and satisfy the following conditions:

TABLE 5C

| Values of Conditional Expressions | | | |
| --- | --- | --- | --- |
| f [mm] | 2.06 | \|R2/R4\| | 0.13 |
| Fno | 2.25 | R11/R10 | 1.05 |
| HFOV [deg.] | 82.5 | \|R10 − R11\| × 10/f | 0.38 |
| FOV [deg.] | 165.0 | ΣCT/ΣAT | 2.12 |
| f/TL | 0.14 | Dr7r14/Dr1r6 | 1.76 |
| TL/ImgH | 4.16 | CT4/(CT5 + T56 + CT6) | 0.37 |
| TD/BL | 7.84 | CT4/CT5 | 0.59 |
| f1/f3 | −0.15 | (T34 + T45)/T12 | 0.83 |
| \|f1/f7\| | 0.35 | T45/CT5 | 0.09 |
| \|f/f2\| + \|f/f3\| + \|f/f7\| | 0.32 | T56 [mm] | 0.031 |
| (\|f/f2\| + \|f/f7\|)/\|f/f1\| | 0.35 | V2/N2 | 11.67 |
| (R4 + R10)/(R4 − R10) | 0.80 | V3 | 25.7 |
| (R7 − R8)/(R7 + R8) | 0.61 | MAX_N237 | 1.671 |
| (R7 − R10)/(R7 + R10) | 0.78 | Y1R1/Y4R2 | 2.54 |
| (R7 − R11)/(R7 + R11) | 0.77 | \|Sag2R1\|/CT2 | 0.31 |

6th Embodiment

Figure 11:
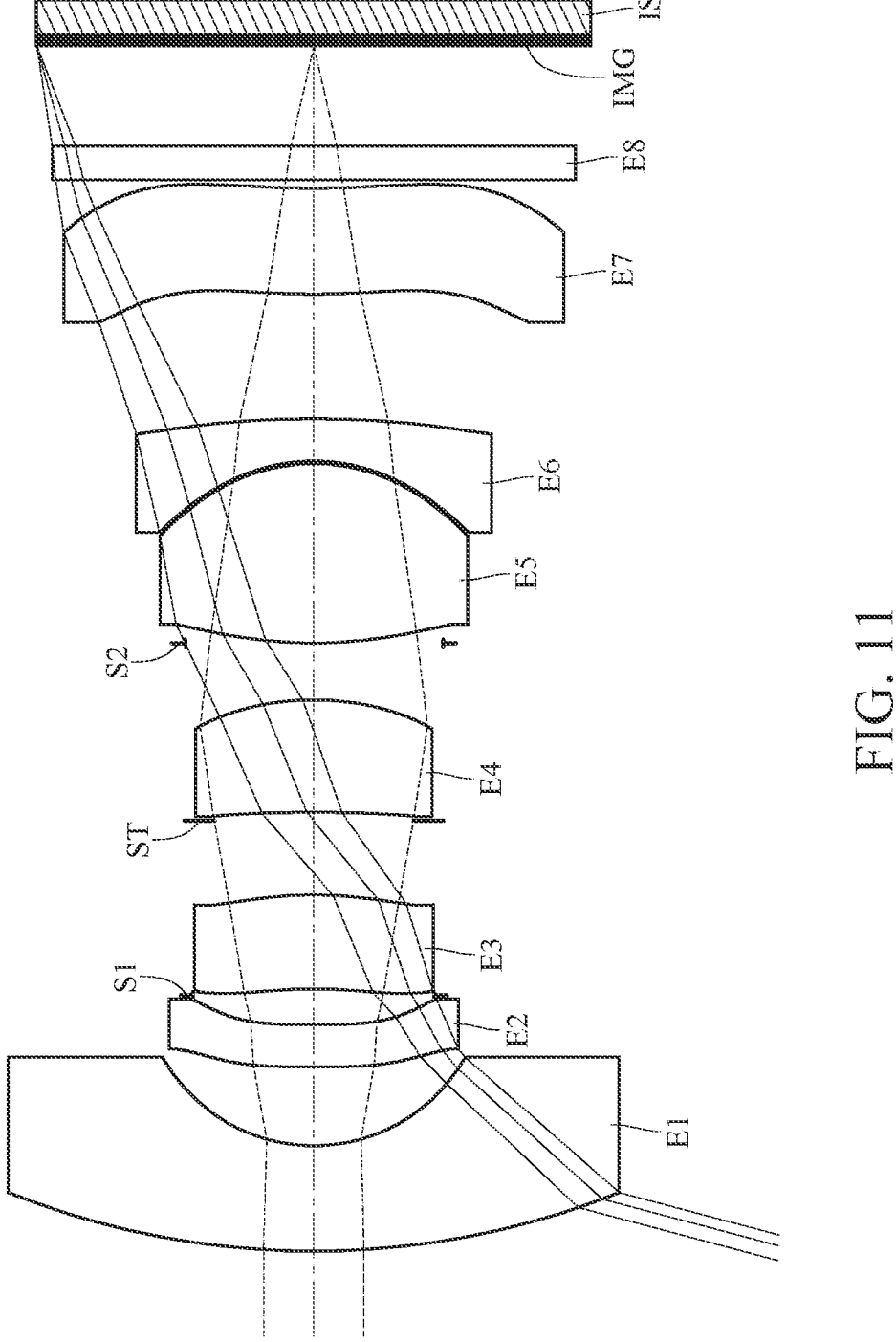
FIG. 11 is a schematic view of an image capturing unit according to the 6th embodiment of the present disclosure.
Figure 12:
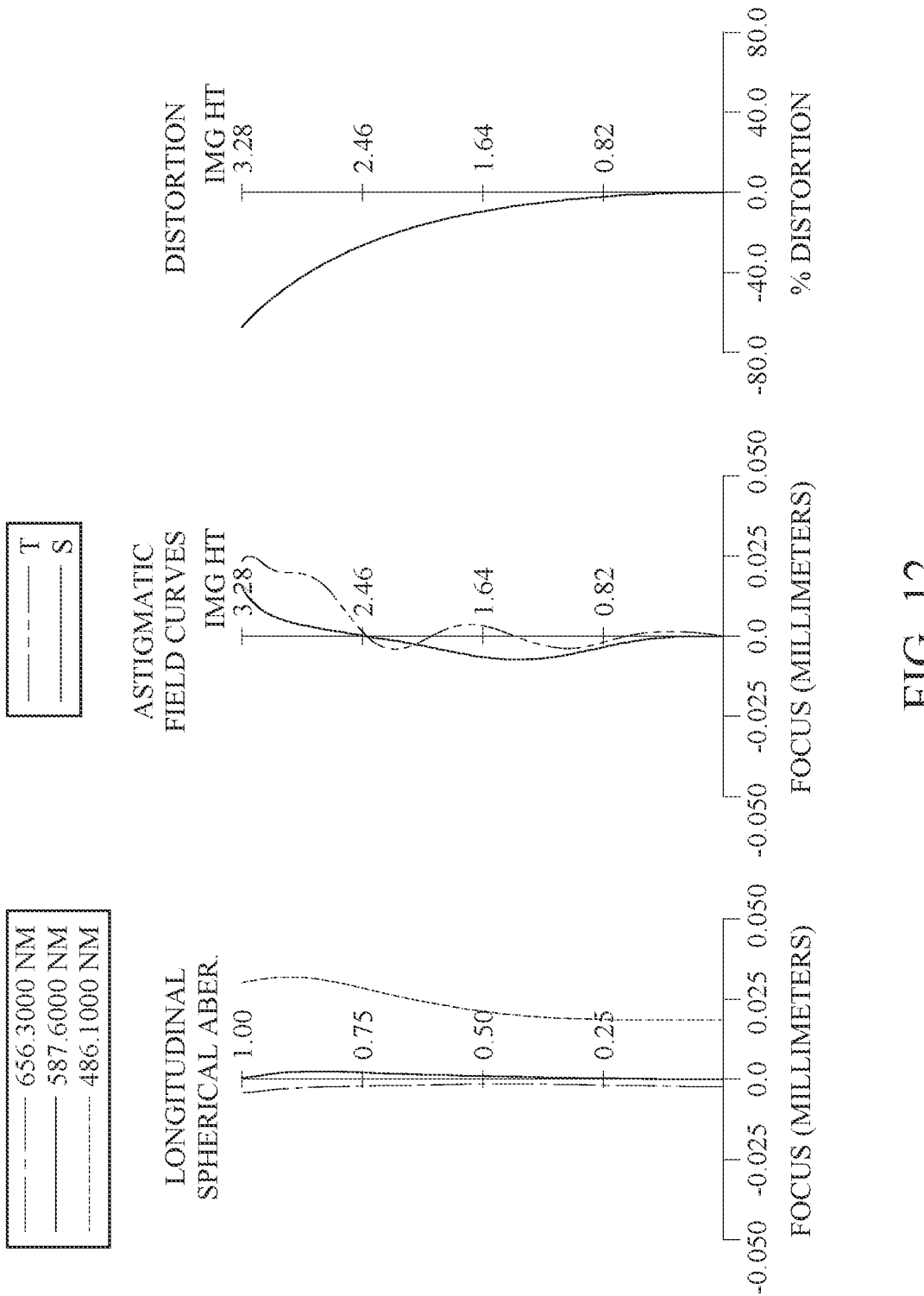
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit 6 includes an imaging lens system (its reference numeral is omitted) of the present disclosure and an image sensor IS. The imaging lens system includes, in order from an object side to an image side along an optical path, a first lens element E1, a second lens element E2, a stop S1, a third lens element E3, an aperture stop ST, a fourth lens element E4, a stop S2, a fifth lens element E5, a sixth lens element E6, a seventh lens element E7, a filter E8 and an image surface IMG. The imaging lens system includes seven lens elements (E1, E2, E3, E4, E5, E6 and E7) with no additional lens element disposed between each of the adjacent seven lens elements.

The first lens element E1 with negative refractive power has an object-side surface being convex in a paraxial region thereof and an image-side surface being concave in a paraxial region thereof. The first lens element E1 is made of glass material and has the object-side surface and the image-side surface being both spherical.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has one inflection point.

The third lens element E3 with positive refractive power has an object-side surface being concave in a paraxial region thereof and an image-side surface being convex in a paraxial region thereof. The third lens element E3 is made of plastic material and has the object-side surface and the image-side surface being both aspheric. The object-side surface of the third lens element E3 has one inflection point. The image-side surface of the third lens element E3 has one inflection point. The object-side surface of the third lens element E3 has one convex critical point in an off-axis region thereof.

The fourth lens element E4 with positive refractive power has an object-side surface being concave in a paraxial region thereof and an image-side surface being convex in a paraxial region thereof. The fourth lens element E4 is made of glass material and has the object-side surface and the image-side surface being both aspheric.

The fifth lens element E5 with positive refractive power has an object-side surface being convex in a paraxial region thereof and an image-side surface being convex in a paraxial region thereof. The fifth lens element E5 is made of plastic material and has the object-side surface and the image-side surface being both aspheric. The image-side surface of the fifth lens element E5 has one inflection point.

The sixth lens element E6 with negative refractive power has an object-side surface being concave in a paraxial region thereof and an image-side surface being convex in a paraxial region thereof. The sixth lens element E6 is made of plastic material and has the object-side surface and the image-side surface being both aspheric. The object-side surface of the sixth lens element E6 has one inflection point. The image-side surface of the sixth lens element E6 has one inflection point. The image-side surface of the fifth lens element E5 is cemented to the object-side surface of the sixth lens element E6.

The seventh lens element E7 with positive refractive power has an object-side surface being convex in a paraxial region thereof and an image-side surface being concave in a paraxial region thereof. The seventh lens element E7 is made of plastic material and has the object-side surface and the image-side surface being both aspheric. The object-side surface of the seventh lens element E7 has one inflection point. The image-side surface of the seventh lens element E7 has one inflection point. The object-side surface of the seventh lens element E7 has one concave critical point in an off-axis region thereof. The image-side surface of the seventh lens element E7 has one convex critical point in an off-axis region thereof.

The filter E8 is made of glass material and located between the seventh lens element E7 and the image surface IMG, and will not affect the focal length of the imaging lens system. The image sensor IS is disposed on or near the image surface IMG of the imaging lens system.

The detailed optical data of the 6th embodiment are shown in Table 6A and the aspheric surface data are shown in Table 6B below.

TABLE 6A

| | | | | | | | | |
|---|---|---|---|---|---|---|---|---|
| 6th Embodiment | | | | | | | | |
| f = 2.66 mm, Fno = 2.25, HFOV = 75.1 deg. | | | | | | | | |
| Surface # | | Curvature Radius | | Thickness | Material | Index | Abbe # | Focal Length |
| 0 | Object | Plano | | Infinity | | | | |
| 1 | Lens 1 | 9.7391 | (SPH) | 1.249 | Glass | 1.772 | 49.6 | −3.63 |
| 2 | | 2.0552 | (SPH) | 0.931 | | | | |
| 3 | Lens 2 | 21.6584 | (ASP) | 0.500 | Plastic | 1.671 | 19.5 | −812.96 |
| 4 | | 20.6384 | (ASP) | 0.348 | | | | |
| 5 | Stop | Plano | | 0.077 | | | | |
| 6 | Lens 3 | −5.1391 | (ASP) | 1.112 | Plastic | 1.614 | 25.7 | 27.26 |
| 7 | | −4.2555 | (ASP) | 0.878 | | | | |
| 8 | Ape. Stop | Plano | | 0.101 | | | | |
| 9 | Lens 4 | −13.5165 | (ASP) | 1.330 | Glass | 1.693 | 53.2 | 5.82 |
| 10 | | −3.2349 | (ASP) | 0.673 | | | | |
| 11 | Stop | Plano | | 0.000 | | | | |
| 12 | Lens 5 | 5.2873 | (ASP) | 2.123 | Plastic | 1.545 | 56.0 | 2.99 |
| 13 | | −2.0243 | (ASP) | 0.031 | Cement | 1.485 | 53.2 | — |
| 14 | Lens 6 | −2.0468 | (ASP) | 0.500 | Plastic | 1.671 | 19.5 | −3.71 |
| 15 | | −12.6155 | (ASP) | 1.477 | | | | |
| 16 | Lens 7 | 8.5809 | (ASP) | 1.250 | Plastic | 1.545 | 56.0 | 93.30 |
| 17 | | 9.7934 | (ASP) | 0.100 | | | | |
| 18 | Filter | Plano | | 0.400 | Glass | 1.517 | 64.2 | — |
| 19 | | Plano | | 1.186 | | | | |
| 20 | Image | Plano | | — | | | | |

Note:
Reference wavelength is 587.6 nm (d-line).
An effective radius of the stop S1 (Surface 5) is 1.430 mm.
An effective radius of the stop S2 (Surface 11) is 1.525 mm.

TABLE 6B

| | | | | |
|---|---|---|---|---|
| Aspheric Coefficients | | | | |
| Surface # | 3 | 4 | 6 | 7 |
| k = | 4.894560E+01 | 3.500970E+01 | −1.333240E+00 | 7.046420E−01 |
| A4 = | 5.105740E−02 | 8.557804E−02 | 4.783552E−02 | 2.929627E−02 |
| A6 = | −2.054774E−05 | −5.208610E−04 | −1.580102E−02 | −5.266842E−03 |
| A8 = | −1.724157E−02 | −1.805787E−02 | 2.475774E−02 | 4.992716E−03 |
| A10 = | 1.611481E−02 | 2.284483E−02 | −2.451843E−02 | −2.630648E−03 |
| A12 = | −8.573664E−03 | −1.440578E−02 | 1.696597E−02 | 5.662343E−04 |
| A14 = | 2.172241E−03 | 2.946634E−03 | −7.069230E−03 | 2.080446E−05 |
| A16 = | −2.038968E−04 | 1.385266E−05 | 1.217285E−03 | −5.054052E−06 |

| | | | | |
|---|---|---|---|---|
| Surface # | 9 | 10 | 12 | 13 |
| k = | 7.771600E+01 | 3.923450E−01 | −6.681590E+00 | −5.307680E−01 |
| A4 = | 1.377387E−02 | −1.110295E−03 | 1.340618E−03 | 1.231687E−01 |
| A6 = | −4.637716E−03 | −1.568067E−03 | −9.347566E−04 | −2.812730E−01 |
| A8 = | 3.113105E−04 | −2.389469E−04 | −2.510190E−04 | 3.131491E−01 |
| A10 = | 1.024359E−05 | 1.483542E−04 | 4.034027E−04 | −1.935014E−01 |
| A12 = | −1.783204E−18 | −4.850254E−05 | −1.768780E−04 | 6.737577E−02 |
| A14 = | — | — | 3.965157E−05 | −1.232865E−02 |
| A16 = | — | — | −3.892958E−06 | 9.204525E−04 |

| | | | | |
|---|---|---|---|---|
| Surface # | 14 | 15 | 16 | 17 |
| k = | −4.258170E−01 | −6.565310E+01 | −9.000000E+01 | −1.900380E+01 |
| A4 = | 4.666722E−02 | −7.841978E−03 | −6.052548E−03 | −1.071380E−02 |
| A6 = | −9.403574E−02 | 2.594508E−03 | −6.894282E−03 | −5.363944E−04 |
| A8 = | 1.072851E−01 | −6.675814E−04 | 2.678190E−03 | 1.196022E−04 |
| A10 = | −6.677982E−02 | 7.023099E−05 | −6.795675E−04 | −1.788869E−05 |
| A12 = | 2.313137E−02 | 5.090968E−06 | 1.072420E−04 | 9.656823E−07 |
| A14 = | −4.197472E−03 | −7.285429E−07 | −8.463607E−06 | 1.305735E−07 |
| A16 = | 3.119909E−04 | 1.445342E−08 | 2.455272E−07 | −1.199003E−08 |

In the 6th embodiment, the equation of the aspheric surface profiles of the aforementioned lens elements is the same as the equation of the 1st embodiment. Also, the definitions of these parameters shown in Table 6C below are the same as those stated in the 1st embodiment with corresponding values for the 6th embodiment, so an explanation in this regard will not be provided again.

Moreover, these parameters can be calculated from Table 6A and Table 6B as the following values and satisfy the following conditions:

US 12,681,273 B2

39

TABLE 6C

Values of Conditional Expressions

| f [mm] | 2.66 | |R2/R4| | 0.10 |
| Fno | 2.25 | R11/R10 | 1.01 |
| HFOV [deg.] | 75.1 | |R10 − R11| × 10/f | 0.08 |
| FOV [deg.] | 150.2 | ΣCT/ΣAT | 1.79 |
| f/TL | 0.19 | Dr7r14/Dr1r6 | 1.75 |
| TL/ImgH | 4.35 | CT4/(CT5 + T56 + CT6) | 0.50 |
| TD/BL | 7.46 | CT4/CT5 | 0.63 |
| f1/f3 | −0.13 | (T34 + T45)/T12 | 1.77 |
| |f1/f7| | 0.04 | T45/CT5 | 0.32 |
| |f/f2| + |f/f3| + |f/f7| | 0.13 | T56 [mm] | 0.031 |
| (|f/f2| + |f/f7|)/|f/f1| | 0.04 | V2/N2 | 11.67 |
| (R4 + R10)/(R4 − R10) | 0.82 | V3 | 25.7 |
| (R7 − R8)/(R7 + R8) | 0.61 | MAX_N237 | 1.671 |
| (R7 − R10)/(R7 + R10) | 0.74 | Y1R1/Y4R2 | 2.46 |
| (R7 − R11)/(R7 + R11) | 0.74 | |Sag2R1|/CT2 | 0.43 |

7th Embodiment

Figure 13:
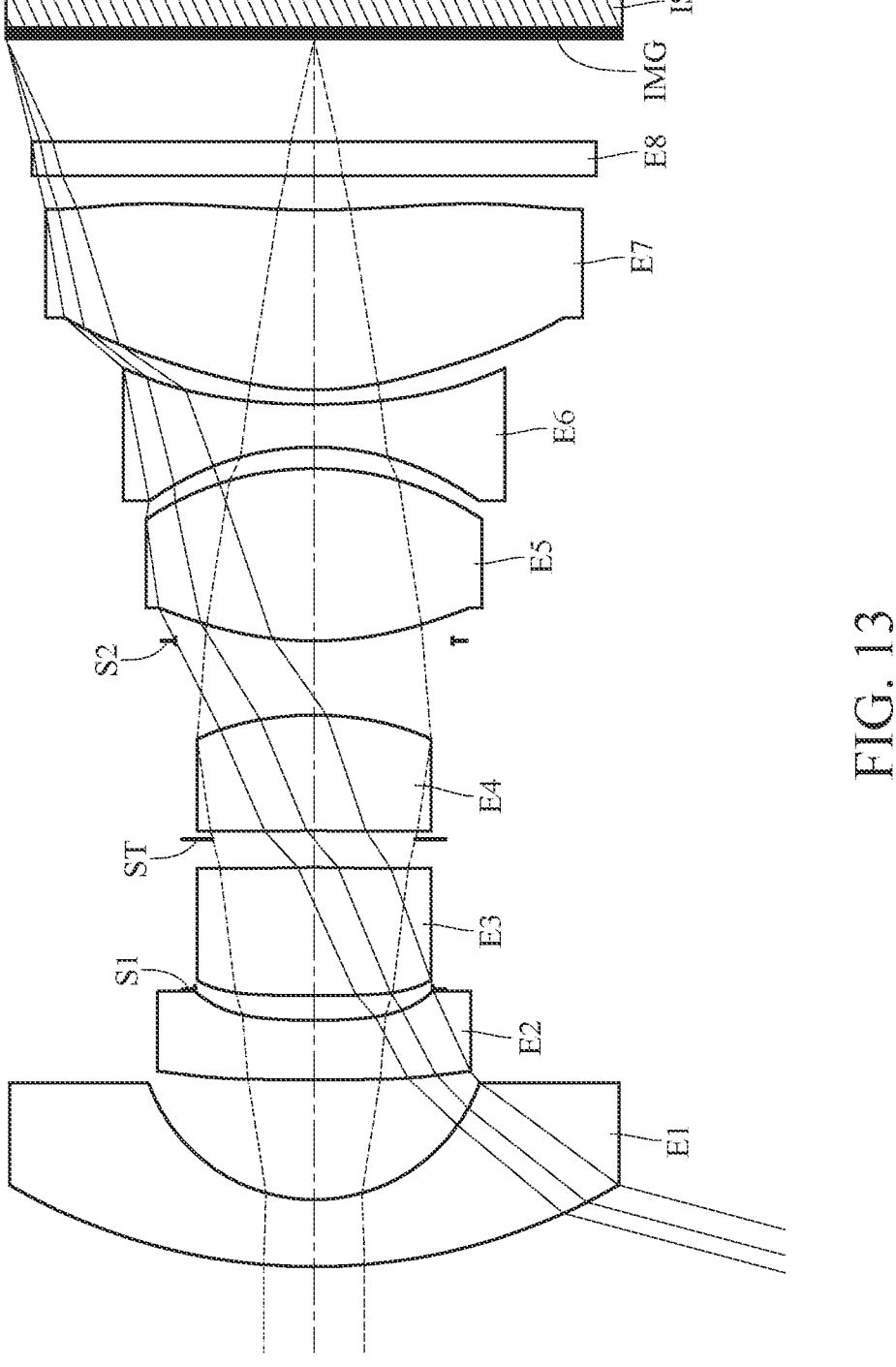
FIG. 13 is a schematic view of an image capturing unit according to the 7th embodiment of the present disclosure.
Figure 14:
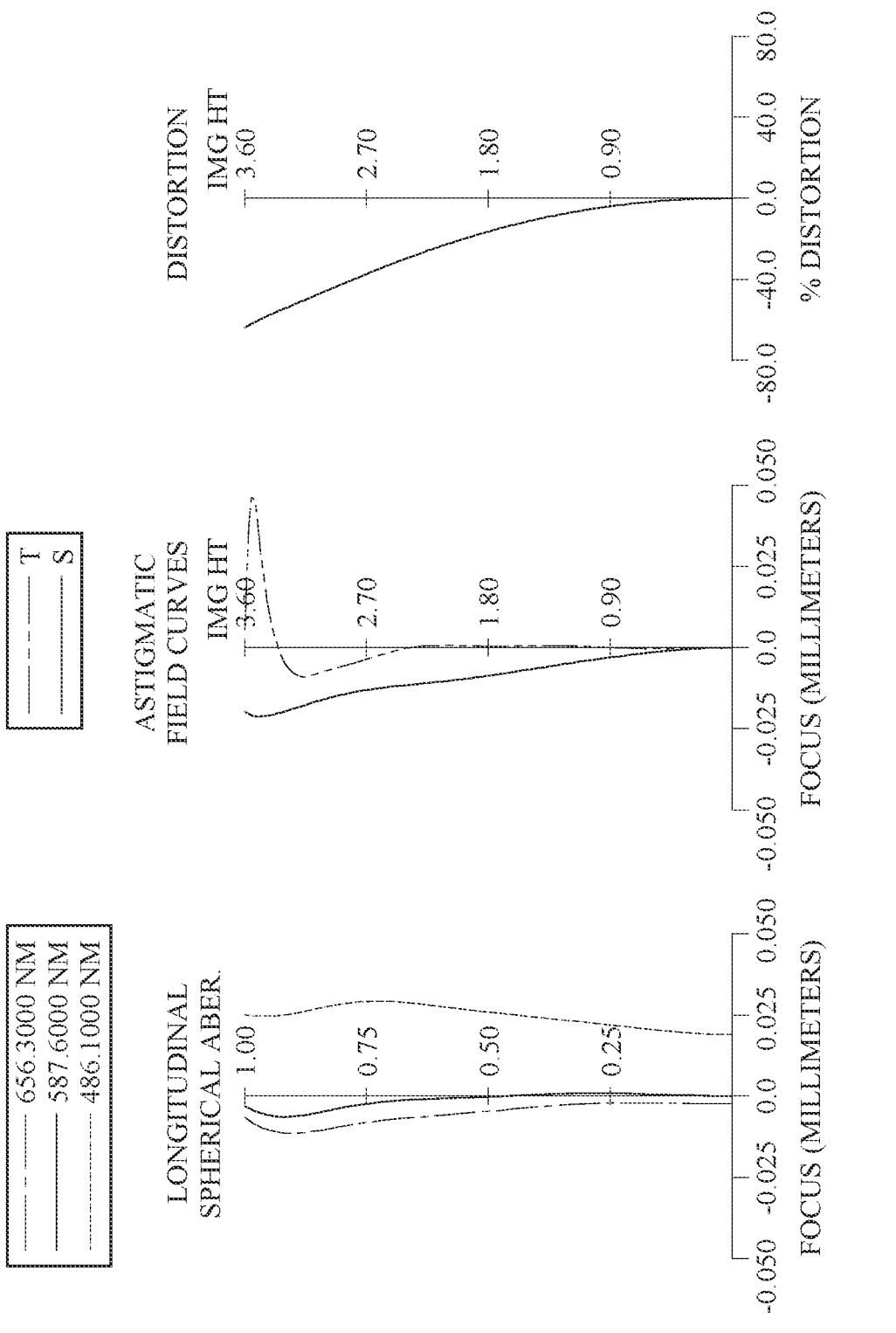
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit 7 includes an imaging lens system (its reference numeral is omitted) of the present disclosure and an image sensor IS. The imaging lens system includes, in order from an object side to an image side along an optical path, a first lens element E1, a second lens element E2, a stop S1, a third lens element E3, an aperture stop ST, a fourth lens element E4, a stop S2, a fifth lens element E5, a sixth lens element E6, a seventh lens element E7, a filter E8 and an image surface IMG. The imaging lens system includes seven lens elements (E1, E2, E3, E4, E5, E6 and E7) with no additional lens element disposed between each of the adjacent seven lens elements.

The first lens element E1 with negative refractive power has an object-side surface being convex in a paraxial region thereof and an image-side surface being concave in a paraxial region thereof. The first lens element E1 is made of glass material and has the object-side surface and the image-side surface being both spherical.

The second lens element E2 with negative refractive power has an object-side surface being concave in a paraxial region thereof and an image-side surface being concave in a paraxial region thereof. The second lens element E2 is made of plastic material and has the object-side surface and the image-side surface being both aspheric. The object-side surface of the second lens element E2 has two inflection points. The object-side surface of the second lens element E2 has one convex critical point in an off-axis region thereof.

The third lens element E3 with positive refractive power has an object-side surface being convex in a paraxial region thereof and an image-side surface being convex in a paraxial region thereof. The third lens element E3 is made of plastic material and has the object-side surface and the image-side surface being both aspheric. The image-side surface of the third lens element E3 has one inflection point. The image-side surface of the third lens element E3 has one concave critical point in an off-axis region thereof.

The fourth lens element E4 with positive refractive power has an object-side surface being concave in a paraxial region thereof and an image-side surface being convex in a paraxial region thereof. The fourth lens element E4 is made of glass material and has the object-side surface and the image-side surface being both aspheric. The object-side surface of the fourth lens element E4 has two inflection points. The object-side surface of the fourth lens element E4 has one convex critical point and one concave critical point in an off-axis region thereof.

The fifth lens element E5 with positive refractive power has an object-side surface being convex in a paraxial region thereof and an image-side surface being convex in a paraxial region thereof. The fifth lens element E5 is made of plastic material and has the object-side surface and the image-side surface being both aspheric. The object-side surface of the fifth lens element E5 has one inflection point.

The sixth lens element E6 with negative refractive power has an object-side surface being concave in a paraxial region thereof and an image-side surface being concave in a paraxial region thereof. The sixth lens element E6 is made of plastic material and has the object-side surface and the image-side surface being both aspheric.

The seventh lens element E7 with positive refractive power has an object-side surface being convex in a paraxial region thereof and an image-side surface being concave in a paraxial region thereof. The seventh lens element E7 is made of plastic material and has the object-side surface and the image-side surface being both aspheric. The image-side surface of the seventh lens element E7 has three inflection points. The image-side surface of the seventh lens element E7 has one convex critical point in an off-axis region thereof.

The filter E8 is made of glass material and located between the seventh lens element E7 and the image surface IMG, and will not affect the focal length of the imaging lens system. The image sensor IS is disposed on or near the image surface IMG of the imaging lens system.

The detailed optical data of the 7th embodiment are shown in Table 7A and the aspheric surface data are shown in Table 7B below.

TABLE 7A

7th Embodiment
f = 2.66 mm, Fno = 2.25, HFOV = 75.0 deg.

| Surface # | | Curvature Radius | Thickness | Material | Index | Abbe # | Focal Length |
| --- | --- | --- | --- | --- | --- | --- | --- |
| 0 | Object | Plano | Infinity | | | | |
| 1 | Lens 1 | 7.1126 (SPH) | 0.784 | Glass | 1.767 | 49.2 | −4.03 |
| 2 | | 2.0509 (SPH) | 1.406 | | | | |
| 3 | Lens 2 | −100.1296 (ASP) | 0.691 | Plastic | 1.671 | 19.5 | −13.01 |
| 4 | | 9.5954 (ASP) | 0.365 | | | | |
| 5 | Stop | Plano | −0.075 | | | | |
| 6 | Lens 3 | 68.3878 (ASP) | 1.497 | Plastic | 1.642 | 22.5 | 16.79 |
| 7 | | −12.6786 (ASP) | 0.326 | | | | |

TABLE 7A-continued

| | | 7th Embodiment f = 2.66 mm, Fno = 2.25, HFOV = 75.0 deg. | | | | | |
|---|---|---|---|---|---|---|---|
| Surface # | | Curvature Radius | Thickness | Material | Index | Abbe # | Focal Length |
| 8 | Ape. Stop | Plano | 0.100 | | | | |
| 9 | Lens 4 | −32.8637 (ASP) | 1.354 | Glass | 1.693 | 53.0 | 5.94 |
| 10 | | −3.7189 (ASP) | 0.865 | | | | |
| 11 | Stop | Plano | 0.000 | | | | |
| 12 | Lens 5 | 4.0342 (ASP) | 2.014 | Plastic | 1.545 | 56.0 | 3.93 |
| 13 | | −3.7694 (ASP) | 0.250 | | | | |
| 14 | Lens 6 | −3.3714 (ASP) | 0.500 | Plastic | 1.671 | 19.5 | −3.39 |
| 15 | | 7.3845 (ASP) | 0.169 | | | | |
| 16 | Lens 7 | 3.5738 (ASP) | 2.104 | Plastic | 1.545 | 56.0 | 8.86 |
| 17 | | 10.9188 (ASP) | 0.400 | | | | |
| 18 | Filter | Plano | 0.400 | Glass | 1.517 | 64.2 | — |
| 19 | | Plano | 1.195 | | | | |
| 20 | Image | Plano | — | | | | |

Note:
Reference wavelength is 587.6 nm (d-line).
An effective radius of the stop S1 (Surface 5) is 1.389 mm.
An effective radius of the stop S2 (Surface 11) is 1.618 mm.

TABLE 7B

| | Aspheric Coefficients | | | |
|---|---|---|---|---|
| Surface # | 3 | 4 | 6 | 7 |
| k = | 9.000000E+01 | 3.714610E+01 | 9.000000E+01 | 2.278550E−01 |
| A4 = | 1.570416E−02 | 4.001321E−02 | 3.166678E−02 | 2.884054E−02 |
| A6 = | 3.062983E−03 | 1.729824E−02 | 9.011717E−03 | −5.382115E−03 |
| A8 = | −4.923495E−03 | −1.763711E−02 | −4.580473E−03 | 6.415710E−03 |
| A10 = | 2.734608E−03 | 1.325470E−02 | 4.625754E−03 | −3.683275E−03 |
| A12 = | −9.003492E−04 | −3.651437E−03 | −1.207252E−03 | 4.758230E−04 |
| A14 = | 1.541518E−04 | 3.567838E−06 | −8.783624E−05 | 8.167232E−04 |
| A16 = | −1.082437E−05 | 1.328074E−05 | 2.407269E−05 | −2.931513E−04 |

| Surface # | 9 | 10 | 12 | 13 |
|---|---|---|---|---|
| k = | −6.120640E+01 | 4.578860E−01 | −2.616970E+00 | −8.149510E−01 |
| A4 = | 1.487481E−02 | −2.557562E−03 | 3.901606E−03 | −1.136565E−02 |
| A6 = | −5.656471E−03 | −1.826472E−03 | −1.723678E−03 | 2.051217E−03 |
| A8 = | 6.896587E−04 | 4.924758E−05 | 2.842909E−04 | 5.941852E−04 |
| A10 = | −1.016213E−04 | 2.433517E−05 | 2.005834E−04 | −2.373174E−04 |
| A12 = | −5.781752E−18 | −1.561260E−05 | −1.750423E−04 | −4.245718E−05 |
| A14 = | — | — | 5.016943E−05 | 2.740313E−05 |
| A16 = | — | — | −5.277057E−06 | −3.359081E−06 |

| Surface # | 14 | 15 | 16 | 17 |
|---|---|---|---|---|
| k = | −8.149510E−01 | 6.176360E+00 | −6.575030E+00 | 6.805300E+00 |
| A4 = | −1.136565E−02 | −1.180368E−04 | 2.247030E−03 | −8.628672E−03 |
| A6 = | 2.051217E−03 | 1.491665E−03 | −1.206609E−03 | −3.576929E−05 |
| A8 = | 5.941852E−04 | −1.239532E−03 | 1.816400E−04 | 1.526231E−04 |
| A10 = | −2.373174E−04 | 5.583734E−04 | 2.135871E−05 | −4.301937E−05 |
| A12 = | −4.245718E−05 | −1.358752E−04 | −7.376708E−06 | 6.181997E−06 |
| A14 = | 2.740313E−05 | 1.633010E−05 | 6.635631E−07 | −3.937451E−07 |
| A16 = | −3.359081E−06 | −7.830150E−07 | −2.085795E−08 | 8.562046E−09 |

In the 7th embodiment, the equation of the aspheric surface profiles of the aforementioned lens elements is the same as the equation of the 1st embodiment. Also, the definitions of these parameters shown in Table 7C below are the same as those stated in the 1st embodiment with corresponding values for the 7th embodiment, so an explanation in this regard will not be provided again.

Moreover, these parameters can be calculated from Table 7A and Table 7B as the following values and satisfy the following conditions:

TABLE 7C

| Values of Conditional Expressions | | | |
|---|---|---|---|
| f [mm] | 2.66 | |R2/R4| | 0.21 |
| Fno | 2.25 | R11/R10 | 0.89 |
| HFOV [deg.] | 75.0 | |R10 − R11| × 10/f | 1.50 |
| FOV [deg.] | 150.0 | ΣCT/ΣAT | 2.63 |
| f/TL | 0.19 | Dr7r14/Dr1r6 | 1.55 |
| TL/ImgH | 3.99 | CT4/(CT5 + T56 + CT6) | 0.49 |
| TD/BL | 6.19 | CT4/CT5 | 0.67 |
| f1/f3 | −0.24 | (T34 + T45)/T12 | 0.92 |
| |f1/f7| | 0.45 | T45/CT5 | 0.43 |

TABLE 7C-continued

| Values of Conditional Expressions | | | |
|---|---|---|---|
| \|f/f2\| + \|f/f3\| + \|f/f7\| | 0.66 | T56 [mm] | 0.250 |
| (\|f/f2\| + \|f/f7\|)/\|f/f1\| | 0.76 | V2/N2 | 11.67 |
| (R4 + R10)/(R4 − R10) | 0.44 | V3 | 22.5 |
| (R7 − R8)/(R7 + R8) | 0.80 | MAX_N237 | 1.671 |
| (R7 − R10)/(R7 + R10) | 0.79 | Y1R1/Y4R2 | 2.36 |
| (R7 − R11)/(R7 + R11) | 0.81 | \|Sag2R1\|/CT2 | 0.14 |

8th Embodiment

Figure 15:
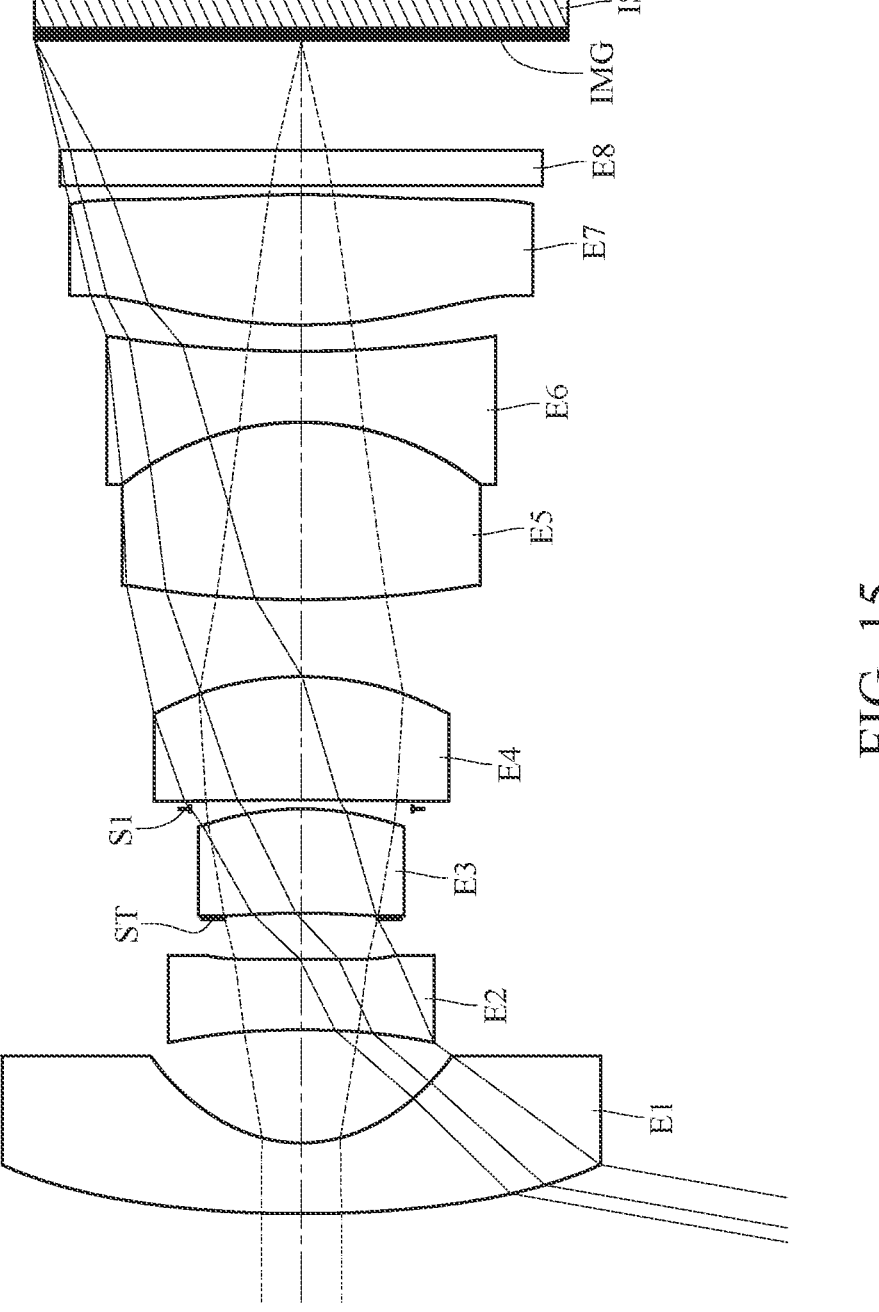
FIG. 15 is a schematic view of an image capturing unit according to the 8th embodiment of the present disclosure.
Figure 16:
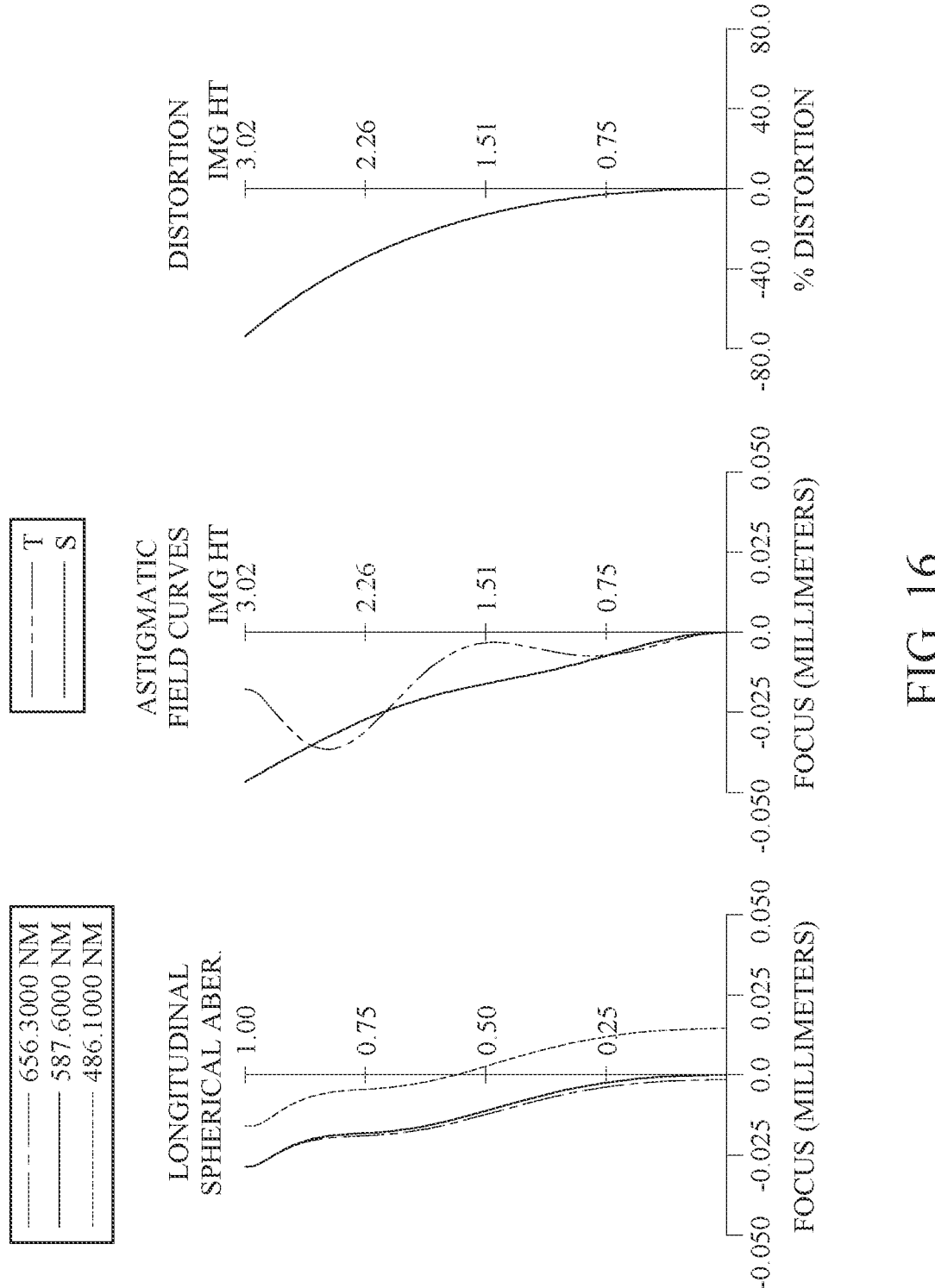
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit 8 includes an imaging lens system (its reference numeral is omitted) of the present disclosure and an image sensor IS. The imaging lens system includes, in order from an object side to an image side along an optical path, a first lens element E1, a second lens element E2, an aperture stop ST, a third lens element E3, a stop S1, a fourth lens element E4, a fifth lens element E5, a sixth lens element E6, a seventh lens element E7, a filter E8 and an image surface IMG. The imaging lens system includes seven lens elements (E1, E2, E3, E4, E5, E6 and E7) with no additional lens element disposed between each of the adjacent seven lens elements.

The first lens element E1 with negative refractive power has an object-side surface being convex in a paraxial region thereof and an image-side surface being concave in a paraxial region thereof. The first lens element E1 is made of glass material and has the object-side surface and the image-side surface being both aspheric.

The second lens element E2 with negative refractive power has an object-side surface being concave in a paraxial region thereof and an image-side surface being convex in a paraxial region thereof. The second lens element E2 is made of plastic material and has the object-side surface and the image-side surface being both aspheric. The image-side surface of the second lens element E2 has one inflection point. The image-side surface of the second lens element E2 has one concave critical point in an off-axis region thereof.

The third lens element E3 with positive refractive power has an object-side surface being concave in a paraxial region thereof and an image-side surface being convex in a paraxial region thereof. The third lens element E3 is made of plastic material and has the object-side surface and the image-side surface being both aspheric. The object-side surface of the third lens element E3 has one inflection point.

The fourth lens element E4 with positive refractive power has an object-side surface being concave in a paraxial region thereof and an image-side surface being convex in a paraxial region thereof. The fourth lens element E4 is made of glass material and has the object-side surface and the image-side surface being both spherical.

The fifth lens element E5 with positive refractive power has an object-side surface being convex in a paraxial region thereof and an image-side surface being convex in a paraxial region thereof. The fifth lens element E5 is made of glass material and has the object-side surface and the image-side surface being both spherical.

The sixth lens element E6 with negative refractive power has an object-side surface being concave in a paraxial region thereof and an image-side surface being concave in a paraxial region thereof. The sixth lens element E6 is made of glass material and has the object-side surface and the image-side surface being both spherical. The image-side surface of the fifth lens element E5 is cemented to the object-side surface of the sixth lens element E6.

The seventh lens element E7 with positive refractive power has an object-side surface being convex in a paraxial region thereof and an image-side surface being convex in a paraxial region thereof. The seventh lens element E7 is made of plastic material and has the object-side surface and the image-side surface being both aspheric. The object-side surface of the seventh lens element E7 has one inflection point. The image-side surface of the seventh lens element E7 has two inflection points.

The filter E8 is made of glass material and located between the seventh lens element E7 and the image surface IMG, and will not affect the focal length of the imaging lens system. The image sensor IS is disposed on or near the image surface IMG of the imaging lens system.

The detailed optical data of the 8th embodiment are shown in Table 8A and the aspheric surface data are shown in Table 8B below.

TABLE 8A

| 8th Embodiment f = 2.02 mm, Fno = 2.23, HFOV = 80.0 deg. | | | | | | | |
|---|---|---|---|---|---|---|---|
| Surface # | | Curvature Radius | Thickness | Material | Index | Abbe # | Focal Length |
| 0 | Object | Plano | Infinity | | | | |
| 1 | Lens 1 | 14.7128 (ASP) | 0.800 | Glass | 1.693 | 53.2 | −2.83 |
| 2 | | 1.6915 (ASP) | 1.280 | | | | |
| 3 | Lens 2 | −11.2097 (ASP) | 0.800 | Plastic | 1.614 | 25.7 | −22.80 |
| 4 | | −57.7174 (ASP) | 0.458 | | | | |
| 5 | Ape. Stop | Plano | 0.065 | | | | |
| 6 | Lens 3 | −9.3648 (ASP) | 1.178 | Plastic | 1.544 | 55.9 | 9.02 |
| 7 | | −3.3615 (ASP) | 0.000 | | | | |
| 8 | Stop | Plano | 0.100 | | | | |
| 9 | Lens 4 | −69.4748 (SPH) | 1.400 | Glass | 1.804 | 46.6 | 4.52 |
| 10 | | −3.4866 (SPH) | 0.869 | | | | |
| 11 | Lens 5 | 11.9927 (SPH) | 2.007 | Glass | 1.772 | 49.6 | 3.52 |
| 12 | | −3.2627 (SPH) | 0.005 | Cement | 1.550 | 43.9 | — |
| 13 | Lens 6 | −3.2627 (SPH) | 0.800 | Glass | 1.946 | 17.9 | −2.74 |
| 14 | | 14.0712 (SPH) | 0.299 | | | | |
| 15 | Lens 7 | 5.7234 (ASP) | 1.475 | Plastic | 1.544 | 55.9 | 7.23 |
| 16 | | −11.4132 (ASP) | 0.100 | | | | |

TABLE 8A-continued

| | | 8th Embodiment f = 2.02 mm, Fno = 2.23, HFOV = 80.0 deg. | | | | | | |
|---|---|---|---|---|---|---|---|---|
| Surface # | | Curvature Radius | Thickness | Material | Index | Abbe # | Focal Length |
| 17 | Filter | Plano | 0.400 | Glass | 1.517 | 64.2 | — |
| 18 | | Plano | 1.247 | | | | |
| 19 | Image | Plano | — | | | | |

Note:
Reference wavelength is 587.6 nm (d-line).
An effective radius of the stop S1 (Surface 8) is 1.254 mm.

TABLE 8B

| | | Aspheric Coefficients | | |
|---|---|---|---|---|
| Surface # | 1 | 2 | 3 | 4 |
| k = | 1.085520E+01 | −2.031770E+00 | 3.116620E+01 | 9.000000E+01 |
| A4 = | 5.277425E−04 | 3.370790E−02 | −1.793638E−02 | 1.012287E−02 |
| A6 = | — | −8.206949E−04 | 6.815490E−03 | 3.095616E−02 |
| A8 = | — | −4.049706E−05 | −1.551786E−04 | −1.933312E−02 |
| A10 = | — | 3.080869E−05 | −6.885607E−05 | 1.387696E−02 |
| A12 = | — | 1.351533E−05 | 3.365818E−16 | −1.488117E−16 |
| A14 = | — | — | −1.381430E−18 | −1.545271E−18 |
| A16 = | — | — | −1.590097E−20 | −1.604850E−20 |

| Surface # | 6 | 7 | 15 | 16 |
|---|---|---|---|---|
| k = | 7.755930E+01 | −8.139900E−01 | 2.541270E+00 | −3.652980E+01 |
| A4 = | 1.147674E−02 | −2.816177E−03 | −4.783102E−03 | 9.461520E−03 |
| A6 = | 2.815044E−02 | 1.186841E−03 | −4.604575E−04 | −8.651442E−04 |
| A8 = | −2.086328E−02 | 5.300616E−04 | −2.033507E−06 | −4.310939E−05 |
| A10 = | 2.164476E−02 | 5.002257E−05 | −6.457199E−06 | 2.790976E−06 |
| A12 = | −1.487140E−16 | −1.522227E−16 | −2.770639E−15 | 6.239353E−14 |
| A14 = | −1.545274E−18 | −1.545521E−18 | −2.671508E−18 | 1.061363E−17 |
| A16 = | −1.604852E−20 | −1.604384E−20 | −1.648560E−20 | −1.008045E−20 |

In the 8th embodiment, the equation of the aspheric surface profiles of the aforementioned lens elements is the same as the equation of the 1st embodiment. Also, the definitions of these parameters shown in Table 8C below are the same as those stated in the 1st embodiment with corresponding values for the 8th embodiment, so an explanation in this regard will not be provided again.

Moreover, these parameters can be calculated from Table 8A and Table 8B as the following values and satisfy the following conditions:

TABLE 8C

| Values of Conditional Expressions | | | |
|---|---|---|---|
| f [mm] | 2.02 | |R2/R4| | 0.03 |
| Fno | 2.23 | R11/R10 | 1.00 |
| HFOV [deg.] | 80.0 | |R10 − R11| × 10/f | 0 |
| FOV [deg.] | 160.0 | ΣCT/ΣAT | 2.75 |
| f/TL | 0.15 | Dr7r14/Dr1r6 | 1.50 |
| TL/ImgH | 4.40 | CT4/(CT5 + T56 + CT6) | 0.50 |
| TD/BL | 6.60 | CT4/CT5 | 0.70 |
| f1/f3 | −0.31 | (T34 + T45)/T12 | 0.76 |
| |f1/f7| | 0.39 | T45/CT5 | 0.43 |
| |f/f2| + |f/f3| + |f/f7| | 0.59 | T56 [mm] | 0.005 |
| (|f/f2| + |f/f7|)/|f/f1| | 0.51 | V2/N2 | 15.92 |
| (R4 + R10)/(R4 − R10) | 1.12 | V3 | 55.9 |
| (R7 − R8)/(R7 + R8) | 0.90 | MAX_N237 | 1.614 |
| (R7 − R10)/(R7 + R10) | 0.91 | Y1R1/Y4R2 | 2.03 |
| (R7 − R11)/(R7 + R11) | 0.91 | |Sag2R1|/CT2 | 0.18 |

9th Embodiment

Figure 17:
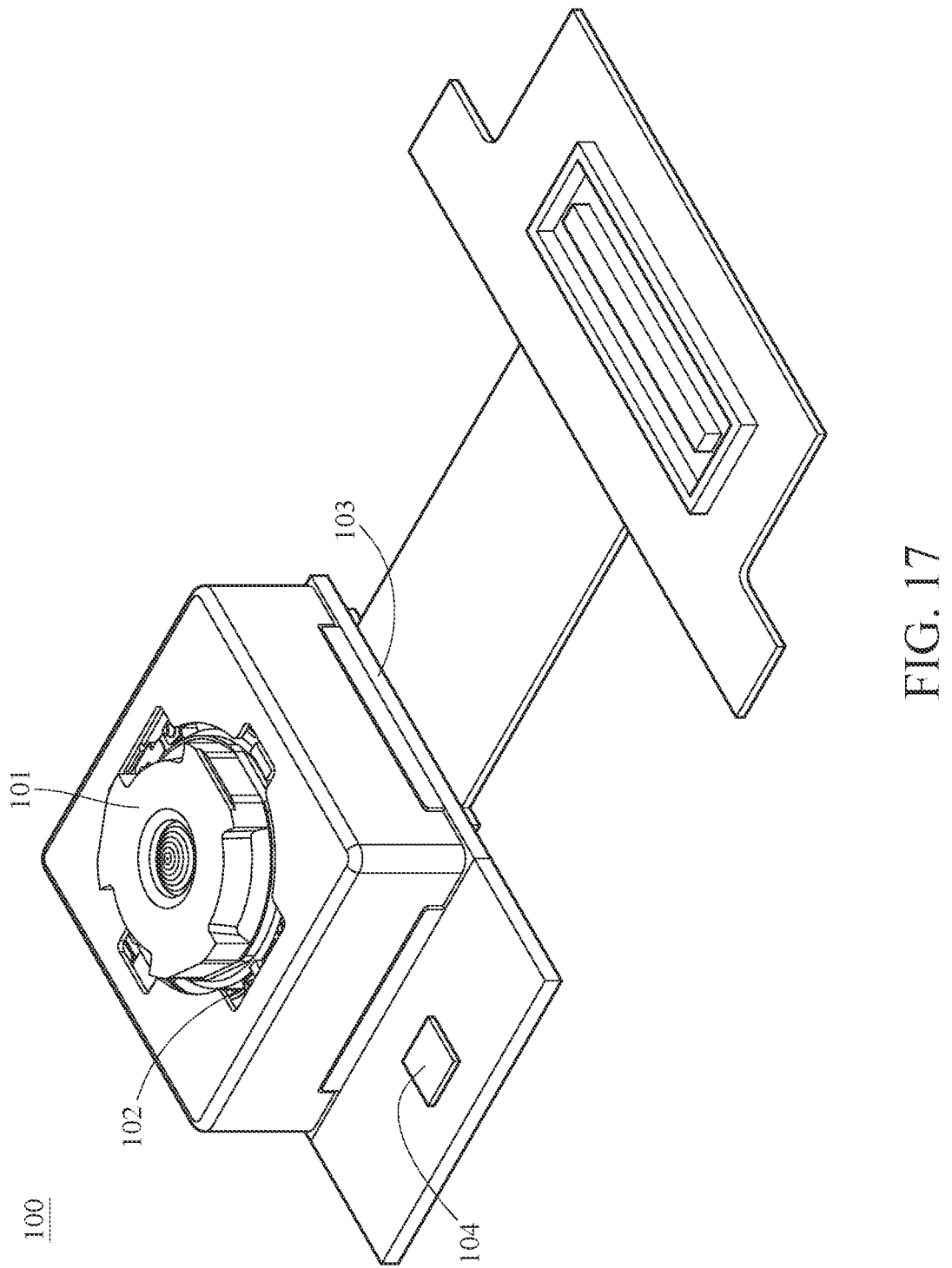
FIG. 17 is a perspective view of an image capturing unit according to the 9th embodiment of the present disclosure.

FIG. 17 is a perspective view of an image capturing unit according to the 9th embodiment of the present disclosure. In this embodiment, an image capturing unit 100 is a camera module including a lens unit 101, a driving device 102, an image sensor 103 and an image stabilizer 104. The lens unit 101 includes the imaging lens system as disclosed in the 1st embodiment, a barrel and a holder member (their reference numerals are omitted) for holding the imaging lens system. However, the lens unit 101 may alternatively be provided with the imaging lens system disclosed in other embodiments of the present disclosure, and the present disclosure is not limited thereto. The imaging light converges in the lens unit 101 of the image capturing unit 100 to generate an image with the driving device 102 utilized for image focusing on the image sensor 103, and the generated image is then digitally transmitted to other electronic component for further processing.

The driving device 102 can have auto focusing functionality, and different driving configurations can be obtained through the usages of voice coil motors (VCM), micro electro-mechanical systems (MEMS), piezoelectric systems or shape memory alloy materials. The driving device 102 is favorable for obtaining a better imaging position of the lens unit 101, so that a clear image of the imaged object can be captured by the lens unit 101 with different object distances. The image sensor 103 (for example, CCD or CMOS), which can feature high photosensitivity and low noise, is disposed on the image surface of the imaging lens system to provide higher image quality.

The image stabilizer 104, such as an accelerometer, a gyro sensor and a Hall Effect sensor, is configured to work with the driving device 102 to provide optical image stabilization (OIS). The driving device 102 working with the image stabilizer 104 is favorable for compensating for pan and tilt of the lens unit 101 to reduce blurring associated with motion during exposure. In some cases, the compensation can be provided by electronic image stabilization (EIS) with image processing software, thereby improving image quality while in motion or low-light conditions.

10th Embodiment

Figure 18:
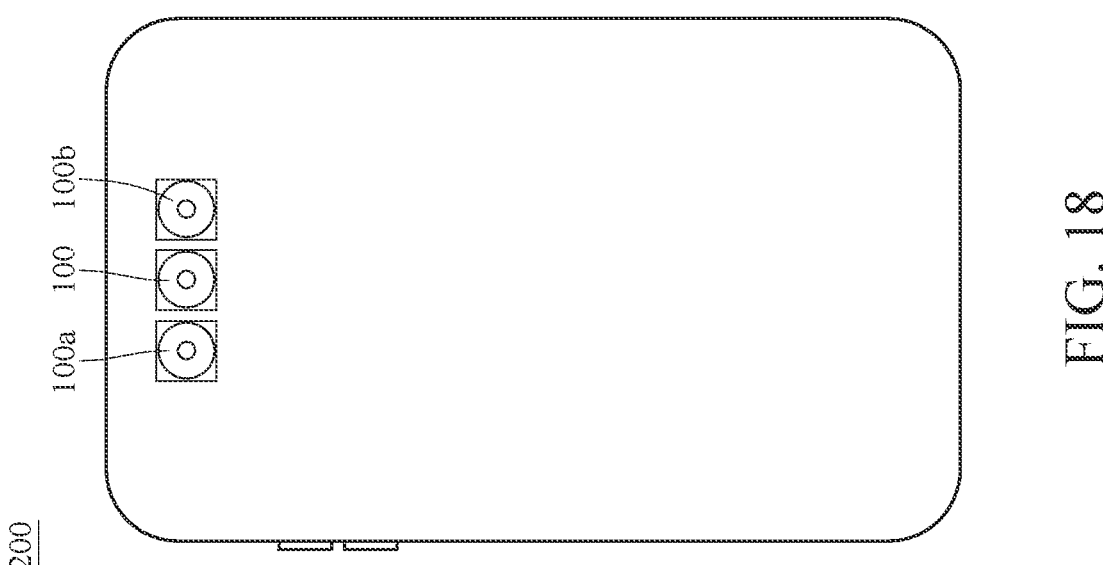
FIG. 18 is one perspective view of an electronic device according to the 10th embodiment of the present disclosure.
Figure 19:
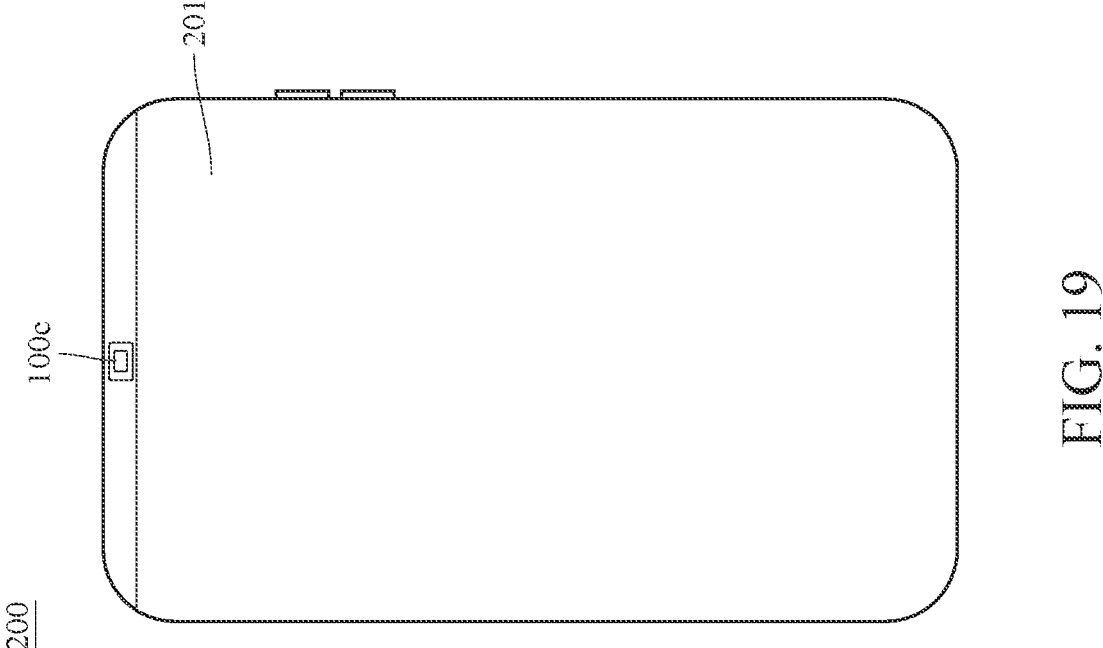
FIG. 19 is another perspective view of the electronic device in FIG. 18.

FIG. 18 is one perspective view of an electronic device according to the 10th embodiment of the present disclosure. FIG. 19 is another perspective view of the electronic device in FIG. 18.

In this embodiment, an electronic device 200 is a smartphone including the image capturing unit 100 disclosed in the 9th embodiment, an image capturing unit 100a, an image capturing unit 100b, an image capturing unit 100c and a display module 201. As shown in FIG. 18, the image capturing unit 100, the image capturing unit 100a and the image capturing unit 100b are disposed on the same side of the electronic device 200 and are all single focus. As shown in FIG. 19, the image capturing unit 100c and the display module 201 are disposed on the opposite side of the electronic device 200. The image capturing unit 100c can be a front-facing camera of the electronic device 200 for taking selfies, but the present disclosure is not limited thereto. Furthermore, each of the image capturing units 100a, 100b and 100c can include the imaging lens system of the present disclosure and can have a configuration similar to that of the image capturing unit 100. In detail, each of the image capturing units 100a, 100b and 100c can include a lens unit, a driving device, an image sensor and an image stabilizer. In addition, each of the lens unit of the image capturing units 100a, 100b and 100c can include the imaging lens system of the present disclosure, a barrel and a holder member for holding the imaging lens system.

The image capturing unit 100 is a wide-angle image capturing unit, the image capturing unit 100a is a telephoto image capturing unit, the image capturing unit 100b is an ultra-wide-angle image capturing unit, and the image capturing unit 100c is a wide-angle image capturing unit. In this embodiment, the image capturing units 100, 100a and 100b have different fields of view, such that the electronic device 200 can have various magnification ratios so as to meet the requirement of optical zoom functionality for various applications with different requirements. The image capturing unit 100c can have a non-circular opening, and optical components in the image capturing unit 100c can have trimmed edges at their outermost positions so as to coordinate with the shape of the non-circular opening. Therefore, it is favorable for reducing the size of the image capturing unit 100c so as to increase the ratio of the area of the display module 201 relative to that of the electronic device 200, and reduce the thickness of the electronic device 200. In this embodiment, the electronic device 200 includes multiple image capturing units 100, 100a, 100b and 100c, but the present disclosure is not limited to the number and arrangement of image capturing units.

11th Embodiment

Figure 20:
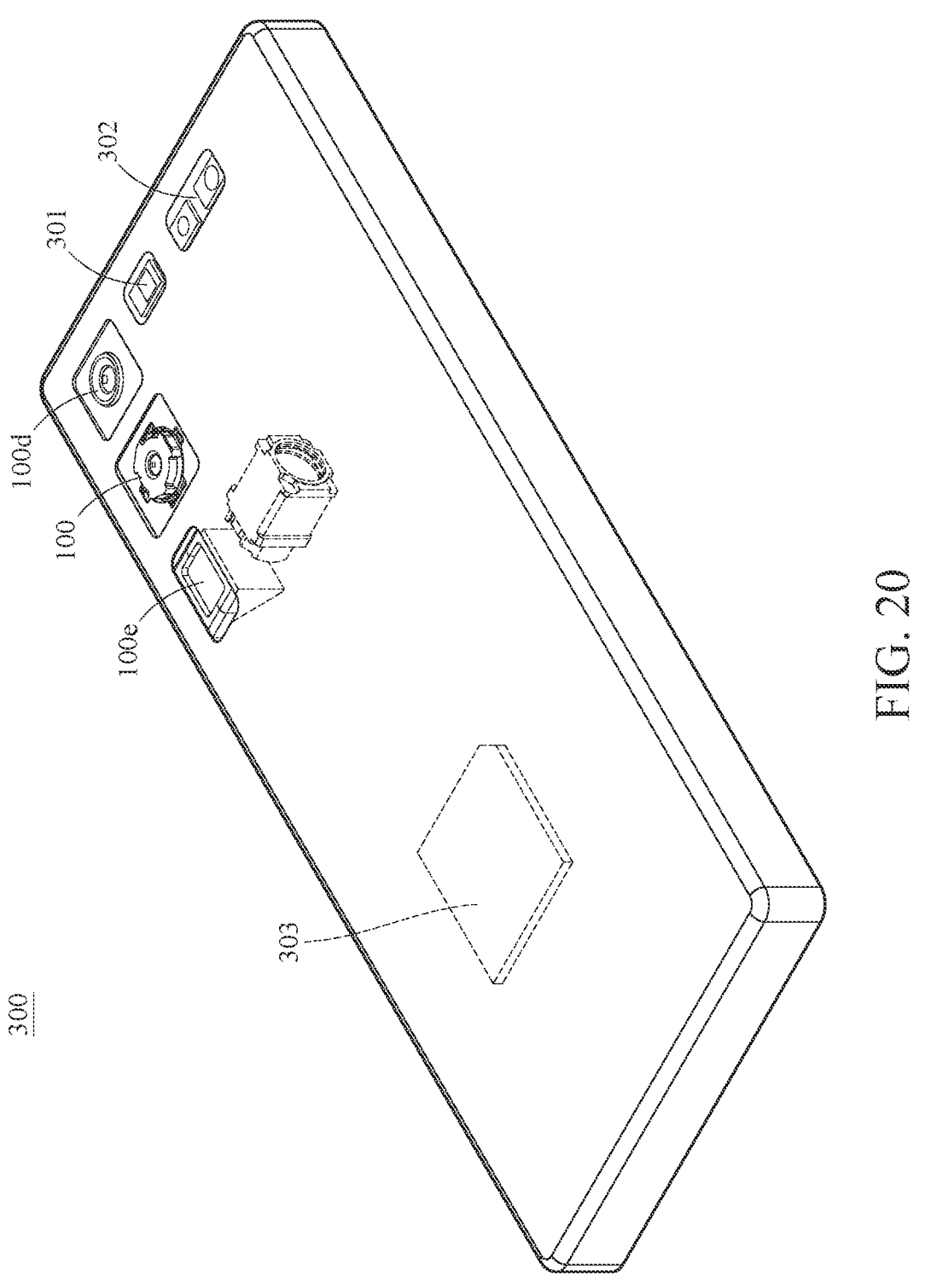
FIG. 20 is one perspective view of an electronic device according to the 11th embodiment of the present disclosure.

FIG. 20 is one perspective view of an electronic device according to the 11th embodiment of the present disclosure.

Figure 21:
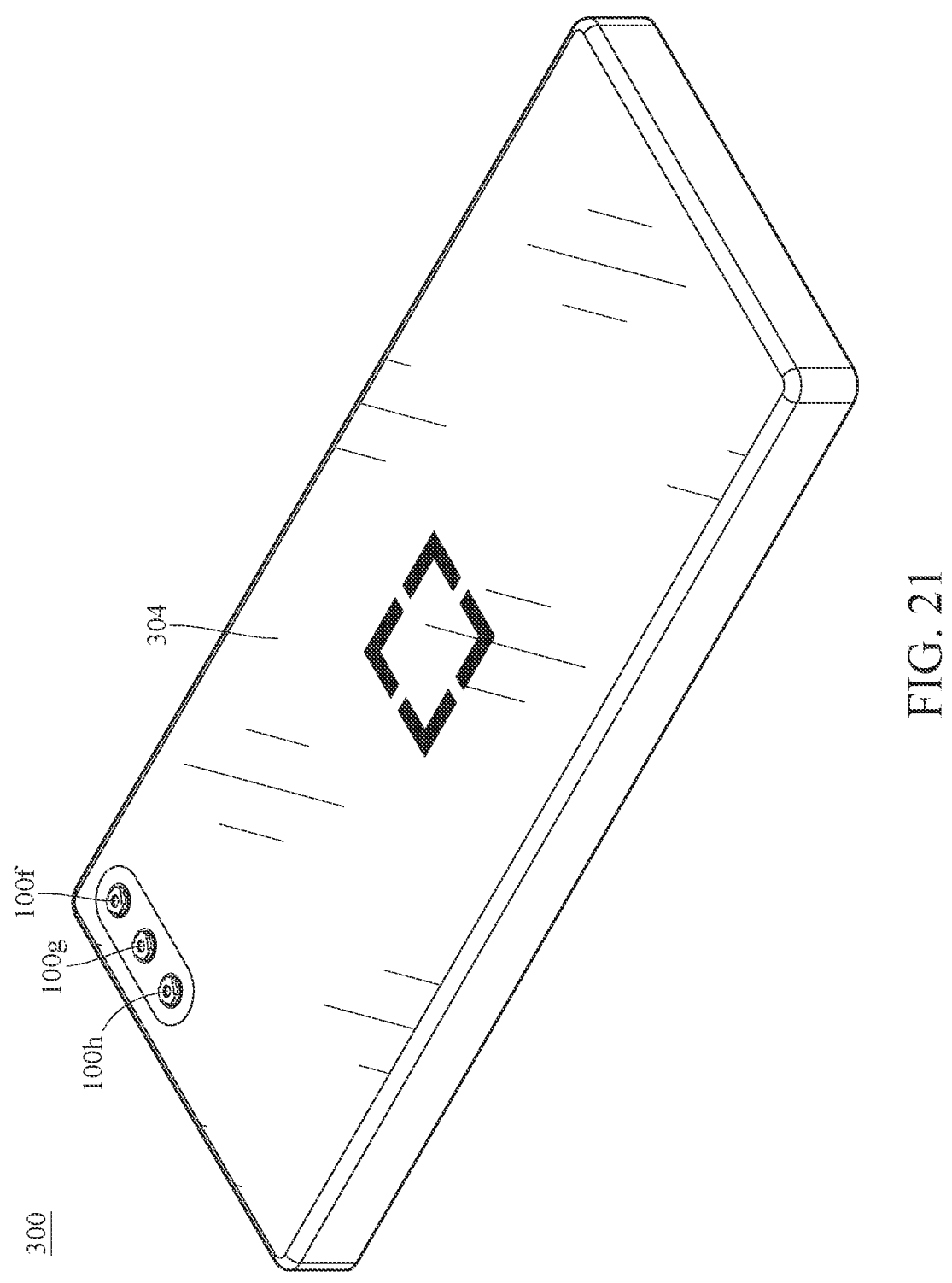
FIG. 21 is another perspective view of the electronic device in FIG. 20.
Figure 22:
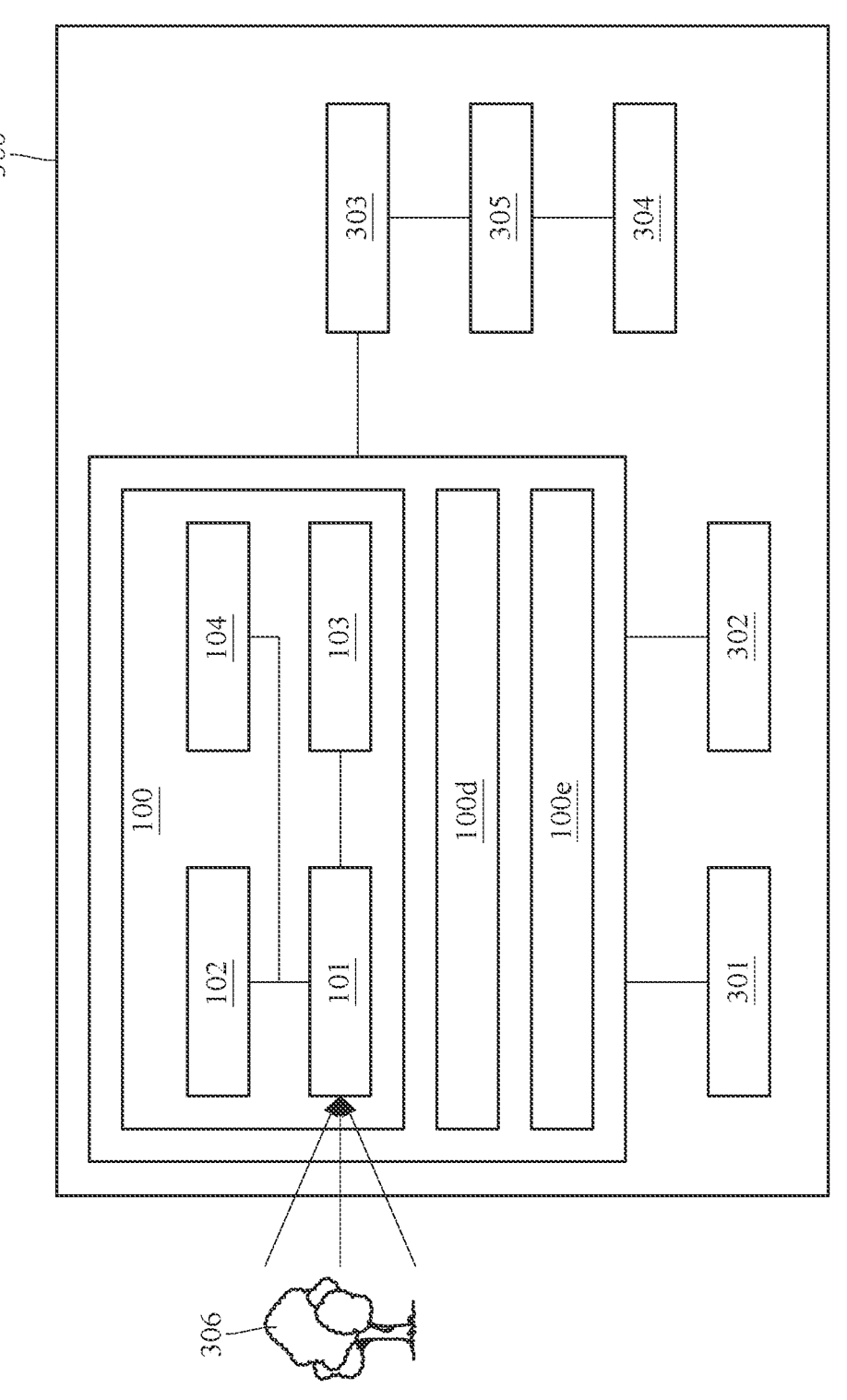
FIG. 22 is a block diagram of the electronic device in FIG. 20.

FIG. 21 is another perspective view of the electronic device in FIG. 20. FIG. 22 is a block diagram of the electronic device in FIG. 20.

In this embodiment, an electronic device 300 is a smartphone including the image capturing unit 100 disclosed in the 9th embodiment, an image capturing unit 100d, an image capturing unit 100e, an image capturing unit 100f, an image capturing unit 100g, an image capturing unit 100h, a flash module 301, a focus assist module 302, an image signal processor 303, a display module 304 and an image software processor 305. The image capturing unit 100, the image capturing unit 100d and the image capturing unit 100e are disposed on the same side of the electronic device 300. The focus assist module 302 can be a laser range finder or a ToF (time of flight) module, but the present disclosure is not limited thereto. The image capturing unit 100f, the image capturing unit 100g, the image capturing unit 100h and the display module 304 are disposed on the opposite side of the electronic device 300, and the display module 304 can be a user interface, such that the image capturing units 100f, 100g, 100h can be front-facing cameras of the electronic device 300 for taking selfies, but the present disclosure is not limited thereto. Furthermore, each of the image capturing units 100d, 100e, 100f, 100g and 100h can include the imaging lens system of the present disclosure and can have a configuration similar to that of the image capturing unit 100. In detail, each of the image capturing units 100d, 100e, 100f, 100g and 100h can include a lens unit, a driving device, an image sensor and an image stabilizer, and can also include a reflective element for folding optical path. In addition, each of the lens unit of the image capturing units 100d, 100e, 100f, 100g and 100h can include the imaging lens system of the present disclosure, a barrel and a holder member for holding the imaging lens system.

The image capturing unit 100 is a wide-angle image capturing unit, the image capturing unit 100d is an ultra-wide-angle image capturing unit, the image capturing unit 100e is a telephoto capturing unit, the image capturing unit 100f is a wide-angle image capturing unit, the image capturing unit 100g is an ultra-wide-angle image capturing unit, and the image capturing unit 100h is a ToF image capturing unit. In this embodiment, the image capturing units 100, 100d and 100e have different fields of view, such that the electronic device 300 can have various magnification ratios so as to meet the requirement of optical zoom functionality. Moreover, the image capturing unit 100e can be a telephoto image capturing unit having a light-folding element configuration, such that the total track length of the image capturing unit 100e is not limited by the thickness of the electronic device 300. In addition, the image capturing unit 100h can determine depth information of the imaged object. In this embodiment, the electronic device 300 includes multiple image capturing units 100, 100d, 100e, 100f, 100g and 100h, but the present disclosure is not limited to the number and arrangement of image capturing units.

When a user captures images of an object 306, the light rays converge in the image capturing unit 100, 100d or 100e to generate images, and the flash module 301 is activated for light supplement. The focus assist module 302 detects the object distance of the imaged object 306 to achieve fast auto focusing. The image signal processor 303 is configured to optimize the captured image to improve image quality. The light beam emitted from the focus assist module 302 can be either conventional infrared or laser. In addition, the light rays may converge in the image capturing unit 100f, 100g or 100h to generate images. The display module 304 can include a touch screen, and the user is able to interact with the display module 304 and the image software processor 305 having multiple functions to capture images and complete image processing. Alternatively, the user may capture images via a physical button. The image processed by the image software processor 305 can be displayed on the display module 304.

12th Embodiment

Figure 23:
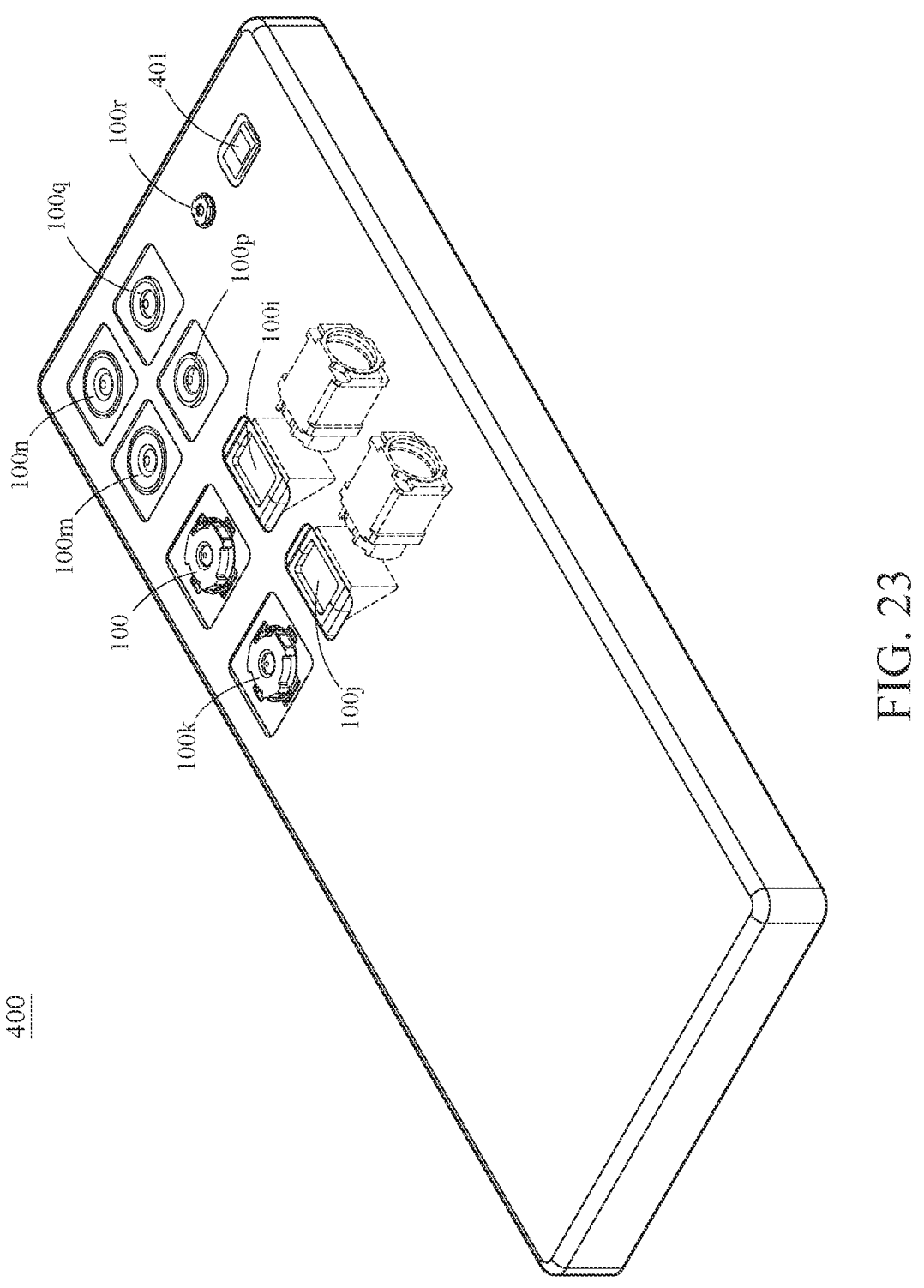
FIG. 23 is one perspective view of an electronic device according to the 12th embodiment of the present disclosure.

FIG. 23 is one perspective view of an electronic device according to the 12th embodiment of the present disclosure.

In this embodiment, an electronic device 400 is a smartphone including the image capturing unit 100 disclosed in the 9th embodiment, an image capturing unit 100i, an image capturing unit 100j, an image capturing unit 100k, an image capturing unit 100m, an image capturing unit 100n, an image capturing unit 100p, an image capturing unit 100q, an image capturing unit 100r, a flash module 401, a focus assist module, an image signal processor, a display module and an image software processor (not shown). The image capturing units 100, 100i, 100j, 100k, 100m, 100n, 100p, 100q and 100r are disposed on the same side of the electronic device 400, while the display module is disposed on the opposite side of the electronic device 400. Furthermore, each of the image capturing units 100, 100i, 100j, 100k, 100m, 100n, 100p, 100q and 100r can include the imaging lens system of the present disclosure and can have a configuration similar to that of the image capturing unit 100, and the details in this regard will not be provided again.

The image capturing unit 100 is a wide-angle image capturing unit, the image capturing unit 100i is a telephoto image capturing unit, the image capturing unit 100j is a telephoto image capturing unit, the image capturing unit 100k is a wide-angle image capturing unit, the image capturing unit 100m is an ultra-wide-angle image capturing unit, the image capturing unit 100n is an ultra-wide-angle image capturing unit, the image capturing unit 100p is a telephoto image capturing unit, the image capturing unit 100q is a telephoto image capturing unit, and the image capturing unit 100r is a ToF image capturing unit. In this embodiment, the image capturing units 100, 100i, 100j, 100k, 100m, 100n, 100p and 100q have different fields of view, such that the electronic device 400 can have various magnification ratios so as to meet the requirement of optical zoom functionality. Moreover, each of the image capturing units 100i and 100j can be a telephoto image capturing unit having a light-folding element configuration. The light-folding element configuration of each of the image capturing unit 100i and 100j can be similar to, for example, one of the structures shown in FIG. 29 to FIG. 31, which can be referred to aforementioned descriptions corresponding to FIG. 29 to FIG. 31, and the details in this regard will not be provided again. In addition, the image capturing unit 100r can determine depth information of the imaged object. In this embodiment, the electronic device 400 includes multiple image capturing units 100, 100i, 100j, 100k, 100m, 100n, 100p, 100q and 100r, but the present disclosure is not limited to the number and arrangement of image capturing units. When a user captures images of an object, the light rays converge in the image capturing unit 100, 100i, 100j, 100k, 100m, 100n, 100p, 100q or 100r to generate images, and the flash module 401 is activated for light supplement. Further, the subsequent processes are performed in a manner similar to the aforementioned embodiments, and the details in this regard will not be provided again.

13th Embodiment

Figure 24:
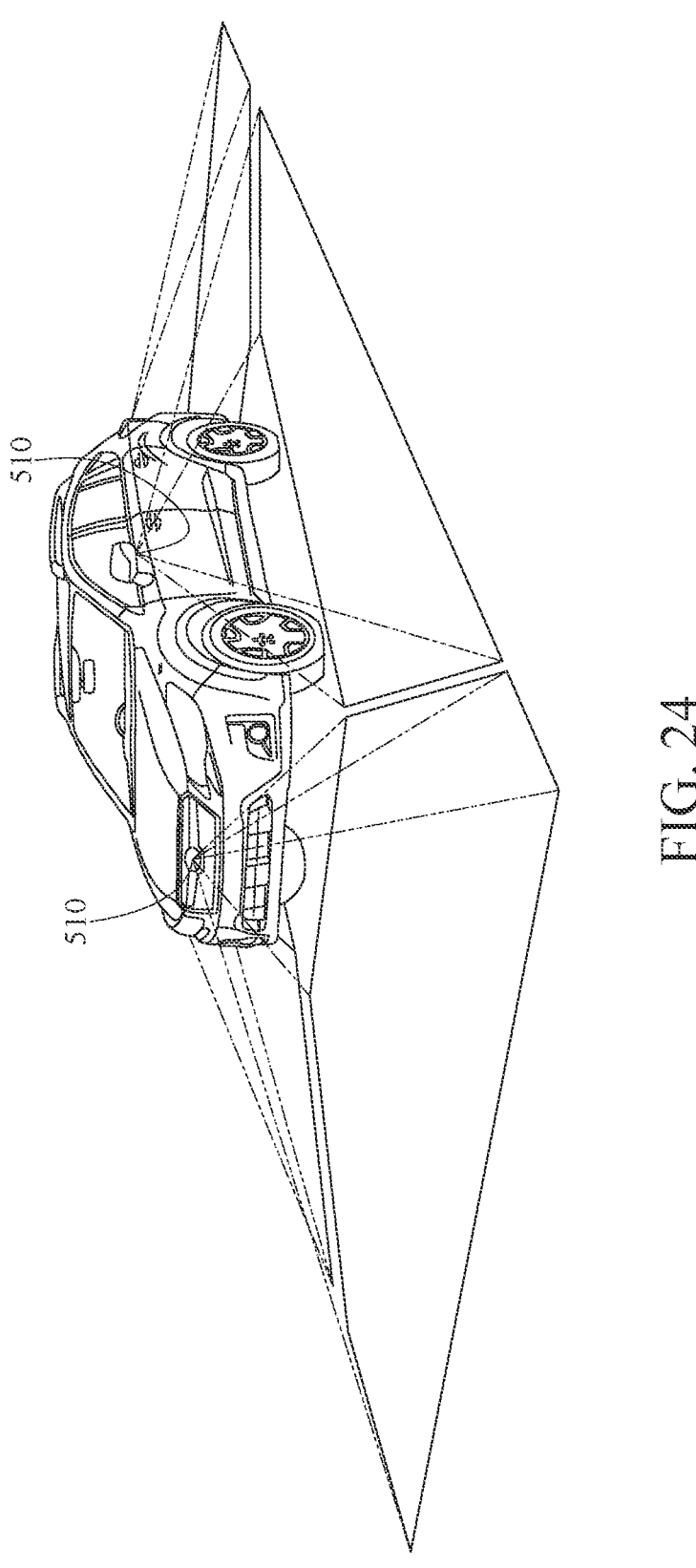
FIG. 24 is one perspective view of an electronic device according to the 13th embodiment of the present disclosure.

FIG. 24 is one perspective view of an electronic device according to the 13th embodiment of the present disclosure.

Figure 25:
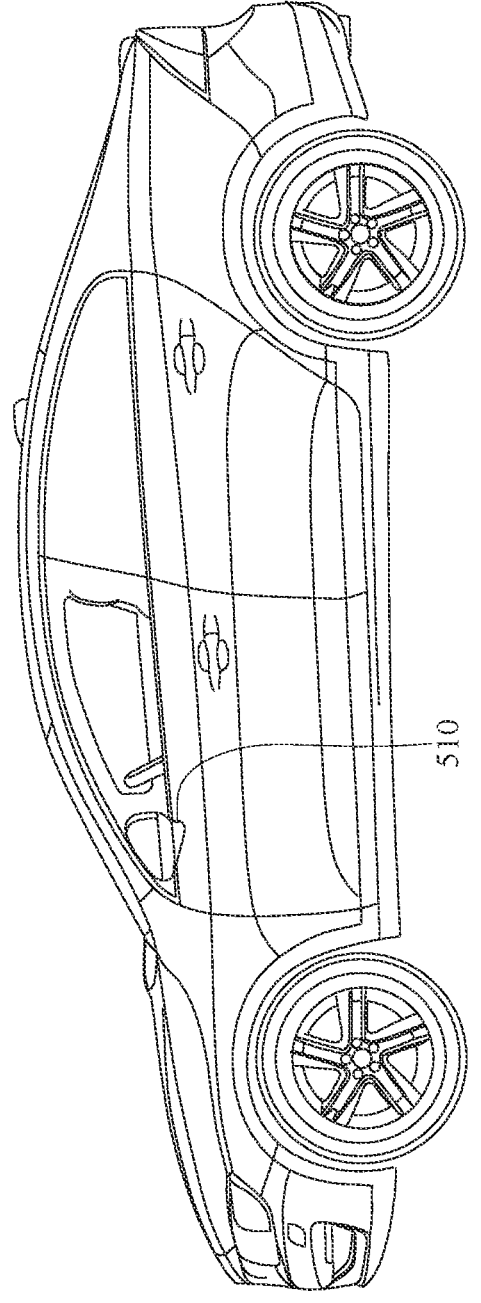
FIG. 25 is a side view of the electronic device in FIG. 24.
Figure 26:
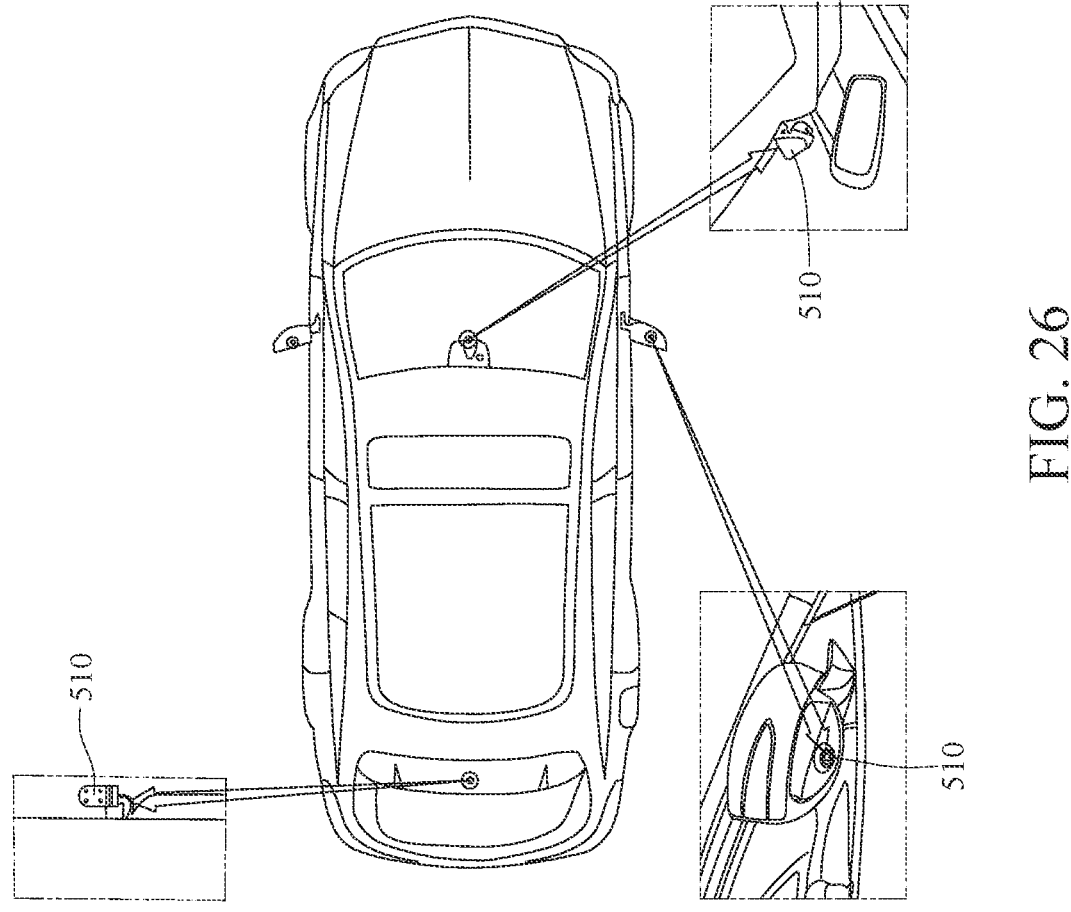
FIG. 26 is a top view of the electronic device in FIG. 24.

FIG. 25 is a side view of the electronic device in FIG. 24. FIG. 26 is a top view of the electronic device in FIG. 24.

In this embodiment, the electronic device 500 is an automobile, such as a car. The electronic device 500 includes a plurality of image capturing units 510, and the image capturing units 510, for example, each includes the imaging lens system of the present disclosure. The image capturing units 510 can be served as, for example, panoramic view car cameras, dashboard cameras and vehicle backup cameras. Each of the image capturing units 510 can be a wide-angle image capturing unit.

As shown in FIG. 24, the image capturing units 510 are, for example, respectively disposed on the front, rear, side, interior of the automobile, and side mirrors of the automobile to capture images at the periphery of the automobile for recognizing road conditions outside the automobile, thereby achieving automated driver assistance. Moreover, the image software processor may blend the images into one panoramic view image for the driver's checking every corner surrounding the automobile, thereby favorable for parking and driving.

As shown in FIG. 25, the image capturing units 510 are, for example, respectively disposed on the lower portion of the left and right side mirrors to capture images in regions on left and right lanes. As shown in FIG. 26, the image capturing units 510 are, for example, respectively disposed inside the side mirrors and the front and rear windshields for providing external information to the driver, and also providing more viewing angles so as to reduce blind spots, thereby improving driving safety. The arrangement of the aforementioned image capturing units is only exemplary, and number, positions and imaging direction of the image capturing units can be adjusted according to actual requirements.

The smartphone and automobile in this embodiment are only exemplary for showing the image capturing unit of the present disclosure installed in an electronic device, and the present disclosure is not limited thereto. The image capturing unit can be optionally applied to optical systems with a movable focus. Furthermore, the imaging lens system of the image capturing unit features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, aerial cameras, wearable devices, portable video recorders and other electronic imaging devices.

The aforementioned description, for the purpose of explanation, has been described with reference to specific embodiments. It is to be noted that TABLES 1A-8C show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens system comprising seven lens elements, the seven lens elements being, in order from an object side to an image side along an optical path, a first lens element, a second lens element, a third lens element, a fourth lens element, a fifth lens element, a sixth lens element and a seventh lens element, and each of the seven lens elements having an object-side surface facing toward the object side and an image-side surface facing toward the image side;

wherein a total number of lens elements in the imaging lens system is seven, the first lens element has negative refractive power, the image-side surface of the fifth lens element is convex in a paraxial region thereof, the sixth lens element has negative refractive power, the object-side surface of the sixth lens element is concave in a paraxial region thereof, and at least one of the object-side surface and the image-side surface of at least one of the seven lens elements has at least one inflection point;

wherein a focal length of the imaging lens system is f, an axial distance between the object-side surface of the first lens element and an image surface is TL, an axial distance between the object-side surface of the first lens element and the image-side surface of the third lens element is Dr1r6, an axial distance between the object-side surface of the fourth lens element and the image-side surface of the seventh lens element is Dr7r14, an Abbe number of the second lens element is V2, a refractive index of the second lens element is N2, a curvature radius of the object-side surface of the fourth lens element is R7, a curvature radius of the image-side surface of the fourth lens element is R8, a curvature radius of the image-side surface of the fifth lens element is R10, a curvature radius of the object-side surface of the sixth lens element is R11, an axial distance between the object-side surface of the first lens element and the image-side surface of the seventh lens element is TD, an axial distance between the image-side surface of the seventh lens element and the image surface is BL, and the following conditions are satisfied:

$$0.05 < f/TL < 0.35;$$
$$1.40 < Dr7r14/Dr1r6 < 3.00;$$
$$5.00 < V2/N2 < 16.00;$$
$$0.10 < (R7 - R8)/(R7 + R8) < 3.50;$$
$$0.03 < R11/R10 < 5.00; \text{ and}$$
$$5.00 < TD/BL < 9.00.$$

2. The imaging lens system of claim 1, wherein the focal length of the imaging lens system is f, the axial distance between the object-side surface of the first lens element and the image surface is TL, and the following condition is satisfied:

$$0.10 < f/TL < 0.25.$$

3. The imaging lens system of claim 1, wherein the object-side surface of the first lens element is convex in a paraxial region thereof, and at least one of the object-side surface and the image-side surface of the seventh lens element has at least one inflection point.

4. The imaging lens system of claim 1, wherein the fifth lens element is cemented to the sixth lens element, the image-side surface of the fifth lens element is aspheric, the object-side surface of the sixth lens element is aspheric, the axial distance between the object-side surface of the first lens element and the image surface is TL, a maximum image height of the imaging lens system is ImgH, and the following condition is satisfied:

$$2.00 < TL/ImgH < 8.00.$$

5. The imaging lens system of claim 1, wherein the image-side surface of the seventh lens element has at least one convex critical point in an off-axis region thereof, a maximum field of view of the imaging lens system is FOV, and the following condition is satisfied:

$$130.0 \text{ degrees} < FOV < 180.0 \text{ degrees}.$$

6. The imaging lens system of claim 1, wherein a focal length of the first lens element is f1, a focal length of the third lens element is f3, and the following condition is satisfied:

$$-0.65 < f1/f3 < 0.70.$$

7. The imaging lens system of claim 1, wherein the focal length of the imaging lens system is f, a focal length of the second lens element is f2, a focal length of the third lens element is f3, a focal length of the seventh lens element is f7, and the following condition is satisfied:

$$0 < |f/f2| + |f/f3| + |f/f7| < 1.00.$$

8. The imaging lens system of claim 1, wherein a central thickness of the fourth lens element is CT4, a central thickness of the fifth lens element is CT5, a central thickness of the sixth lens element is CT6, an axial distance between the fifth lens element and the sixth lens element is T56, and the following condition is satisfied:

$$0.25 < CT4/(CT5 + T56 + CT6) < 0.70.$$

9. The imaging lens system of claim 1, wherein a curvature radius of the image-side surface of the second lens element is R4, the curvature radius of the image-side surface of the fifth lens element is R10, and the following condition is satisfied:

$$0.10 < (R4 + R10)/(R4 - R10) < 15.00.$$

10. The imaging lens system of claim 1, wherein an Abbe number of the third lens element is V3, and the following condition is satisfied:

$$5.0 < V3 < 35.0.$$

11. The imaging lens system of claim 1, wherein a maximum effective radius of the object-side surface of the first lens element is Y1R1, a maximum effective radius of the image-side surface of the fourth lens element is Y4R2, and the following condition is satisfied:

$$1.50 < Y1R1/Y4R2 < 3.00.$$

12. The imaging lens system of claim 1, wherein a displacement in parallel with an optical axis from an axial vertex on the object-side surface of the second lens element to a maximum effective radius position on the object-side surface of the second lens element is Sag2R1, a central thickness of the second lens element is CT2, and the following condition is satisfied:

$$0.01 < |Sag2R1|/CT2 < 0.60.$$

13. An image capturing unit, comprising:
the imaging lens system of claim 1; and
an image sensor disposed on the image surface of the imaging lens system.

14. An electronic device, comprising:
the image capturing unit of claim 13.

15. An imaging lens system comprising seven lens elements, the seven lens elements being, in order from an object side to an image side along an optical path, a first lens element, a second lens element, a third lens element, a fourth lens element, a fifth lens element, a sixth lens element and a seventh lens element, and each of the seven lens elements having an object-side surface facing toward the object side and an image-side surface facing toward the image side;
wherein a total number of lens elements in the imaging lens system is seven, the first lens element has negative refractive power, the fourth lens element has positive refractive power, the sixth lens element has negative refractive power, the object-side surface of the sixth lens element is concave in a paraxial region thereof, and at least one of the object-side surface and the image-side surface of at least one of the seven lens elements has at least one inflection point;
wherein a focal length of the imaging lens system is f, an axial distance between the object-side surface of the first lens element and an image surface is TL, an axial distance between the object-side surface of the first lens element and the image-side surface of the third lens element is Dr1r6, an axial distance between the object-side surface of the fourth lens element and the image-side surface of the seventh lens element is Dr7r14, an Abbe number of the second lens element is V2, a refractive index of the second lens element is N2, a curvature radius of the image-side surface of the first lens element is R2, a curvature radius of the image-side surface of the second lens element is R4, a curvature radius of the object-side surface of the fourth lens element is R7, a curvature radius of the image-side surface of the fifth lens element is R10, an axial distance between the object-side surface of the first lens element and the image-side surface of the seventh lens element is TD, an axial distance between the image-side surface of the seventh lens element and the image surface is BL, and the following conditions are satisfied:

$$0.05 < f/TL < 0.30;$$

$$1.40 < Dr7r14/Dr1r6 < 3.00;$$

$$5.00 < V2/N2 < 16.00;$$

$$0.10 < (R7 - R10)/(R7 + R10) < 3.00;$$

$$0 < |R2/R4| < 0.80; \text{ and}$$

$$5.00 < TD/BL < 9.00.$$

16. The imaging lens system of claim 15, wherein the object-side surface of the fifth lens element is convex in a paraxial region thereof, and the object-side surface of the third lens element has at least one inflection point.

17. The imaging lens system of claim 15, wherein the curvature radius of the object-side surface of the fourth lens element is R7, the curvature radius of the image-side surface of the fifth lens element is R10, and the following condition is satisfied:

$$0.45 < (R7 - R10)/(R7 + R10) < 1.80.$$

18. The imaging lens system of claim 15, wherein the focal length of the imaging lens system is f, a focal length of the first lens element is f1, a focal length of the second lens element is f2, a focal length of the seventh lens element is f7, and the following condition is satisfied:

$$0 < (|f/f2| + |f/f7|)/|f/f1| < 1.30.$$

19. The imaging lens system of claim 15, wherein an axial distance between the fourth lens element and the fifth lens element is T45, a central thickness of the fifth lens element is CT5, and the following condition is satisfied:

$$0.07 < T45/CT5 < 0.90.$$

20. The imaging lens system of claim 15, wherein the axial distance between the object-side surface of the first lens element and the image-side surface of the seventh lens element is TD, the axial distance between the image-side surface of the seventh lens element and the image surface is BL, and the following condition is satisfied:

$$5.00 < TD/BL < 8.50.$$

21. The imaging lens system of claim 15, wherein the first lens element is made of glass material, the object-side surface of the third lens element has at least one convex critical point in an off-axis region thereof, a maximum value among refractive indices of the second lens element, the third lens element and the seventh lens element is MAX_N237, and the following condition is satisfied:

$$1.500 < MAX\_N237 < 1.720.$$

22. An imaging lens system comprising seven lens elements, the seven lens elements being, in order from an object side to an image side along an optical path, a first lens element, a second lens element, a third lens element, a fourth lens element, a fifth lens element, a sixth lens element and a seventh lens element, and each of the seven lens elements having an object-side surface facing toward the object side and an image-side surface facing toward the image side;

wherein a total number of lens elements in the imaging lens system is seven, the first lens element has negative refractive power, the image-side surface of the fourth lens element is convex in a paraxial region thereof, the fifth lens element has positive refractive power, the object-side surface of the fifth lens element is convex in a paraxial region thereof, the sixth lens element has negative refractive power, and at least one of the object-side surface and the image-side surface of at least one of the seven lens elements has at least one inflection point;

wherein a focal length of the imaging lens system is f, a focal length of the first lens element is f1, a focal length of the seventh lens element is f7, an axial distance between the object-side surface of the first lens element and an image surface is TL, an axial distance between the object-side surface of the first lens element and the image-side surface of the third lens element is Dr1r6, an axial distance between the object-side surface of the fourth lens element and the image-side surface of the seventh lens element is Dr7r14, an Abbe number of the second lens element is V2, a refractive index of the second lens element is N2, a sum of central thicknesses of all lens elements of the imaging lens system is ΣCT, a sum of all axial distances between adjacent lens elements of the imaging lens system is ΣAT, an axial distance between the object-side surface of the first lens element and the image-side surface of the seventh lens element is TD, an axial distance between the image-side surface of the seventh lens element and the image surface is BL, and the following conditions are satisfied:

$$0.05 < f/TL < 0.28;$$
$$1.40 < Dr7r14/Dr1r6 < 3.00;$$
$$5.00 < V2/N2 < 16.00;$$
$$0.10 < \Sigma CT/\Sigma AT < 3.00;$$
$$0 < |f1/f7| < 1.00; \text{ and}$$
$$5.00 < TD/BL < +9.00.$$

23. The imaging lens system of claim 22, further comprising an aperture stop, wherein the aperture stop is disposed between the second lens element and the fourth lens element, an axial distance between the fifth lens element and the sixth lens element is T56, a curvature radius of the image-side surface of the fifth lens element is R10, a curvature radius of the object-side surface of the sixth lens element is R11, the focal length of the imaging lens system is f, and the following conditions are satisfied:

$$0.010 \text{ mm} < T56 < 0.050 \text{ mm; and}$$
$$0.04 < |R10 - R11| \times 10/f < 8.00.$$

24. The imaging lens system of claim 22, wherein the object-side surface of the second lens element has at least one inflection point.

25. The imaging lens system of claim 22, wherein the object-side surface of the fourth lens element is concave in a paraxial region thereof, the axial distance between the object-side surface of the first lens element and the image surface is TL, a maximum image height of the imaging lens system is ImgH, and the following condition is satisfied:

$$3.00 < TL/ImgH < 6.00.$$

26. The imaging lens system of claim 22, wherein a central thickness of the fourth lens element is CT4, a central thickness of the fifth lens element is CT5, and the following condition is satisfied:

$$0.30 < CT4/CT5 < 0.85.$$

27. The imaging lens system of claim 22, wherein a curvature radius of the object-side surface of the fourth lens element is R7, a curvature radius of the object-side surface of the sixth lens element is R11, and the following condition is satisfied:

$$0.35 < (R7 - R11)/(R7 + R11) < 3.00.$$

28. The imaging lens system of claim 22, wherein an axial distance between the first lens element and the second lens element is T12, an axial distance between the third lens element and the fourth lens element is T34, an axial distance between the fourth lens element and the fifth lens element is T45, and the following condition is satisfied:

$$0.65 < (T34 + T45)/T12 < 2.50.$$

29. The imaging lens system of claim 22, wherein the focal length of the imaging lens system is f, the focal length of the first lens element is f1, the focal length of the seventh lens element is f7, the axial distance between the object-side surface of the first lens element and the image surface is TL, the axial distance between the object-side surface of the first lens element and the image-side surface of the third lens element is Dr1r6, the axial distance between the object-side surface of the fourth lens element and the image-side surface of the seventh lens element is Dr7r14, the Abbe number of the second lens element is V2, the refractive index of the second lens element is N2, a curvature radius of the image-side surface of the first lens element is R2, a curvature radius of the image-side surface of the second lens element is R4, a curvature radius of the object-side surface of the fourth lens element is R7, a curvature radius of the image-side surface of the fourth lens element is R8, a curvature radius of the image-side surface of the fifth lens element is R10, a curvature radius of the object-side surface of the sixth lens element is R11, the sum of central thicknesses of all lens elements of the imaging lens system is $\Sigma CT$, the sum of all axial distances between adjacent lens elements of the imaging lens system is $\Sigma AT$, and the following conditions are satisfied:

$$0.14 \le f/TL \le 0.19;$$

$$1.50 \le Dr7r14/Dr1r6 \le 2.01;$$

$$9.61 \le V2/N2 \le 15.92;$$

$$0.59 \le (R7 - R8)/(R7 + R8) \le 1.53;$$

$$0.89 \le R11/R10 \le 1.75;$$

$$0.74 \le (R7 - R10)/(R7 + R10) \le 1.16;$$

$$0.03 \le |R2/R4| \le 0.27;$$

$$1.62 \le \Sigma CT/\Sigma AT \le 2.75; \text{ and}$$

$$0.04 \le |f1/f7| \le 0.49.$$

*   *   *   *   *